US011870811B2

(12) United States Patent
Gupta et al.

(10) Patent No.: US 11,870,811 B2
(45) Date of Patent: Jan. 9, 2024

(54) TRUSTED EXECUTION SECURITY POLICY PLATFORM

(71) Applicant: Virsec Systems, Inc., San Jose, CA (US)

(72) Inventors: Satya V. Gupta, Dublin, CA (US); Piyush Gupta, Horamavu (IN)

(73) Assignee: Virsec Systems, Inc., San Jose, CA (US)

( * ) Notice: Subject to any disclaimer, the term of this patent is extended or adjusted under 35 U.S.C. 154(b) by 368 days.

(21) Appl. No.: 16/981,219

(22) PCT Filed: Mar. 26, 2019

(86) PCT No.: PCT/US2019/024042
§ 371 (c)(1),
(2) Date: Sep. 15, 2020

(87) PCT Pub. No.: WO2019/191072
PCT Pub. Date: Oct. 3, 2019

(65) Prior Publication Data
US 2021/0029170 A1  Jan. 28, 2021

Related U.S. Application Data

(60) Provisional application No. 62/648,204, filed on Mar. 26, 2018.

(51) Int. Cl.
*H04L 9/40* (2022.01)
(52) U.S. Cl.
CPC .................................. *H04L 63/20* (2013.01)
(58) Field of Classification Search
CPC ....................................................... H04L 63/10
See application file for complete search history.

(56) References Cited

U.S. PATENT DOCUMENTS 8,850,588 B2 * 9/2014 Kumar ................ H04L 63/1425
726/25
9,407,648 B1   8/2016 Pavlyushchik et al.
(Continued)

FOREIGN PATENT DOCUMENTS

WO      2019/191072 A1    10/2019

OTHER PUBLICATIONS

International Preliminary Report on Patentability and Written Opinion for International Application No. PCT/US2019/024042, entitled: Trusted Execution Security Policy Platform, dated Oct. 8, 2020.
(Continued)

*Primary Examiner* — Matthew Smithers
*Assistant Examiner* — Shu Chun Gao
(74) *Attorney, Agent, or Firm* — Hamilton, Brook, Smith & Reynolds, P.C.

(57) ABSTRACT

Embodiments are directed to systems that attempt to establish trust in relation to operations on a customer endpoint of a computer network. The systems monitor, in real-time, operations to file systems, registries, application processes and threads, and OS kernels at the customer endpoint. The systems maintain compute components affected by the operation in a quarantine state. The systems then attempt to establish trust in the affected compute components (e.g., by applying rule-based policies). The systems remove the affected compute components from the quarantine state, if trust of the one or more affected compute components is established. The systems execute callback routines to mitigate results of the operation, if trust of the affected compute components is not established. The executed callback routines may terminate one or more processes associated with the operation, move the affected compute components to a quarantine area, restore a valid copy of the affected compute components, load one or more patches to remedy the
(Continued)

affected compute components, and reporting the operation and the affected compute components.

32 Claims, 51 Drawing Sheets

(56) References Cited

U.S. PATENT DOCUMENTS

| | | | |
|---|---|---|---|
| 2013/0067563 A1 | 3/2013 | Park et al. | |
| 2013/0117848 A1 | 5/2013 | Golshan et al. | |
| 2014/0317677 A1* | 10/2014 | Vaidya ................. | G06F 21/568 |
| | | | 726/1 |
| 2016/0036838 A1* | 2/2016 | Jain .................... | H04L 63/1416 |
| | | | 726/23 |
| 2016/0371475 A1* | 12/2016 | Zhao ....................... | H04L 63/08 |
| 2017/0004309 A1 | 1/2017 | Pavlyushchik et al. | |
| 2017/0359306 A1* | 12/2017 | Thomas ................ | H04L 63/145 |
| 2019/0268302 A1* | 8/2019 | McDonald ............. | H04L 63/10 |

OTHER PUBLICATIONS

Notification of Transmittal of the International Search Report and Written Opinion for PCT/US2019/024042, entitled: Trusted Execution Security Policy Platform, dated Jul. 31, 2019.

* cited by examiner

TRUSTED EXECUTION SECURITY POLICY PLATFORM

RELATED APPLICATION

This application is the U.S. National Stage of International Application No. PCT/US2019/024042, filed Mar. 26, 2019, which designates the U.S., published in English, and claims the benefit of U.S. Provisional Application No. 62/648,204, filed Mar. 26, 2018. The entire teachings of the above applications are incorporated herein by reference.

BACKGROUND

Computer network endpoints are often vulnerable to memory corruption attacks triggered remotely by malicious attackers. Malicious attackers have strived hard to exploit such vulnerabilities since the exploitations give the malicious attackers unprecedented access to a user's computer network, often with elevated privileges. Once control of a computer network endpoint has been compromised, arbitrary code of the attacker's choosing can be executed by the malicious attacker, as if the malicious attacker is an owner of compute components of the compromised computer network endpoint. Usually the objective of the malicious attacker is to extract personal and/or confidential information from the user, but the objective could also include disrupting personal or business activity of the user for the purpose of inflicting loss of productivity.

SUMMARY

A large number of malware attacks of a computer network today result from the ability of a malicious attacker to either inject malicious content into a file system, system registry, application process or thread, or OS kernel of a computer network endpoint, and later execute or extract data using the injected malicious content. These malicious activities can inflict the computer network unbeknownst to the information technology (IT) department of an organization. The process of injecting such malicious content often involves identifying and exploiting poorly designed code that performs inadequate input validation. Current cyber security technologies either attempt to observe malicious content in the network traffic or screen the behavior of suspicious code in a sandbox before dispatching it to a server for execution. These current technologies do not have the capability to examine file systems, registries, application processes and threads, and OS kernels of a computer network in real-time at a low enough granularity to detect memory corruption in the file systems, registries, application processes and threads, and OS kernels.

Embodiments of the present disclosure apply a fully deterministic approach to detect malicious attacks in real-time on a computer network (customer endpoint). The embodiments monitor, in real-time, operations on compute subsystems including file systems, registries, application processes and threads, OS kernels, and such in the computer network, and attempt to establish trust in relation to these operations. The compute components affected by a monitored operation may be placed in a quarantine state while trust is being established on these compute components. For example, when an actor, such as an application, triggers a file download operation, the embodiments may put the downloaded files in a quarantine state, while establishing trust by examining the downloaded files to validate that the files include genuine data (rather than corrupted data). Embodiments may further put the executable files of the application processes/threads triggering the operation into a quarantine state, while establishing trust by examining the executable files to validate that the application processes/threads are performed by instructions of genuine application code (without malware). The examining of the operation may be performed by applying rule-based policies that establish trust in the files based on security technical implementation guides (STIGS). The rule-based policies may be constructed using a policy language syntax defined in some embodiments.

Another example of establishing trust is by examining a user associated with the monitored operation to determine if the user is logged into the computer network and authorized to perform the operation as indicated in the Directory Server of the computer network. If trust is not established, embodiments execute user-defined callback routines that mitigate results of the operation.

Embodiments of the present disclosure are directed to computer systems and methods that detect malicious attacks in real time on a computer network endpoint (compute endpoint or customer endpoint). The computer systems and methods monitor a compute endpoint at runtime for an operation being performed on the compute endpoint. In some computer system embodiments, the monitoring of the compute endpoint is performed by a detection engine 260. In some embodiments, the computer systems and methods perform the operation on one of: a file system, a registry, one or more processes, one or more threads, a network card, one or more I/O devices (such as a mouse, keyboard, Bluetooth connected devices, and infrared (IR) connected devices), and memory of the compute endpoint. In some of these embodiments, the operation is a create, read, write, update, or delete operation performed on the file system, the registry, a network interface, shared memory, one or more I/O devices, including at least one of: a Bluetooth connected device and an infrared (IR) connected device, the one or more processes, the one or more threads, or the memory of the compute endpoint. In example embodiments, the computer systems and methods perform the monitoring by: (i) scanning at least one of: the file system, hive and keys of the registry, private memory, and shared memory, and (ii) capturing and factoring operating system events and device I/O.

The computer systems and methods further maintain one or more compute components affected by the operation in a quarantine state. In some computer system embodiments, the maintaining of the one or more affected compute components is performed by a detection engine 260 or an application and network hardening subsystem. In some embodiments, the one or more affected compute components includes one or more of: an executable file, a script file, a configuration file, a process, a thread, a jump table, a registry hive, a registry key, network traffic, private memory, shared memory, and an operating system kernel. In example embodiments, the computer systems and methods maintaining the one or more affected compute components in a quarantine state includes removing access permissions from the one or more affected compute components.

The computer systems and methods establish trust of the one or more affected compute components. In some computer system embodiments, the establishing of trust is performed by a callback processing engine or an application and network hardening subsystem. In some embodiments, the computer systems and methods establish trust by writing identifying information for the one or more affected compute components to a database of trusted processes and threads. In some embodiments, the computer systems and methods establish trust by one or more actions of: scanning code sections of the one or more affected compute components for known malware, at least one of statically and dynamically analyzing code sections of the one or more affected compute components for cache operations, executing watcher processes that monitor and guard a range of shared memory accessed by the operation, validating the one or more affected compute components against a signature database containing file checksums for the one or more compute components, validating code sections of the one or more affected compute components periodically against a cache of code sections using memory checksums, validating the one or more affected compute components periodically against a cache of jump tables using memory checksums, and applying one or more rule-based policies associated with the operation. In example embodiments, the rule-based policies are configured based on one or more security technical implementation guides (STIGS).

The computer systems and methods remove the one or more affected compute components from the quarantine state, if trust of the one or more affected compute components is established. In some computer system embodiments, the removal from the quarantine state is performed by the application and network hardening subsystem or the callback processing engine. In some embodiments, the computer systems and methods remove the one or more affected components from the quarantine state by restoring the access permissions to the one or more affected compute components. The computer systems and methods execute at least one callback routine to mitigate results of the operation, if trust of the one or more affected compute components is not established. In some embodiments, execution of the at least one callback routine is performed by the callback processing engine or the application and network hardening subsystem. In some embodiments, the execution of the at least one callback routine further comprises: generating one or more events based on each of the one or more actions, correlating the one or more events, and executing the at least one callback routine based on the correlation of the one or more events. In some embodiments, the at least one callback routine is a user-defined callback routine.

In some embodiments, the at least one callback routine triggers one or more protection actions within the computer network (compute) endpoint. In some computer system embodiments, the protection actions within the compute endpoint are performed by a micro-protection engine. These protection actions including: terminating one or more processes associated with the operation, terminating one or more threads associated with the operation, removing injected libraries from memory, terminating or disabling a web session associated with the operation, deleting the one or more affected compute components from disk, moving one or more affected compute instances to a quarantine area, restoring a valid copy of the one or more affected compute components, loading one or more patches to remedy the one or more affected compute components, reporting the operation and the one or more affected compute components, and calling one or more arbitrary user provided custom callbacks. In some embodiments, the at least one callback routine triggers one or more protection actions at a system external to the compute endpoint. In some computer system embodiments, the protection actions at an external system are performed by a macro-protection engine. These protection actions including: shutting down virtual machines of the external system, reporting information related to the operation to the external system, invoking application program interfaces (APIs) to external entities, including at least one of: a router, firewall, packet capture machine, file back device, and such; and performing quarantine actions across the external system, including at least one of collecting logs of the virtual machines, migrating virtual machines to a honeypot subnet, and observing behavior of the virtual machines by collecting data from a computer network.

In some embodiments, the computer systems and methods further determine if a user associated with the operation is a trusted user. The computer systems and methods verify at least one of: (i) the user being logged into the computer network during the operation, and (ii) the user having appropriate permissions to perform the operation and use the compute component. In some of these embodiments, an authentication and authorization subsystem determines if a user is a trusted user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Trusted Execution System

Figure 1:
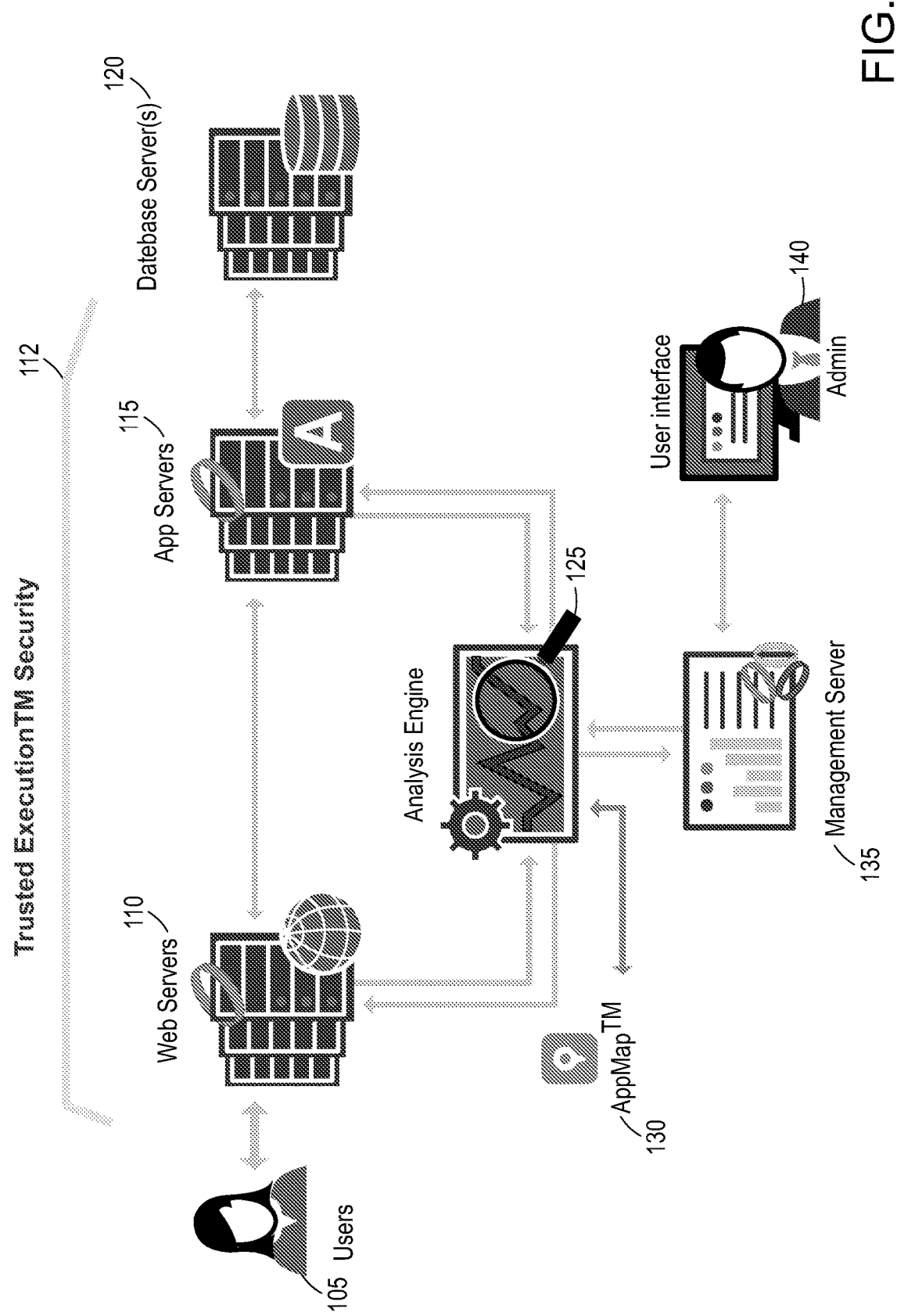
FIG. 1 is a block diagram of an example trusted execution system in embodiments of the present disclosure.

FIG. 1 is a diagram of an example trusted execution system 100 in embodiments of the present disclosure. The system 100 of FIG. 1 instruments probes into a computer application executed at a customer endpoint (platform) 112 by an associated user 105. The probes are software instructions inserts into the computer application (e.g., by a dynamic binary analysis engine or byte code instrumentation engine) at load or runtime time in order to capture activities of the executed computer application at runtime. The system 100 instruments the probes (e.g., via an instrumentation engine) on every instance of the executed computer application at the customer endpoint 112, including web servers 110, application servers 115, and database servers 120. The computer application may be running as a compute instance located in a cloud or premise data center. The system 100 may instrument the probes on the servers 110, 115, 120 implemented in any OS platform, including Windows and Linux, and in any programming language, such as .Net, Java, and PHP. The instrumented probes monitor (in real-time) the network of the customer endpoint 112 at runtime, and report operations by applications on file systems, registries, processes/threads, OS kernels, and such, to an analysis engine 125.

The instrumented probes generate events to establish trust of the components affected by the operation on file systems, registries, applications, OS kernels, a network interface card, I/O devices (e.g., mouse, keyboard, Bluetooth devices, and IR devices), memory, and the like, such as an executable file, a script file, a configuration file, a process, a thread, a jump table, a registry hive, a registry key, network traffic, private memory, and shared memory affected by the operations. The compute components may be placed in a quarantine state (e.g., removing access permissions from the compute components, excluding the compute components from a trusted process/thread database, and such) by an application and network hardening subsystem at the customer endpoint 112. The application and network hardening subsystem may perform actions to establish trust with the compute components, including, at least one of: scanning code sections of the one or more affected compute components for known malware, statically and dynamically analyzing code sections of the one or more affected compute components for cache operations, executing watcher processes that monitor and guard a range of shared memory accessed by the operation, validating the one or more affected compute components periodically against a signature database containing file checksums for the one or more compute components, validating code sections of the one or more affected compute components against a cache of code sections using memory checksums, and validating the one or more affected compute components periodically against a cache of jump tables using memory checksums. The instrumented probes execute at the customer endpoint 112 with minimal performance impact on the functions of the customer endpoint 112.

The instrumented probes communicate with the analysis engine appliance 125 to apply security policies to analyze the generated events to further establish trust in the affected compute components. The analysis engine 125 is coupled to an appmap database 130 that stores original, uncorrupted copies of some of the compute components. The security policies may be implemented by a customer administration at the user interface 140 to the management server 135 of the system 100 based on security technical implementation guides (STIGS) or other security standards. The security policies define callback routines that the analysis engine appliance 125 executes to mitigate results of the operation, if the applied security policies do not establish trust in the affected compute components. Based on the callback routines, the analysis engine appliance 125 may terminate one or more processes or threads associated with the operation, move the one or more affected compute components to a quarantine area, restore a valid copy of the one or more affected compute components (e.g., from the appmap database 130), load one or more patches to remedy the one or more affected compute components, report the operation and the one or more affected compute components (e.g., via the user interface 140 to the management server 135), and such.

Trusted Execution Platform Architecture

Figure 2:
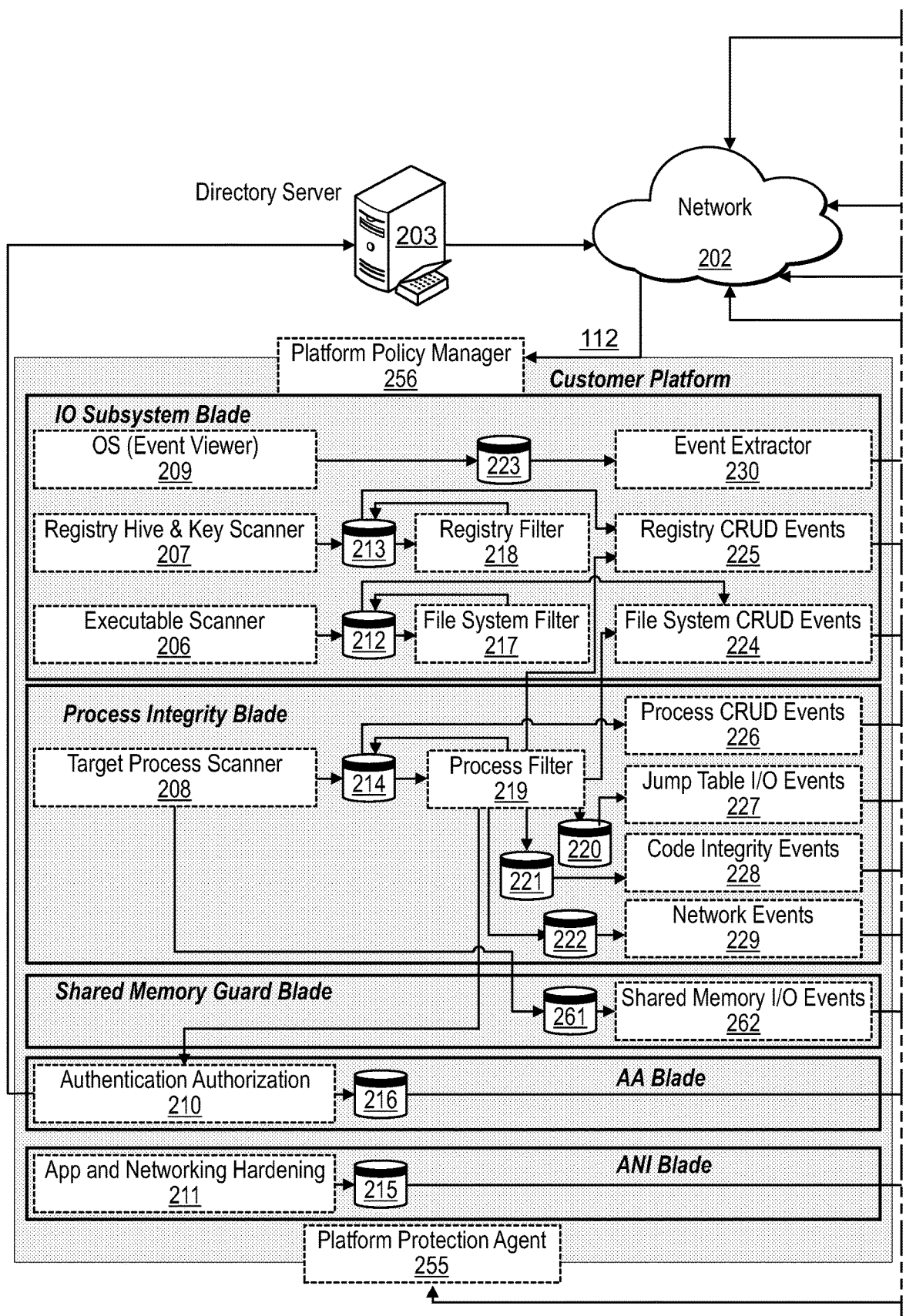
FIG. 2 is a block diagram of an example platform architecture of the trusted execution system 100 of FIG. 1 in embodiments of the present disclosure.
Figure 2:
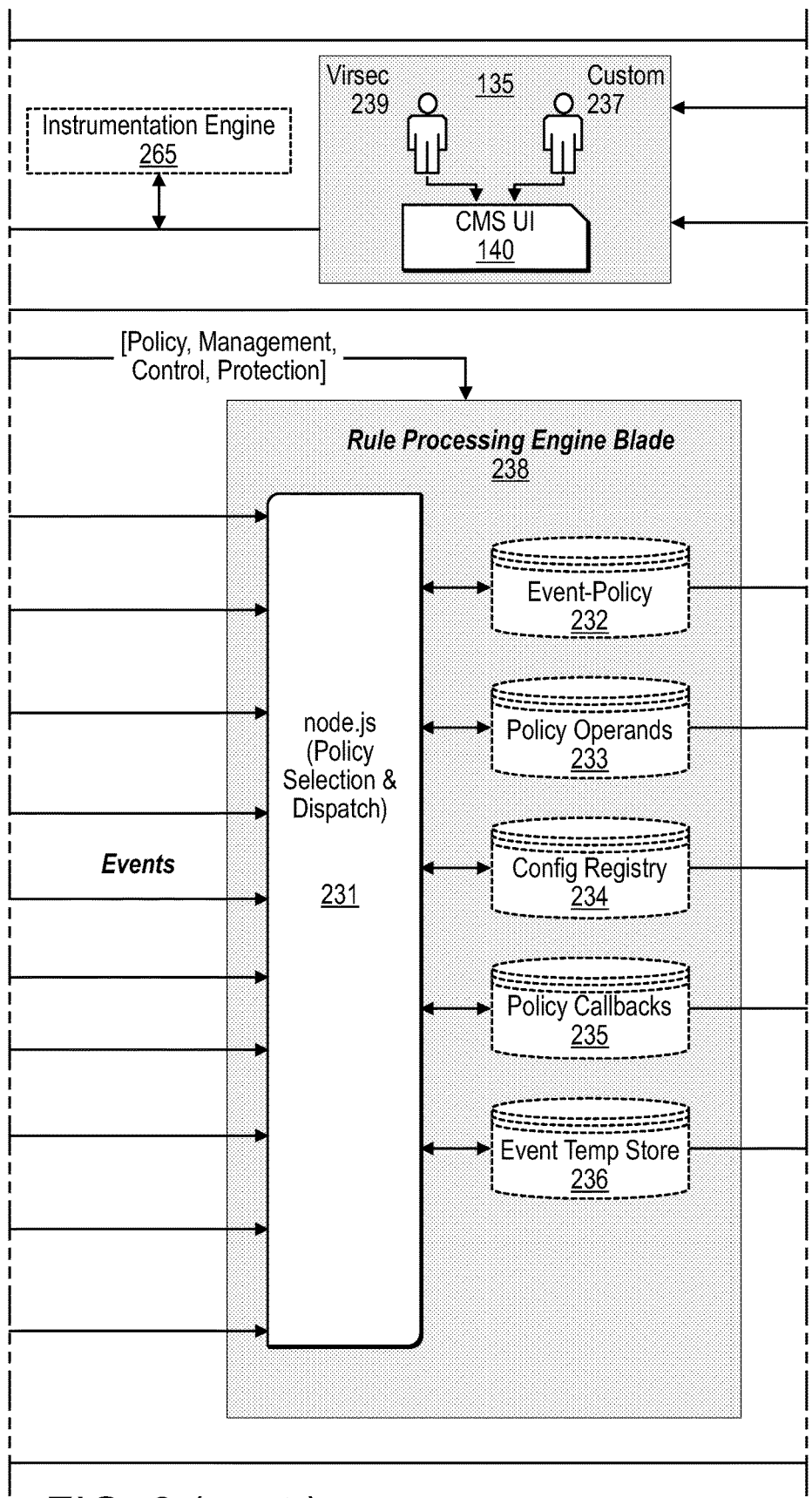
Figure 2:
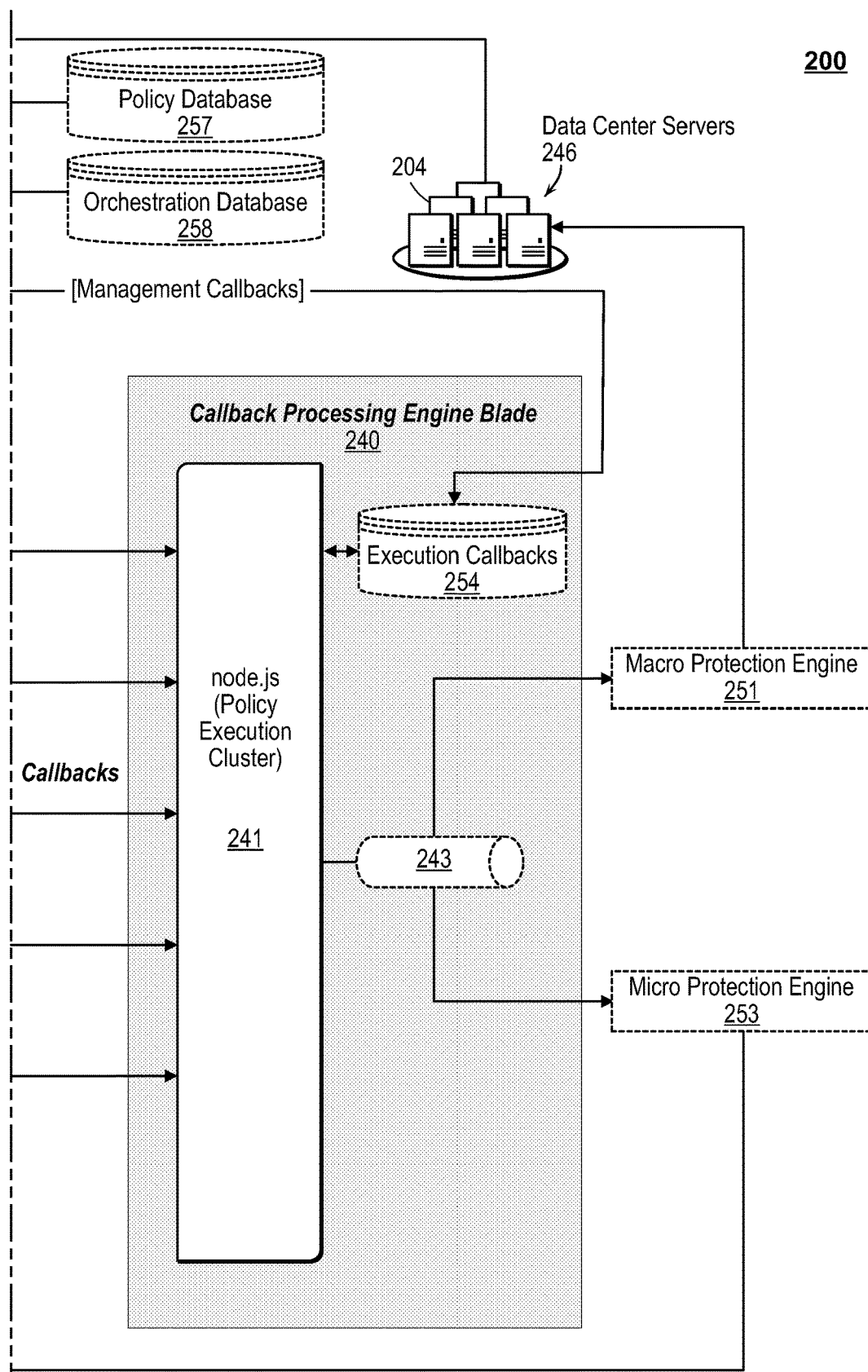

FIG. 2 is a diagram of an example platform architecture 200 of the trusted execution system 100 of FIG. 1 in embodiments of the present disclosure. The platform architecture 200 includes the management server 135 that has the user interface 140, where customers 237 associated with the customer endpoint (platform) 112 and product administrators/developers 239 of the platform 200 may configure and monitor the platform 200 as a user. The management server 135 may be coupled to data center servers 246 for storing and processing configuration data for the platform 200.

Customer Endpoint Devices

Using the user interface 140 of the management server 135, the product administrators/developers 239 of the platform 200, via an instrumentation engine 265, instrument probes (via network 202) into the customer endpoint (platform) 112 of network 202. The instrumented probes may be configured as part of a detection engine 260 of the platform at the customer endpoint 112. Using the user interface 140 of the management server 135, the product administrators/developers 239 of the platform, via a policy platform manager 256, provision probes (via network 202) into the customer endpoint (platform) 112 of network 202. The provisioned probes may be configured as part of a detection engine 260 of the platform at the customer endpoint 112. Using the user interface 140 of the management server 135, the product administrators/developers 239 of the platform, through policy database 257 and orchestration database 258, orchestrate and provision the RPE (or RPE blade) 238 and CPE (or CPE blade) 240 via network 202 into the analysis engine 125 of network 202. These policies are custom defined policies based on the STIGs and other security compliance references. The policies may be constructed using a policy language syntax defined in embodiments. The detection engine 260 monitors the customer endpoint 112 at runtime and detects in real-time operations to the file system, system registry, application processes and threads, shared memory, OS kernel, and such of the customer endpoint 112. To monitor the customer endpoint 112, the input/output (TO) system blade in detection engine 260 runs filesystem CRUD events engine 224 to detect CRUD (create, read, write update, and delete) operations to the file system and runs registry CRUD events engine 225 to detect CRUD operations to the system registry on the customer endpoint 112. To monitor the customer endpoint 112, the process integrity blade in the detection engine 260 runs the process CRUD events engine 226 to detect CRUD operations on process/thread memory on the customer endpoint 112. To monitor the customer endpoint 112, the detection engine 260 also reviews the OS event viewer 209 to detect operations to the OS kernel, application logs, install/uninstall logs.

The detection engine 260 runs the executable scanner 206 to perform scanning on the disk/secondary storage volume of the customer endpoint 112 at the file system level to detect files affected by file system CRUD operations. In some embodiments, the disk/secondary storage volume is primarily a disk partition (logical or physical), but if the customer endpoint 112 has multi-disk array configurations (physical or logical) or multiple partitions (physical or logical), the executable scanner 206 may also scan secondary partitions or any other storage extension to detect files affected by file system CRUD operations. The executable scanner 206 extracts the files in raw portable executable (PE) format or other such format and publishes the extracted files to a file system database 212 residing at the customer endpoint 112. The detection engine 260 then applies a file system filter 217 to the file system database 212 to exclude files not of interest from the file system database 212. The file system filter 217 may be defined by a user 237, 239 via the user interface 140 of the management servicer 135. From the file system database 212, the file system CRUD events engine 224 generates file system CRUD events for processing the rule processing engine 238 (which may be a component of the analysis engine appliance 125 of FIG. 1) to establish trust in the detected files.

From time to time, a process will attempt to create registry or perform CRUD operations on a filesystem. The filesystem CRUD events engine 224 may record all filesystem CRUD operations performed by the process (or owning process), along with context information, as filesystem CRUD events. Using the recorded filesystem CRUD events, the rule processing engine may establish the association of the generated filesystem CRUD events and the owning process performing these operations (e.g., using the process PID). Filesystem events of various classes may be reported to the rule processing engine for further processing. The rule processing engine will use the chain of events indicated by the filesystem CRUD events and associated to the owning process to quarantine and perform protection actions based on rule-based policies. The rule processing engine (via the rule-based policies) may use the context information for correlation and traceability with the process PID.

The detection engine 260 runs the registry hive & key scanner 207 to perform scanning on registry hives and keys at the customer endpoint 112 to detect registry hives, keys, and supporting files affected by registry CRUD operations. A registry hive is a logical group of keys, subkeys, and values in the system registry, and the registry hive has a set of supporting files containing backups of the registry hive's data. For example, the registry hive HKEY_CURRENT_CONFIG has supporting files "System", "System.alt", "System.log", and "System.sav". Each time a new user 105 logs onto a device of the customer endpoint 112, a new hive is created for that user 105, along with a corresponding user hive profile file. The hive files are then updated each time a user logs onto a device of the customer endpoint 112. A user's hive contains specific registry information pertaining to the user's application settings, desktop, environment, network connections, and printers. The user's hive profile file is located under the HKEY_USERS key. Most of the supporting files for the user's hive are located in the %SystemRoot %\System32\Config directory. The file name extensions (e.g., alt, .log, .sav, and the like) of the supporting hive files in this directory, or lack of a file name extension, indicate the type of data these files contain.

In some embodiments, the registry hive & key scanner 207 detects the registry hives, keys, and supporting files affected by registry CRUD operations by employing API hooking using DLL injection, system call hooking, or a kernel driver (e.g., a ring 0 kernel driver). The registry hive and key scanner 207 publishes the detected registry hives, keys, and supporting files to a registry database 213 residing at the customer endpoint 112. The detection engine 260 then applies a registry filter 218 to the registry database 213 to exclude hives, keys, and files not of interest from the registry database 213. The registry filter 218 may be defined by a user 237, 239 via the user interface 140 of the management servicer 135. From the registry database 213, the registry CRUD events engine 225 generates registry CRUD for processing by the rule processing engine 238 to establish trust in the detected registry hives, keys, and supporting files.

From time to time, a process will attempt to create registry or perform CRUD operations on registry hives. The registry CRUD events engine 225 may record all registry CRUD operations performed by the process (or owning process), along with context information, as registry CRUD events. Using the recorded registry CRUD events, the rule processing engine may establish the association of the generated registry CRUD events and the owning process performing these operations (e.g., using the process PID). Registry operations of various classes may be reported to the rule processing engine for further processing. The rule processing engine will use the chain of events indicated by the registry CRUD events and associated to the owning process to quarantine and perform protection actions based on rule-based policies. The rule processing engine (via the rule-based policies) may use the context information for correlation and traceability with the process PID.

The detection engine 260 runs the target process scanner 208 to perform scanning on the memory of the customer endpoint 112 and detect currently executing processes and threads performing CRUD operations. In some embodiments, the target process scanner 208 detects the processes and threads performing CRUD operations by employing API hooking using DLL injection, system calls hooking, or a kernel driver (e.g., a ring 0 kernel driver). In some embodiments, the shared memory events 10 engine 262 also detects the processes and threads performing CRUD operations in shared memory (or other named memory regions), and guards this memory from access by these processes/threads in a shared memory guard blade. The target process scanner 208 publishes the processes and threads to a process database 214 residing at the customer endpoint 112. The detection engine 260 then applies a process filter 219 to the processes database 214 to exclude processes/threads not of interest from the processes database 214. The process filter 219 may be defined by a user 237, 239 via the user interface 140 of the management servicer 135. In some embodiments, the criteria of the process filter 219 may be defined based on import libraries of the customer endpoint 112, including by networking, TCP/IP socket, and access control list functionality defined based on the import libraries. For example, based on the import libraries, the process filter 219 may exclude all processes from the process database 214 that import network DLLs to perform networking functionalities. From the process database 214, the process CRUD events engine 226 generates process CRUD events for processing by the rule processing engine 238 to establish trust in the detected processes.

In some embodiments, the detection engine 260 profiles the process memory using a whitelisting approach, which determines if the caller of a function is in a whitelisted memory region of the associated process. For example, when a CRUD operation is detected (using API hooks, system call hooks, or such), the hook determines the source address of the caller of a function associated with the operation. The detection engine 260 may then profile the CRUD operation to validate that the caller source address and ensure that the intended CRUD operation is originating from pristine process memory in a whitelisted memory region of the process. This validation determines the root of trust of the caller which indicates that the function call is being made from a valid location, rather than some arbitrary or unknown code.

In some embodiments, the detection engine 260 may also include a mechanism to control the memory privilege changes performed by a calling process. The calling process may potentially retrieve a handle to any other process in the system by enabling the Debug Privileges using (various APIs) in the calling process. The calling process can then call a set of APIs for the Debug Privileges to obtain a handle using PROCESS_ALL_ACCESS or such. The detection engine 260 may ensure that the protection actions are enforced based on the policies of the rules processing engine 238 when such memory privilege changes are performed. Similarly, the detection engine 260 may also include a mechanism to control the memory access changes performed by a calling process. For example, the detection engine 260 may include instrumentation at APIs that may be accessed by the calling process to change access control list (ACL) behavior of a memory region, such as virtualprotectxx in windows and mprotectxx in Linux platforms. The detection engine 260 or other customer endpoint 112 component may ensure that the protection actions are enforced based on the policies of the rules processing engine 238 when such memory access changes are performed.

The detection engine 260 also extracts the jump table region from each process and determines the process name, process identifier, and metadata (starting address, checksum, and size of the jump table region, and such), which are stored in an intermediate jump table database 220. The detection engine 260 may periodically compute a jump table checksum for a monitored process, which is compared to the jump table checksums stored in the intermediate jump table database 220. If the jump table of the monitored process is altered (i.e., does not match the stored checksums), the detection engine 260 generates jump table input/output events 227 for processing by the rule processing engine 238 to establish trust in the monitored process. Further, a jump table may typically have "read only" permission, if other operations (besides read operations) are being performed on the jump table regions, the detection engine 260 also may immediately move the jump table to a quarantine area.

The detection engine 260 further extracts code sections for each process and determines the process name, process identifier, and metadata (starting address, checksum, and size of the jump table region, and such), which are stored in an intermediate code integrity database 221. The detection engine 260 may periodically compute a checksum for the code sections of a monitored process, which are compared to the checksums for the code sections stored in the intermediate code integrity database 221. If a code segment is altered (i.e., does not match the stored checksums), the detection engine 260 generates a code integrity event 228 for processing by the rule processing engine 238 to establish trust in the monitored process.

The detection engine 260 may also extract networking operations for each process (including process name, process identifier, and metadata such as source IP, source port, destination port, and protocol), which are stored into a network database 222. When monitored processes attempt to connect or be connected to by a remote user, the detection engine 260 compares the processes to the network database 222. If the processes do not match data in the network database 222, the detection engine 260 generates network CRUD events 229 for processing by the rule processing engine 238 to establish trust in the monitored process.

The detection engine 260 also collects (gathers) logs for a configured set of OS events from the OS event viewer 209. The set of events and associated processing rules may be defined by a user 237, 239 via the user interface 140 of the management servicer 135. The event logs are stored in an intermediate events database 223. The event extractor 230 reviews and harvests the event logs from the event database based on rules defined for the set of events, and may generate OS events for processing by the rule processing engine 238 to establish trust in the monitored process. For example, based on the rules, the event extractor may generate an OS event if the event logs indicate the sequence of: (1) a process starts and calls other processes, (2) a Windows installer activity occurs, (3) a Windows update agent activity occurs, (4) a Windows service synchronization activity occurs, and (5) the application crashes.

The platform 200 also includes the application and network hardening (ANH) subsystem (or blade) 211 configured at the customer endpoint 112. By executing one or more malicious operations on the file system, system registry, application processes and threads, OS kernel, a remote malicious user can trick an application at the customer endpoint 112 into writing malicious files (executables, scripts, configuration files, data files, and such) to disk or maliciously altering such files (e.g., inserting malicious code sections or instructions, changing file permissions, and such), or deleting such files. Later the remote malicious user can use the malicious files affected by the malicious operations to initiate a process to conduct malicious activities, such as connecting to customer endpoint servers as part of an advance persistent threat (APT) attack, encrypting files on disk, discovering user passwords, and such.

The ANH subsystem 211 tracks a process, user, and remote endpoint associated with a file system, registry, or other memory operation that creates, reads, updates, or deletes a file at the customer endpoint 112. For example, the file may be a downloaded executable file used to initiate an application process (e.g., for an interpreted application). If the operation is performed by a user 105 other than an authenticated administrator 237, 239, the file is viewed with suspicion until trust is explicitly established with the file.

The ANH subsystem 211 may maintain the file in a quarantine state until trust can be established with the file. For example, the file operation may be written as a record in the ANH database 215 with a "trust level" field set to "unverified." For further example, the access permissions for the file may be removed, such as by moving the file to an access group with no access permissions.

The ANH subsystem 211 may then establish trust with the file. The ANH subsystem 211 may establish trust by scanning the files using a third-party vendor scanner (e.g. Virus Total, Reversing Labs, and the like) for malware. The ANH subsystem 211 may further establish trust by checking signatures (e.g., checksums) of the file (or segments of the file) against one or more file integrity databases, such as the file signature repository maintained by the ANH subsystem 211. The ANH subsystem 211 may also establish trust by statically analyzing code sections of the file for inappropriate cache instructions. The ANH subsystem 211 may also check the trust and revision history of the file as previously recorded in the ANH database 215. If trust is established by the ANH subsystem 211, in the file operation record of the ANH database 215, the "trust level" field may be changed to "verified" and the access permissions for the file may be restored, e.g., moving to an access group associated with the user. If trust is not established, the ANH subsystem 211 generates an event indicating the untrusted state of the file, which is processed by the rule processing engine 238 to establish trust in the file and associated process.

The platform 200 also includes the authentication/authorization subsystem (blade) 210 configured at the customer endpoint 112. The authentication/authorization subsystem 210 uses the process credentials of an operation performed on a file system, registry, or other memory operation of the customer endpoint 112 to determine the user performing the operation. The authentication/authorization subsystem 210 may determine the process credentials of the user by intercepting calls made to the Directory Server 203 coupled to the customer endpoint 112. The authentication/authorization subsystem 210 then establishes if the user is a trusted user (e.g., administrator).

To establish trust, the authentication/authorization subsystem 210 may determine at the Directory Server 203 that the user is logged into the computer network during the operation. To establish trust, the authentication/authorization subsystem 210 may also determine at the Directory Server 203 the permissions or other credential(s) associated with the user, and whether the associated permissions are appropriate to perform the operation on the file system, registry, or other customer endpoint memory. This authentication/authorization subsystem 210 may maintain a record in the authentication/authorization database 216 on the users actively logged into the customer endpoint 112, the users' associated permissions, and other user credentials rather than repeatedly checking the Directory Server 203. If the user performs an operation but the user is not logged into the computer network or does not have permissions/credentials to perform the operation, the authentication/authorization subsystem 211 generates an event indicating the untrusted state of the user, which is processed by the rule processing engine 238 to establish trust in the associated process (and may quarantine the components affected by the operation).

Processing Engines

The platform architecture 200 also includes the Rule Processing Engine (RPE) 238, which is communicatively coupled via network 202 to the customer endpoint 112. A user 137, 139 may configure rule-based policies at the user interface 140 of the management server 135, and other standard rules may be provided as part of the platform 200. The rule-based policies may be configured based on security technical implementation guides (STIGS) or other security standards for file systems, registries, applications, OS kernels, and the like. These rules can then be used to detect anomalies in runtime and prevent, isolate, and/or terminate misbehaving application instances. The event rule expressions of the configured rule-based policies are stored in the event policy database 232 of the RPE 238. Such expressions specify: (1) a rule expression structure that defines a rule that corresponds with the rule expression structure, (2) conditions for evaluation with respect to occurrences of events received at the RPE 238 that correspond with the rule expression structure, and (3) actions for performance in response to the received events satisfying all the conditions. The list of different policy operands used in received events of different application instances associated with a policy is stored in the policy operands database 233. For example, for a particular application, the policy operand may be directory path== "C:\0 System32", file extension == *.exe.

Configuration parameters used to analyze received events of different application instances associated with a policy are stored in the config registry database 234 of the RPE 238. The configuration parameters consist primarily of two parts, the schema that must be adhered to by the events of an application instance, and the list and order of rules that must be applied to the events of the application instance. The policy callbacks database 235 of the RPE 238 stores a callback that implements the checks of a given policy to determine the outcome of a security decision reflected in the given policy. An example of a policy callback may be to check if a runtime file system FILE WRITE event is not outside of the web rot of the application. A check of the callback returning success indicates that no security violation has occurred, whereas returning a failure indicates a security policy violation. There may be embodiments where detecting an intrusion requires multiple events to occur within a certain period of time. In order to verify rules of a policy that span multiple events in time, the events need to be stored. The event temp store 236 of the RPE 238 stores these events, along with periodically monitoring for and purging stale stored events.

The policy selection and dispatch component 231 of the RPE 238 asynchronously processes (using a Node.js architecture with multi-threaded input/output queues) the events generated by the event engines 224-230 at the customer endpoint 231. The policy selection and dispatch 231 selects the rule-based policies to process one or more of the events 224-230 based on the rules parameters stored in the associated rules databases (event policy 232, policy operand 233, config registry 234, policy callback 235, and event temp store 236). The platform architecture 200 also includes the callback processing engine (or blade) 240, which is communicatively coupled via network 202 to the customer endpoint 112. The policy execution cluster 241 (using a Node.js architecture) of the callback processing engine (CPE) 240 executes the rule-based policies selected by the RPE 238 to process one or more of the events generated by events engines 224-230. The policy execution cluster 241 is also responsible for selecting the correct execution nodes to execute one or more rule-based policies for a given event (or multiple related events). Using the user interface 140 of the management server 135, the product administrators/developers 239 of the platform, through policy database 257, publish and update execution callbacks 254 of the CPE 240 (via network 202) into the analysis engine 125 of network 202.

Based on execution of the rule-based policies, the policy execution cluster 241 may determine protective actions/outcomes to be performed related to the given event (or events). The protective actions/outcomes may be based on correlating the results of executing multiple rule-based policies for one or multiple different events generated by events engines 224-230. These protective actions/outcomes may include actions at the customer endpoint, including: terminating one or more processes or threads associated with the event, terminating or disabling a web session associated with the event, deleting the one or more affected compute components from disk, moving the one or more affected compute components to a quarantine area, restoring a valid copy of the one or more affected compute components, loading one or more patches to remedy the one or more affected compute components, and reporting the operation and the one or more affected compute components. These protective actions/outcomes may include actions at a system external to the customer endpoint, including: shutting down virtual machines of the external system, reporting information related to the operation to the external system, and performing quarantine actions across the external system, including at least one of collecting logs of the virtual machines, migrating virtual machines to honeypot subnet, and observing behavior of the virtual machines by collecting data from computer network. If the execution of the rule-based policies indicates that the event is a valid operation to the customer endpoint 112, the actions/outcome may include removing the files, processes/threads, memory, and such associated with the event from the quarantine state at the customer endpoint 112.

The policy execution cluster 241 of CPE 240 queues the determined actions via the Outcome (ActiveMQ) queue 243. If a determined protective action needs to operate on a file, process/thread, or memory within the customer endpoint 112, the micro-protection engine 253 is called to execute such through the platform protection agent 255 at the customer endpoint 112. If a determined protective action needs to operate on a subsystem external 204 from the customer endpoint 112 (such as cloud servers), the macro-protection engine 251 is called to execute such actions at the external subsystem 204.

The platform architecture 200 may also include incident response and forensics (IRF) components that perform correlation on detected events based on a process identifier (e.g., PID). The platform 200 may maintain historical data in an historical database of the process events and this may be used by the IRF components to perform incident analysis on the detected event. This database of process events may be traversed based on a given PID for retrieving historical data associated with a process associated with the PID. For example, the detection engine 260 or process CRUD events engine 226 may capture all the process aware events or incidents (registry, files, memory accesses, and such) and store these events/incidents in the IRF historical database linked to the PIDs associated with these events/incidents. The IRF components may then access the IRF historical database to perform forensics on the events/incidents in regard to a particular process event and respond to the particular process event based on the performed forensics. For example, the detection engine 260 may capture all the process aware events for a user session in the IRF historical database, and the IRF components may perform incident analysis on a currently detected event based on the history of the captured process aware events ordered by PID.

Policy Enforcement

The rule-based policies executed by the callback processing engine (CPE) 240 may be enforced at process or registry or filesystem granularity in embodiments of the platform 200. In some embodiments, the CPE 240 may execute inclusion and execution policies in which INCLUSIONS and EXCLUSIONS criteria are applied to the customer endpoint 112. External entities that govern (e.g., customers via the CMS UI 140) exclusion criteria or inclusion criteria may override the policy-based actions to whitelist the platform resources. An example is the CPE 240 invoking the macro protection engine 251 or micro protection engine 253 to perform a protection action of disallowing terminating a process since the customer has provided an exclusion policy specifying a whitelisted set of processes to be excluded from any such policy actions enforcement. Another example is the CPE 240 invoking the macro protection engine 251 or micro protection engine 253 (via the platform protection agent 255) to perform a protection action of disabling the permissions of a file which has just been downloaded by the process based on applying an inclusion policy to CRUD events generated in relation to operations on the file.

In some embodiments, the CPE 240 may execute process level policies based on process CRUD events or other process level actions on the customer endpoint 112. For example, the process CRUD events engine 226 may detect a process CRUD event which is transported to the analysis engine 125 in user mode. The CPE 240 of the analysis engine 125 may process the detected event by performing certain checks and investigations based on one or more defined process level policies. Based on the one or more process level policies, the CPE 240 may identify and rank the process associated with the detected event to be an attack vector and communicate with the macro protection engine 251 or micro protection engine 253 (via the platform protection agent 255) to perform protection actions, such as terminating the associated process. In some embodiments, the CPE 240 transfers the policy action to a kernel driver (e.g., a ring 0 kernel driver instrumented at the customer endpoint 112) which performs the termination of the associated process.

In some embodiments, the CPE 240 may execute file level policies based on file CRUD events or other file level actions on the customer endpoint 112. The CPE 240 may check the reputation of any file created or otherwise affected by a process before enabling the access control lists (ACLs) of the file. The detection engine 260 may place the file in a quarantine area on the customer endpoint 112 until the CPE 240 performs checks based on one or more defined file level policies to establish trust of the file. Once the CPE 240 establishes trust of the file then the ACLs for the file may be enabled, and/or the file may be allowed to execute. In some embodiments, the checks may include validating signatures, certificates, and ACLs, then based on the ranking of the file according to these checks, the CPE 240 invokes the macro protection engine 251 or micro protection engine 253 (via the platform protection agent 255) to perform protection actions defined by one or more file level policies.

For example, the filesystem CRUD events engine 224 may detect a filesystem CRUD event which is transported to the analysis engine 125. The CPE 240 of the analysis engine 125 may process the detected event by performing certain checks and investigations based on one or more defined file level policies. Based on the one or more file level policies, the CPE 240 may identify and rank the process and file associated with the detected event to be an attack vector and communicate with the macro protection engine 251 or micro protection engine 253 (via the platform protection agent 255) to perform protection actions, such as terminating the associated process or deleting the associated file. In some embodiments, the CPE 240 transfers the policy action to a kernel driver (e.g., a ring 0 kernel driver instrumented at the customer endpoint 112) which performs the termination of the associated process or deletion of the associated file.

In some embodiments, the CPE 240 may execute registry level policies based on registry CRUD events or other registry level actions on the customer endpoint 112. For example, the registry CRUD events engine 225 may detect a registry CRUD event which is transported to the analysis engine 125. The CPE 240 of the analysis engine 125 may process the detected event by performing certain checks and investigations based on one or more defined registry level policies. Based on the one or more registry level policies, the CPE 240 may identify and rank the process associated with the detected event or registry hive/key/file associated with the detected event to be an attack vector and communicate with the macro protection engine 251 or micro protection engine 253 (via the platform protection agent 255) to perform protection actions, such as terminating the associated process or deleting the associated registry hive/key/file. In some embodiments, the CPE 240 transfers the policy action to a kernel driver (e.g., a ring 0 kernel driver instrumented at the customer endpoint 112) which performs the termination of the associated process or deletion of the associated registry hive/key/file.

In some embodiments, vSTIG (Virsec Security Technical Implementation Guide) may be used to implement rule-based policies and publish the policies to the policy database 257. These policies, when implemented, enhance security for software, provide architectures to further reduce vulnerabilities, and define protection actions performed to enforce activities on the platform 200. These STIGs will determine various policies that include rules selected by the RPE 238 and executed by the CPE 240 of the platform 200. The management server 135, which may be implemented as a web interface, pushes the vSTIG Policies in to the analysis engine 125 (RPE 238 and CPE 240). These policies provide protection fixes or actions based on the defined vSTIG. The CMS 140 of the management server 135 publishes the policy database for use by the RPE 238/CPE 240 to bootstrap with the policies. In some embodiments, a policy language syntax for defining the vSTIGs (e.g., by user 237 and developers 239) are employed in the platform 200.

Detection Implementations

Figure 3A:
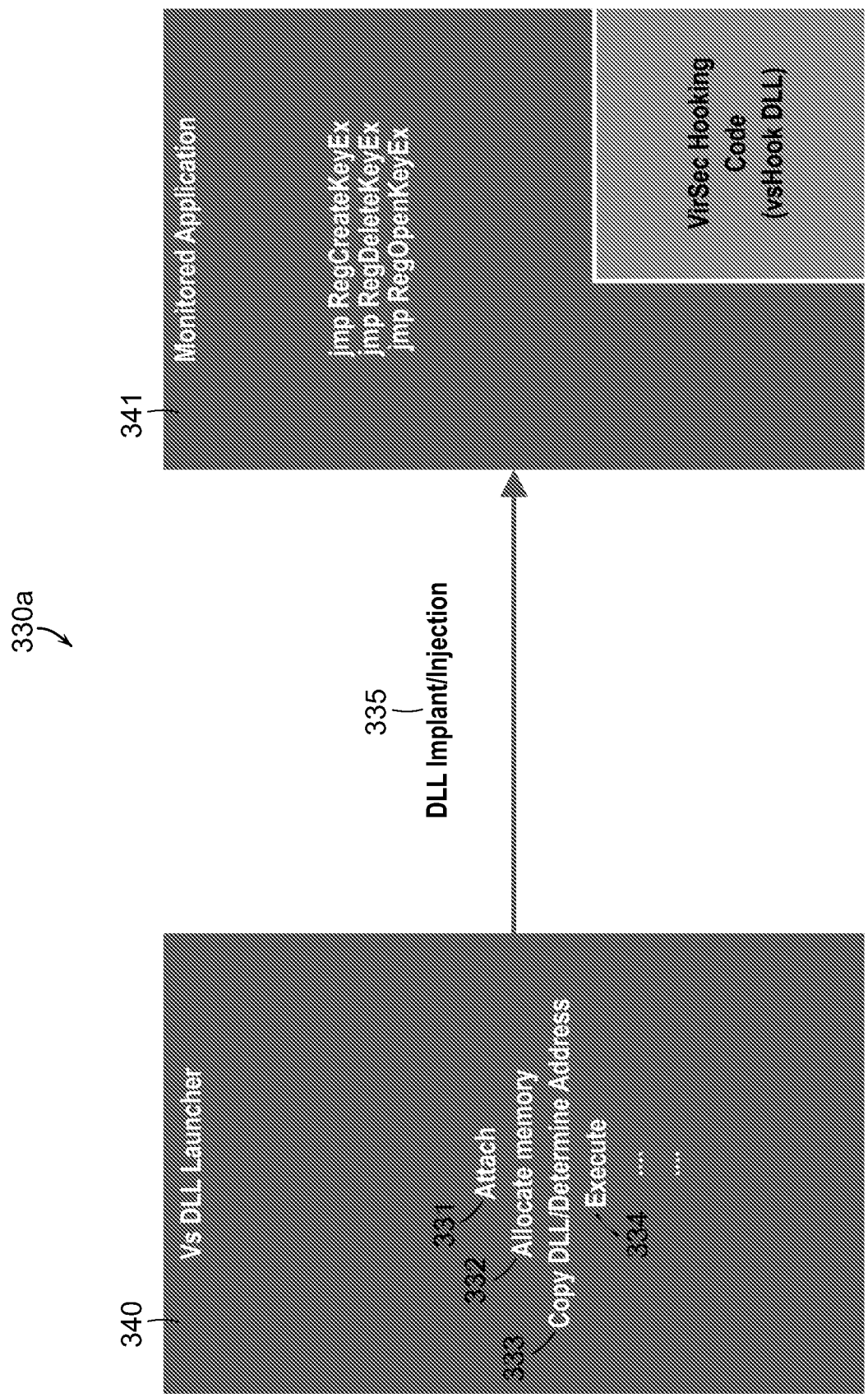
FIGS. 3A-D are block diagrams of example implementations for detecting operations at a customer endpoint in embodiments of the present disclosure.
Figure 3B:
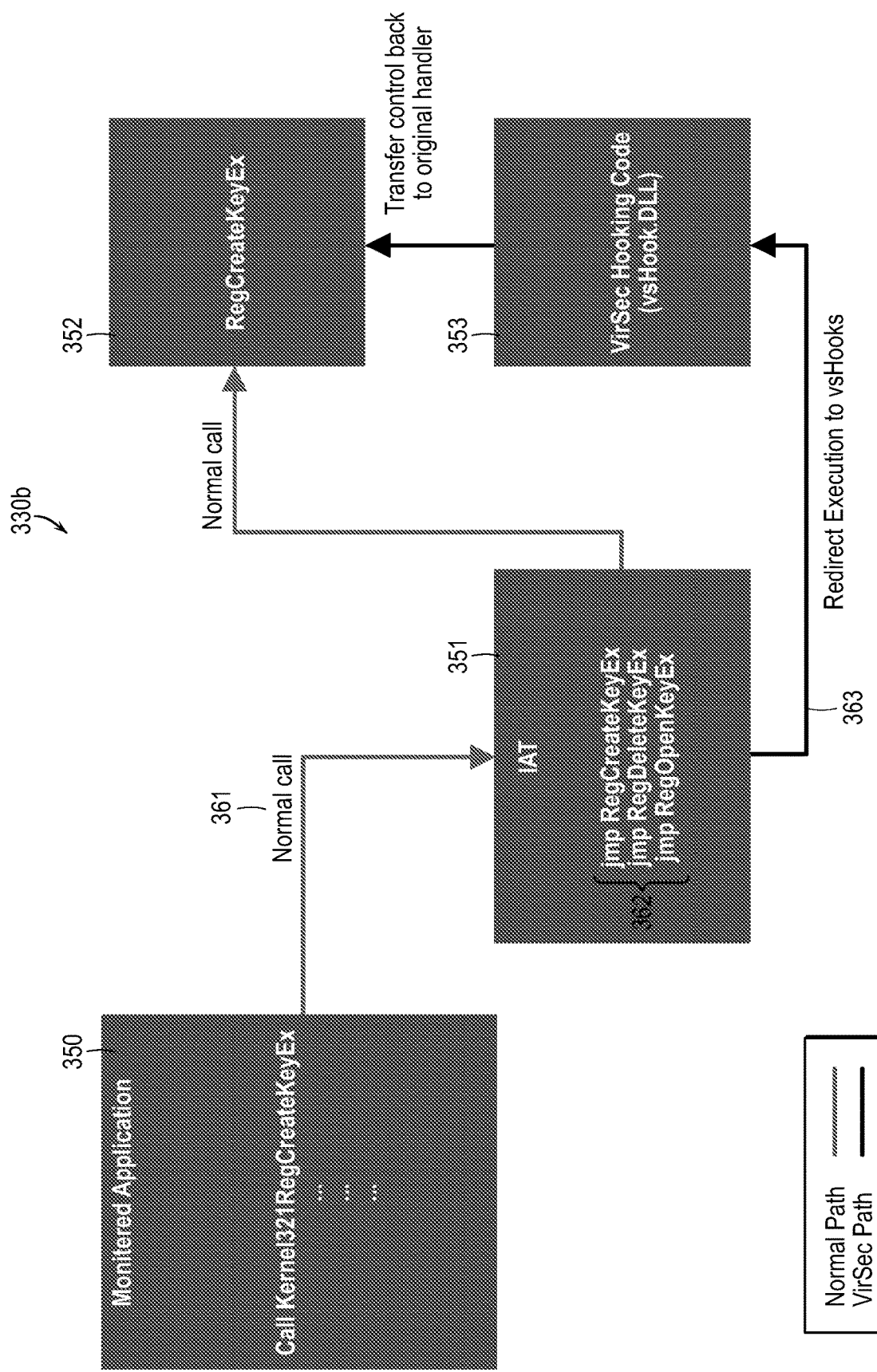

FIGS. 3A-D are block diagrams of example methods 330*a-d* for detecting operations at a customer endpoint 112 in embodiments of the present disclosure. FIGS. 3A and 3B depict API hooking methods 330*a* and 330*b*, respectively, for detecting operations at the customer endpoint 112. As shown in FIG. 3A, the analysis engine 125 installs a DLL launcher 340 at the customer endpoint 112. The DLL launcher 340 attaches 331 the analysis engine 125 to the customer endpoint 112 and allocates 332 memory for the DLL. The DLL launcher then copies 333 the DLL to the allocated memory at a determined address and executes 334 the DLL. The executing DLL implements/injects 335 hooking code, such as a hooking application program interface (API), into a monitored application 341. The hooking code includes all routing mechanisms between the actual interface of the monitored application and the caller.

As shown in FIG. 3B, in the method 330*b*, a function call 361 of the monitored application 350 during runtime would normally execute a jump instruction 362 to the RegCreateKeyEx function of the import address table (IAT) 351. The injected hooking 353 intercepts the instruction and redirects 363 the execution to the hooking code 353 to capture the content of the call and, based on the content, generate events for processing by the RPE 238. The hooking code 353 then transfers control back to the normal RegCreateKeyEx function 352.

In other embodiments, a system calls hooking method may be used for detecting operations at the customer endpoint 112. In these embodiments, the analysis engine 125 instruments system calls to intercept an instruction and extract the calling context information of the intercepted instruction.

Figure 3C:
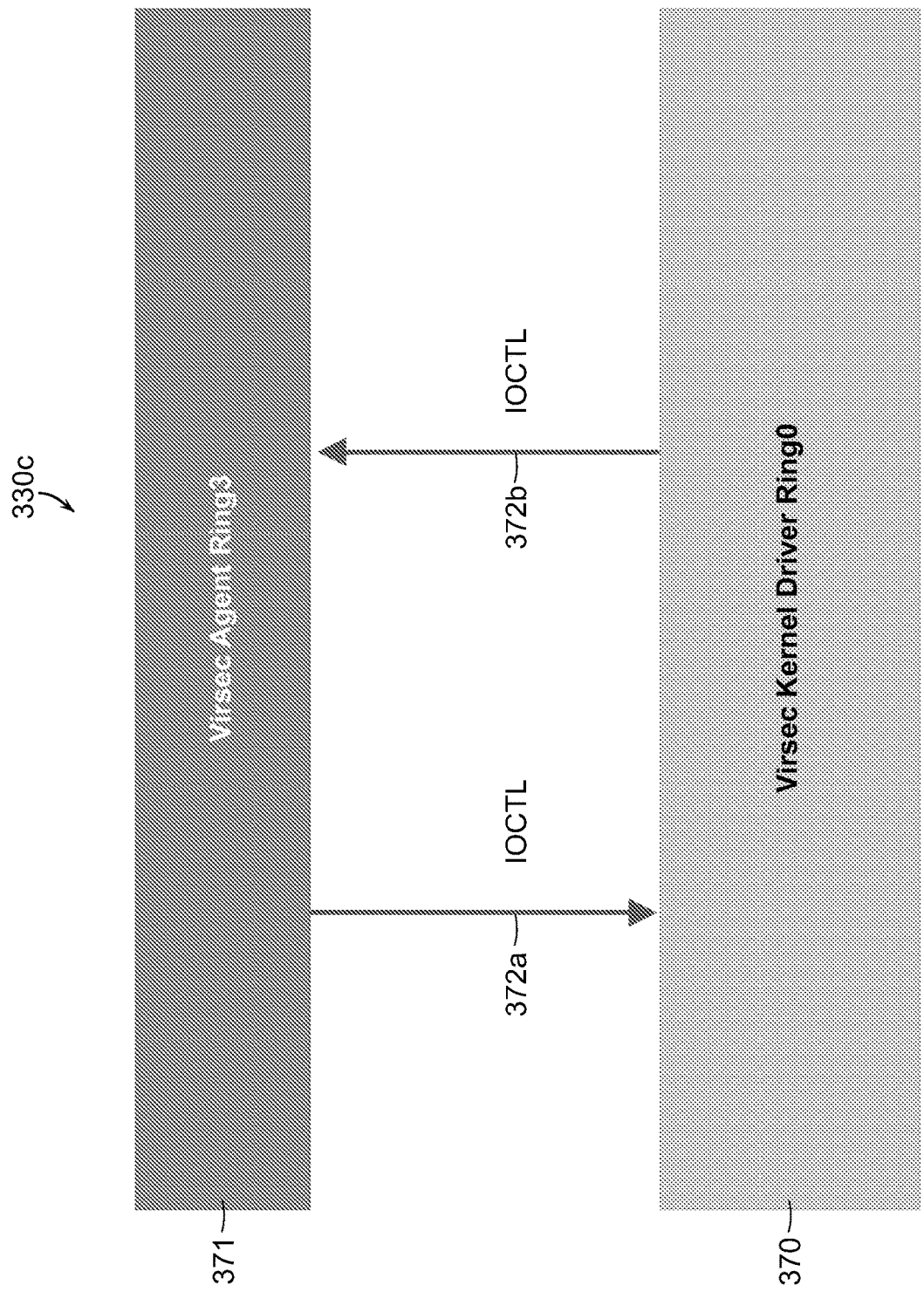

FIG. 3C illustrates a method 330*c* for detecting operations at a customer endpoint 112 in an embodiment. FIG. 3C depicts a ring 0 kernel driver 370 that may be installed at the customer endpoint 112 to detect registry and application process/thread operations. The ring 0 kernel driver 370 registers callbacks provided by the OS (e.g., Windows) subsystem, and receives notifications from the OS subsystem whenever a registry CRUD operation occurs. The ring 0 kernel driver 370 communicates with a ring3 listening agent 371 via IOCTL system calls 372*a-b*. The ring 0 kernel driver 370 synchronously transports the notifications to the ring3 listening agent 371, which listens to the notifications to detect the registry CRUD operations and generate events for processing by the RPE 238.

Figure 3D:
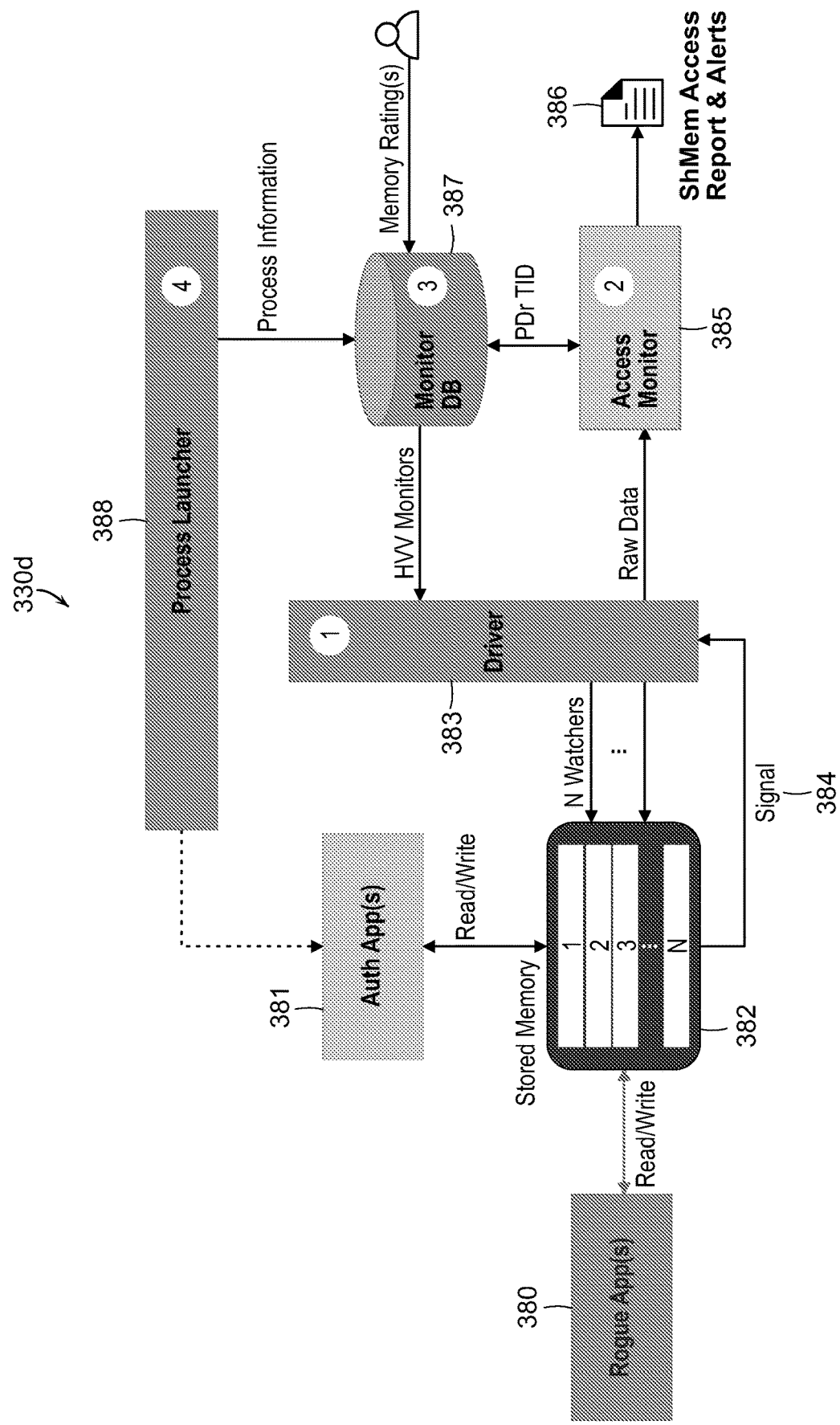

FIG. 3D depicts a method 330*d* of detecting and guarding access by processes and threads to shared memory (or other named memory) regions. An application (such as a rogue application 380 or authentic application 381) may read/write to shared memory 382. An access driver 383 configures memory watchers that monitor a configured range of shared memory regions 382 for operations by untrusted processes. A hardware/software signal 384 of a watcher notifies the driver 383 when one or more pre-specified regions of memory 382 are accessed (read and/or write). For example, the watcher may set a bit in an associated hardware register to put the application in single step mode, and mark a monitored share memory region with read only permission, which causes a signal or exception to be generated when an application process/thread attempts to perform an operation on the shared memory region. Once generated, the watchers may then re-mark the memory region to return write permissions and continued execution of the application process/thread. An access monitor process 385 may record the operation on the shared memory region and validate the operation (memory access). If the operation is not validated, the access monitor may generate reports and alerts 386 on the operation to a user interface. Otherwise, the access monitor 385 may write the application process/thread in a monitored database 387, along with information on the process/thread for the process/thread launcher 388, as a trusted process.

Rule and Callback Processing Structures

Figure 4:
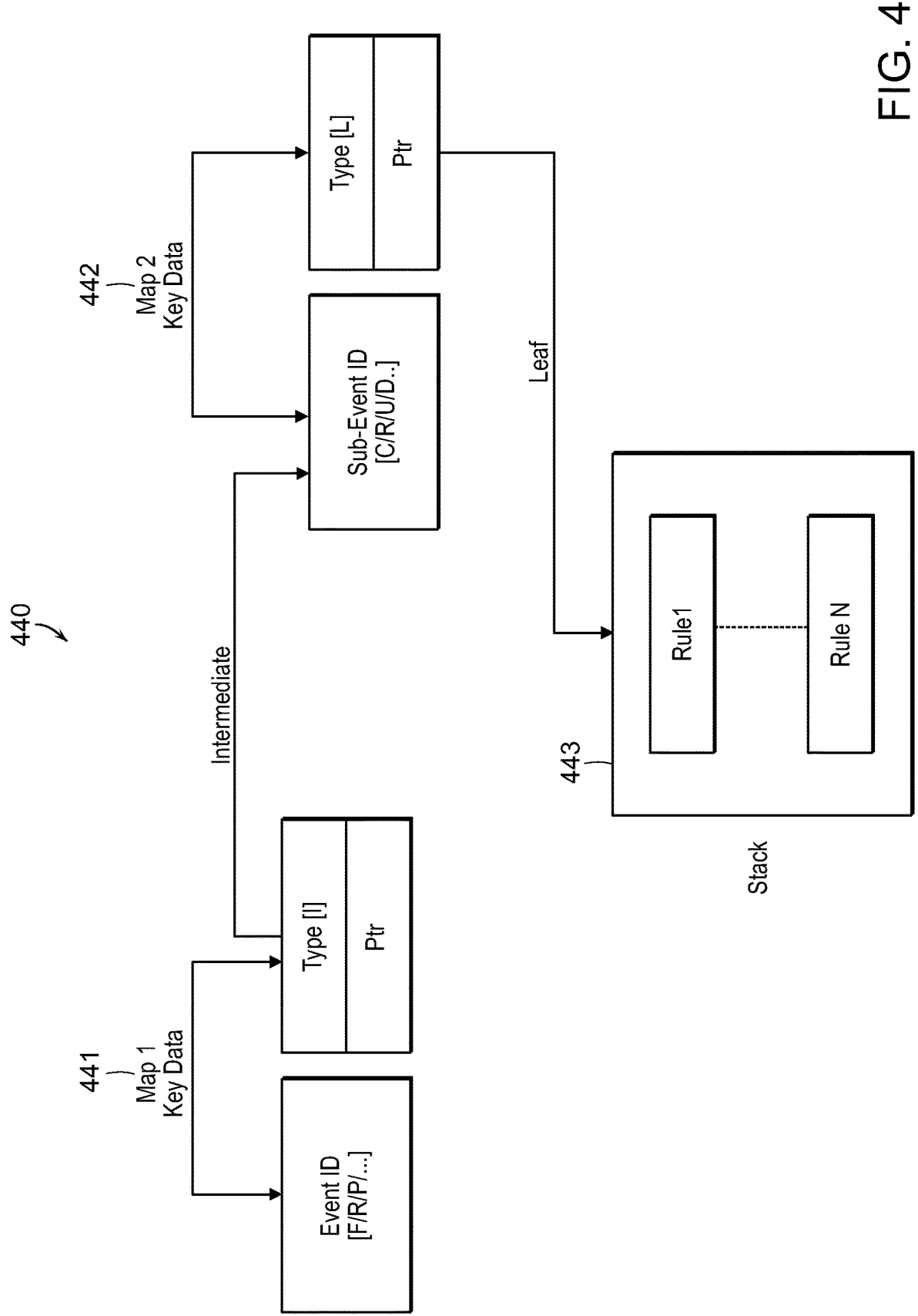
FIG. 4 is a block diagram of example event indexing by a rule processing engine in embodiments of the present disclosure.

FIG. 4 is a block diagram of an example event indexing framework 440 for a rule processing engine, e.g., the RPE 238, in embodiments of the present disclosure. The event indexing of FIG. 4 is a multi-level indexing approach where each node represents <key,value> pair and when the traversal of the indexing reaches a leaf node, the traversal indicates a stack of rules along with policy operands and a callback executable. This is a flexible method of adding events, sub-events, sub-sub-events, and such into the rule processing engine (or blade) 238. These events, sub-events, and such of the rule processing engine (RPE) 238 are configured based on the definition of components for the customer endpoint 112. For example, for a file system of a customer endpoint 112, the rule processing engine 238 may have FILE CREATE (event) and FILE MODIFY (sub-event).

In FIG. 4, each event (e.g., MAP 1 441) can be defined into different classes of event (file system, registry, process, and the like) and sub-event (e.g., MAP 2 442) can be defined in a class based on the CRUD operations. The event classes and subclasses determine the traversal through the multi-level index tables and the resulting leaf node of the traversal indicates a stack of rules expressions 443 to process for the event (441/442) classes/subclasses. The stack of rule expressions 443 are processed by event class callbacks at the callback processing engine 240 to determine outcome/actions to be performed based on the event (441/442) classes/subclasses.

Figure 5A:
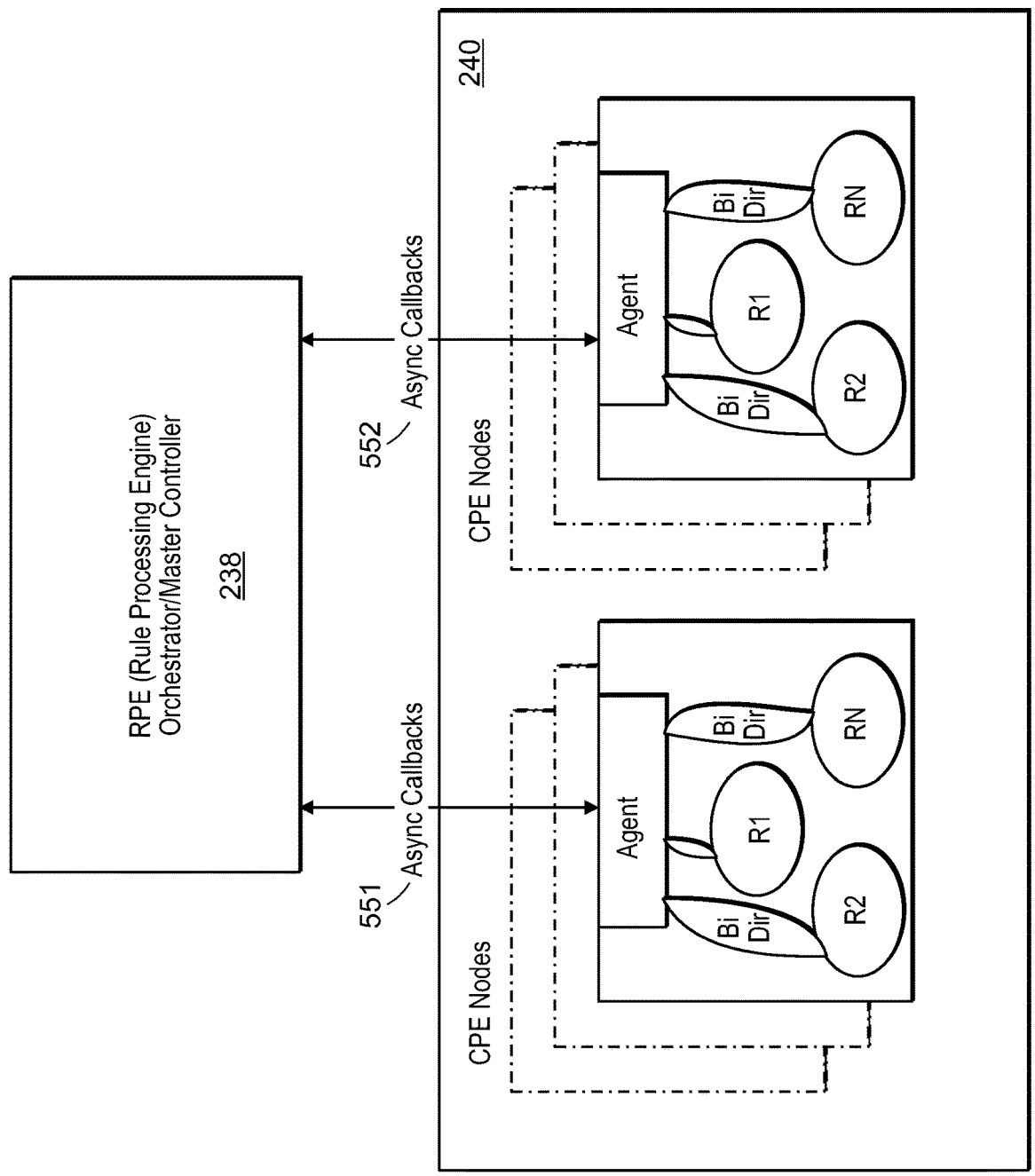
FIGS. 5A-5B are block diagrams of an example rule processing framework in embodiments of the present disclosure.
Figure 5B:
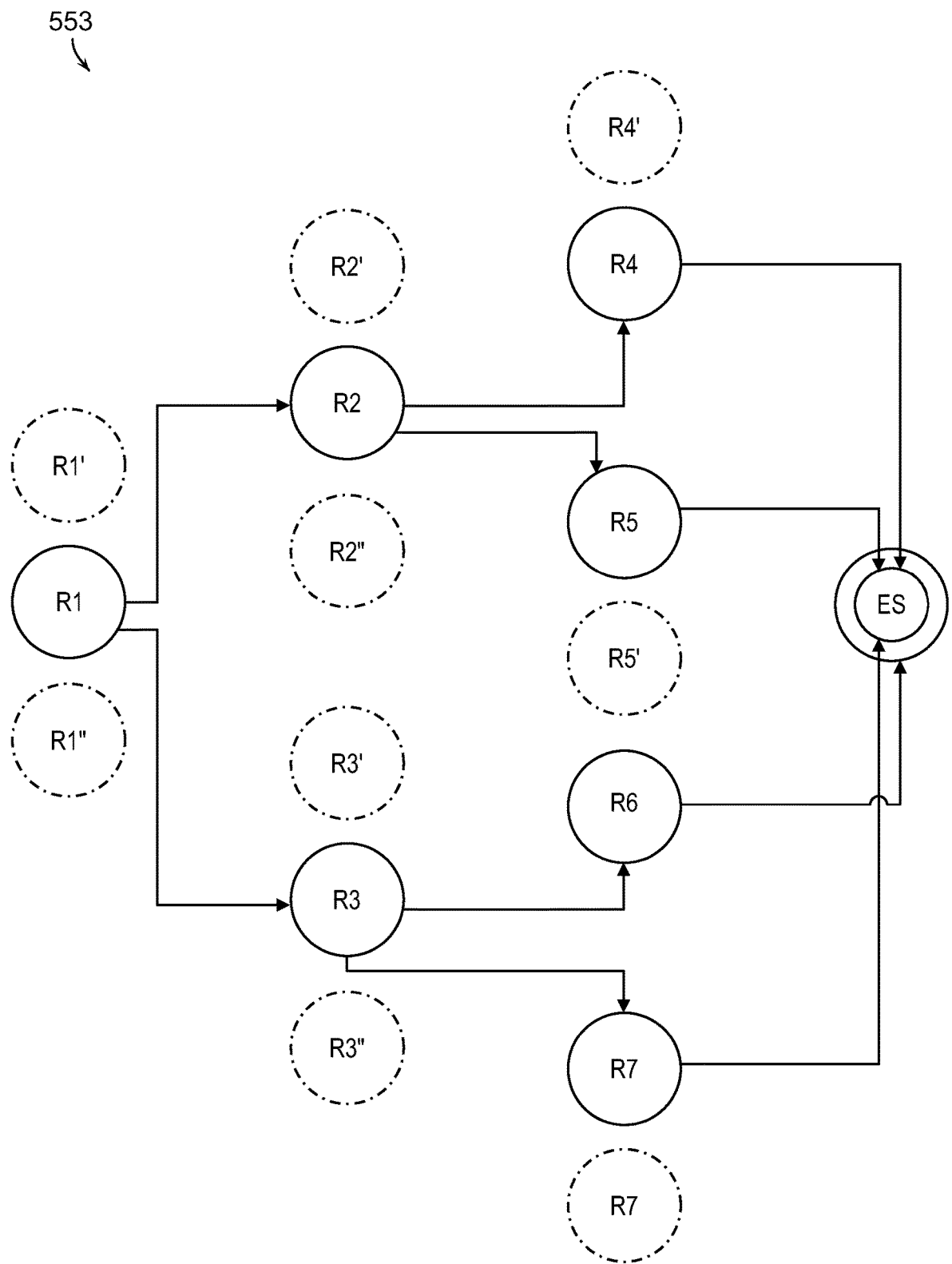

FIG. 5A is a block diagram of an example rule processing framework 550 in embodiments of the present disclosure. In this framework 550, the RPE 238 is the orchestrator/master controller. The RPE 238 asynchronously pushes selected rule-based policies for received events to a CPE cluster of the CPE 240 (as async callbacks 551 and 552). The RPE 238 asynchronously pushes selected rule-based policies to the CPE cluster of the CPE 240 with node graphs embedded. In some embodiments, the RPE 238 performs for the state management of events processed through application of the rules in the pushed rule-based policies. In other embodiments, the CPE 240 performs such state management. In the former embodiments, CPE 240 communicates the newest state of the events processed back to RPE 238 through callbacks 551 and/or 552 so that RPE 238 can maintain the overall tracking and state management of the events. The CPE 240 processes a given event based on the pushed rule-based policies in a cluster at a node according to the embedded node graph, such that each node cluster executes an individual agent to perform the rule processing (e.g., applying R1, R2, through, RN) for the given event. CPE rule graph processing uses an execution pattern defined by the node graph by which events are processed in a distributed and scalable manner. FIG. 5B depicts a CPE cluster instance 553 that processes an event (via the rules of a rule-based policy) according to a load balanced and scalable implementation.

Distributed Platform Implementation

Figure 6:
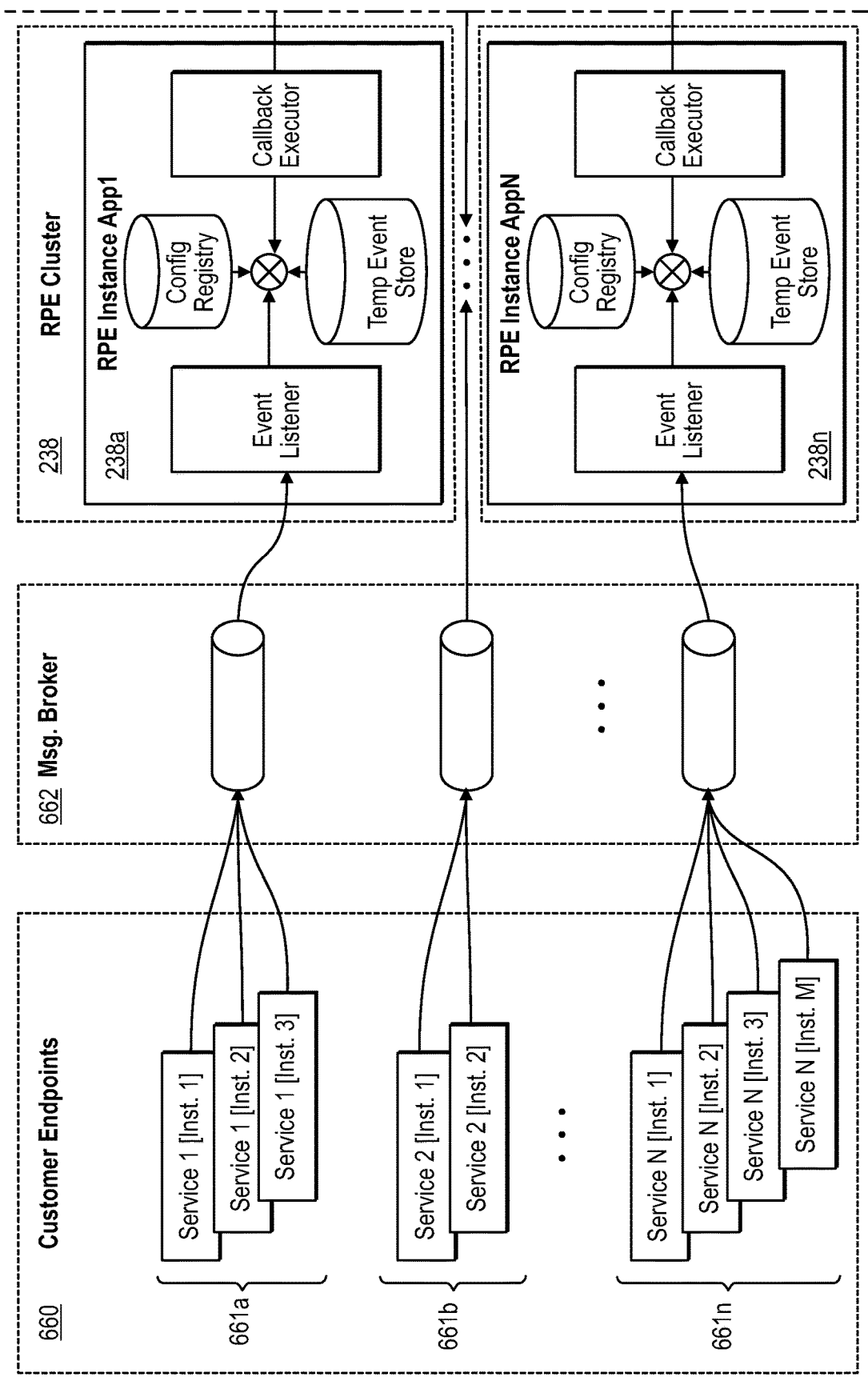
FIG. 6 is a block diagram of a distributed, load balancing implementation of the platform architecture of FIG. 2.
Figure 6:
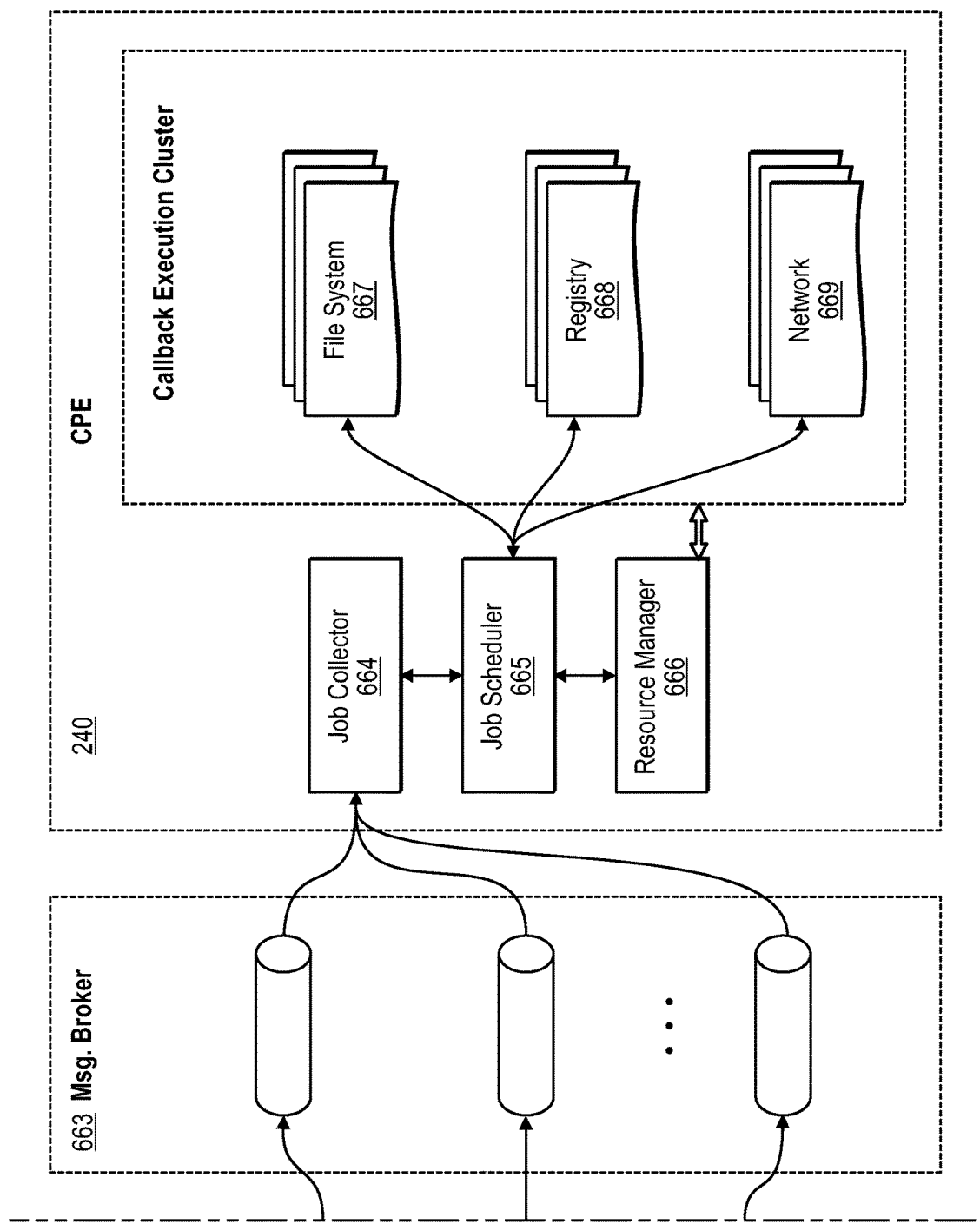

FIG. 6 is a block diagram of a distributed, load balancing implementation 600 of the platform architecture of FIG. 2. In FIG. 6, multiple customer endpoints 660 are grouped by the type of service performed by the customer endpoints 660. Each service 661a, 661b, 661n is comprised of one or more service instances. The detected and generated events (e.g., CRUD events) generated for each service 661a, 661b, 661n are pushed onto a first message broker 662, which is a highly scalable and distributed event handler that asynchronously processes high volumes of events of a service in real-time. From a first message broker 662, the events of a service are consumed by an instance, e.g., 238a-n, of the RPE 238. The RPE 238 is bootstrapped with a set of rules (e.g., rule-based policies) which are applicable to one or more types of service. As an event of a service is received, an RPE instance 238a-n checks if any of the policies configured at the RPE 238 are applicable. If none of the configured policies apply, the RPE instance, e.g. 238a-n, ignores the service event.

If one or more policies apply, an RPE instance (238a-n) pushes the service event onto a second message broker 663, which is also a highly scalable and distributed event handler (pipeline) that asynchronously processes high volumes of events of a service in real-time. The RPE instance pushes the service event, along with the application policies and computed cluster node graphs to execute the policy rules. From a second message broker 663, the service event (along with policies and cluster node graph) is consumed by the CPE 240. The CPE 240 queues and processes the consumed service events using a job collector 664, job scheduler 665, and resource manager 666 architecture. Based on the cluster node graphs, the CPE 240 can select the correct execution node and cluster agent to be used to execute the policy rules for the policy event (e.g., file system 667, registry 668, network 669, and such). When all the rules for a policy are executed and correlated, the result is published to a micro-protection engine 253 for taking further protection actions at the appropriate customer endpoint or to a macro-protection engine 251 for taking further protection actions at an external system. The protection actions taken by the micro-protection engine include: terminating one or more processes associated with the operation, terminating one or more threads associated with the operation, removing injected libraries from memory, terminating or disabling a web session associated with the operation, deleting the one or more affected compute components from disk, moving one or more affected compute instances to a quarantine area, restoring a valid copy of the one or more affected compute components, loading one or more patches to remedy the one or more affected compute components, reporting the operation and the one or more affected compute components, and calling one or more arbitrary user provided custom callbacks. The protection actions taken by the macro-protection engine include: shutting down virtual machines of the external system, reporting information related to the operation to the external system, invoking application program interfaces (APIs) to external entities, including at least one of: a router, firewall, packet capture machine, file back device, and such; and performing quarantine actions across the external system, including at least one of collecting logs of the virtual machines, migrating virtual machines to honeypot subnet, and observing behavior of the virtual machines by collecting data from computer network.

Infrastructure Hardening DataBase (IHDB) Design

Herein below, in relation to FIGS. 7-11, functionality and implementation details are provided for a database, e.g., a Virsec Infrastructure Hardening Database (VIHDB), that is implemented and employed in embodiments. In an example embodiment, the IHDB is used for storing the policies which are built at either by a security platform provider, e.g., Virsec central policy management system, or at user's central policy management system as depicted in FIG. 12. These IHDBs are used for setting up and provisioning the policies on the user's servers. Further details regarding embodiments of the IHDB are described herein below.

In relation to FIGS. 7-11, condition refers to a conditional statement (such as a conditional statement of STIGs) which results in an outcome. According to an embodiment, each condition has its own set of parameters and an action to be performed on them. Moreover, according to an embodiment, rules are statements presented by a user, e.g., customer which are the conditional statements explained in English language (English language representation of the conditional statements). Rules specify a protection action to take place depending on the outcomes of specified conditions. In an embodiment, action is a task that is performed (by checking the conditions) to obtain an outcome, i.e., finding. Findings are the outcome of an action. A finding is the result set of a condition evaluation specified by a user. According to an embodiment, region is the location where an action is performed. Regions can be a file for a file system event, a registry hive for a registry event, or operations on any process for a process event. According to an embodiment, the region depends on the actions that need to take place.

Figure 7:
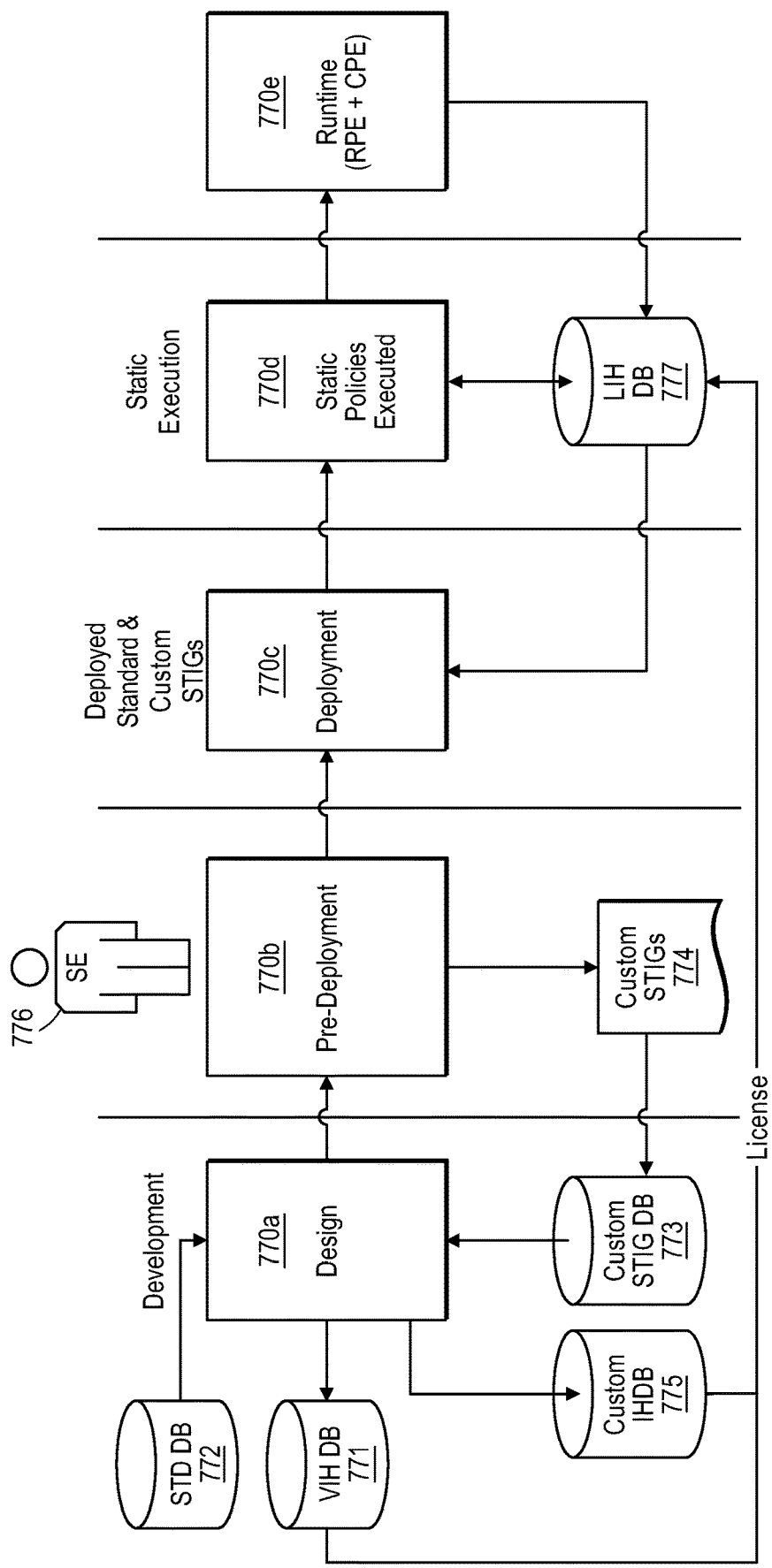
FIG. 7 is a block diagram showing stages of Infrastructure Hardening Database (IHDB) functionality that is implemented in embodiments of the present disclosure.

FIG. 7 is a block diagram illustrating stages 770a-e involved in an infrastructure hardening database (IHDB) according to an embodiment. The design stage 770a is generally handled by developers, e.g., an engineering team providing the IHDB. In the design stage 770a, benchmarks are turned into actionable STIGs, developer recommendations are turned into actionable STIGs, and policies are extracted from the STIG DB 772 and custom STIG DB 773. Further, in the design stage 770a, policies are added into the Virsec Infrastructure Hardening Database (VIHDB) 771 and policies are broken into sets of rules and rules are broken into conditions. Further still, in the design stage 770a, final actions for each rule are set-up. In the design stage 770a, STIGs are defined and stored as PDFs in a Standard STIG Document Database (STDDB) 772. The design phase 770a creates an XML/JSON format of the STIGs and stores the XML/JSON format of the STIGS in the VIHDB 771, i.e., policy database. The design phase 770a may also process custom STIGs, which are customer specific STIG documents 774 provided by customers and stored in the customer specific STIGs database 773. The design stage 770a may also configure the custom IHDB 775 which is an IHDB with added custom STIG policies.

In the pre-deployment stage, a provider of the IHDB, e.g., a sales engineer 776, interacts with a customer and collects STIGS 774 if there are any more STIGs 774 that are required to be added specifically by the customer.

The deployment stage 770c is the stage where a security platform according to an embodiment, e.g., the platform 200, is deployed on a customer's application and a local repository of an infrastructure hardening database and a local infrastructure hardening database 777 are created.

In embodiments, there can be policies which are to be executed before runtime events are triggered. For example, checking and changing basic settings in a httpd.conf file before any of the events access the file. In the static stage 770d, such policies (policies that should be executed before runtime) are executed.

During the runtime stage 770e, the customer's application with installed security platform, e.g., the platform 200, starts running with a customer's data. In the run time stage 770e, triggered OS events are matched against the created policies and a final action is carried out on all satisfied events.

Figure 8:
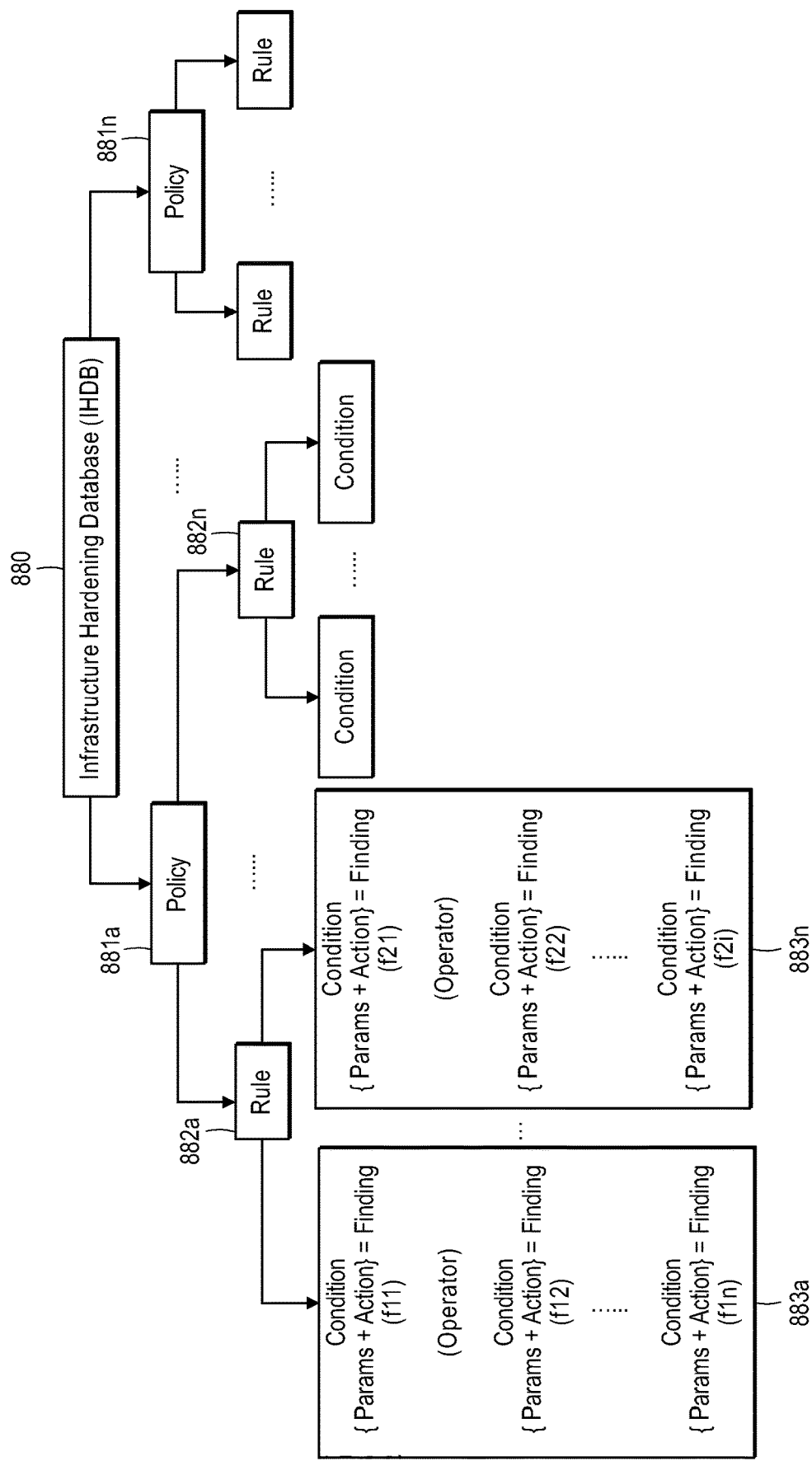
FIG. 8 is a block diagram depicting a policy schema implemented in embodiments.

FIG. 8 is a block diagram depicting a policy schema implemented in embodiments. The infrastructure hardening database 880 comprises multiple policies 881a-n. Each policy 881a-n can be considered as a STIG. A single policy, e.g., policy 881a, can have multiple rules, e.g., the rules 882a-n, and a single rule, e.g., 882a, can have one or more conditions, e.g., 883a-n. Each condition is associated with a set of parameters, an action, and a region. In an embodiment, a region can be either a file, process, or any registry hive, on which the action is to be performed. The parameters can be event operands (provided during runtime) as well as policy operands (provided by the policy) or a combination of both event operands and policy operands. The outcome of the actions are findings and a decision is to be made depending on the outcome. A final finding is a finding which decides whether a customer specified final action is to be performed or not.

Figure 9:
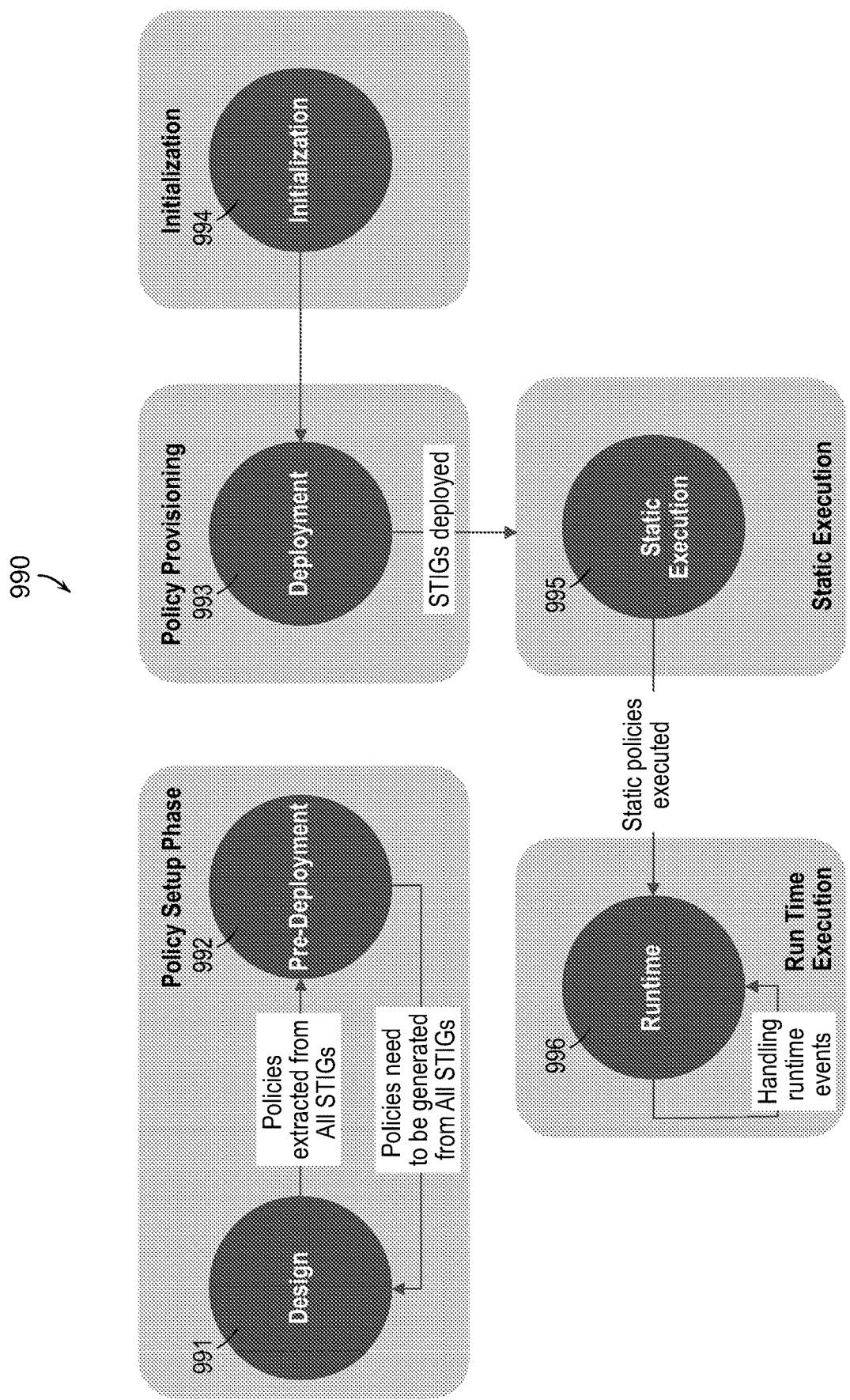
FIG. 9 is diagram of a state machine illustrating the workflow of a security platform according to an embodiment.
Figure 10:
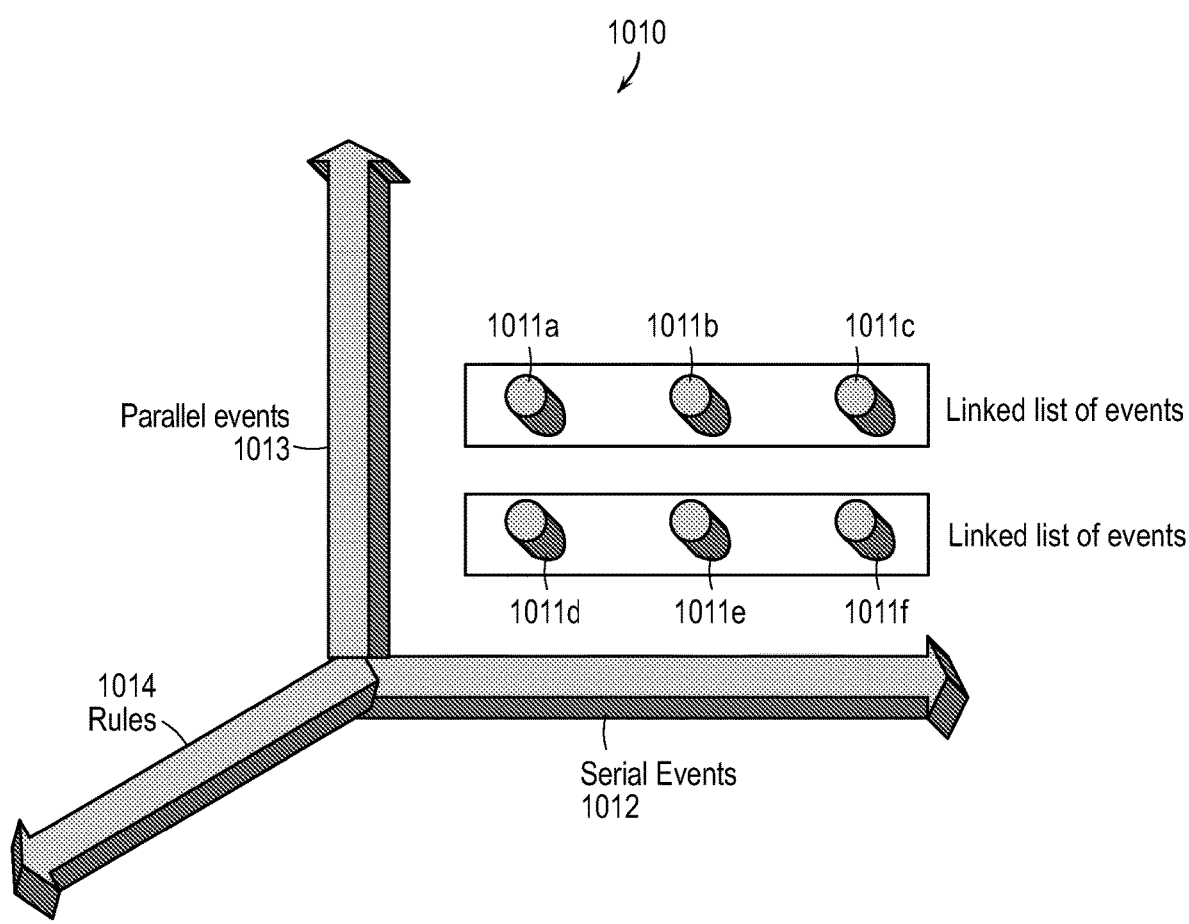
FIG. 10 is a graph depicting aspects of rules employed in embodiments.

FIG. 9 is diagram of a state machine illustrating a workflow 990 of a Trusted Execution Security Policy Platform (TESPP) according to an embodiment. The design, i.e., policy set-up, state 991 is responsible for creating policies from all available STIG STDs. The STIGs can be from benchmarks like CIS (Center for Internet Security) or custom STIGs from a provider of the security platform. Once the policies are created, they are stored into an infrastructure hardening database, e.g., the VIH DB 771.

During the design state 991, there is also a requirement to setup the graph 1010 for each rule 1014 within a policy. In the graph 1010, each circle 1011a-f signifies a single event that is required to be triggered, before applying the policy associated with the event. In embodiments, some events involve order, and some do not. This is depicted in the graph 1010 as serial events 1012 and parallel events 1013.

The parallel events axis 1013 indicates that the events are required to occur, but may occur out of order before applying the policy. The serial events 1012 are the exact opposite. The serial events 1012 must be triggered in the same order (from left to right or vice versa, however defined) and when the events occur out of order, during runtime, the chain has to be dropped, and the execution waits for the same chain to start all over again. Once, all the events are triggered, the policy execution takes place. In the setup state 991, the graph 1010 is setup and the runtime state 996 is involved in checking the order of events triggered.

Returning to FIG. 9, in the pre-deployment state 992, a provider of the security platform, e.g., a sales engineer, interacts with a user of the security platform, e.g., a customer, to gather any customer specific STIGs. These customer specific STIGs are sent back to the design state 991 where policies are generated out of the customer specific STIGs. These policies are added into the VIH DB. This cycle continues until all customer specified STIGs are added to an infrastructure hardening database, e.g., the VIH DB 771.

During the deployment state 993, the policies are deployed on to the customer application server instance and a local repository of an infrastructure database, e.g., the LIH DB 777, is created. The initialization state 994 represents the initialization or bootstrapping of various components of embodiments of the security platform, such as the application server instance (ASI), central policy manager (CPM), and RPE/CPE. Further details of the initialization state 994 are described hereinbelow in relation to FIGS. 16, 17, and 18. Once the policies are deployed, next, in the static execution state 995, policies that are to be executed before entering the runtime state 996 are executed. In the run time state 996, the security platform, according to an embodiment, is implemented for a user's application and events are matched against created policies and actions to be taken in response to events are determined and carried out. Further details regarding the runtime state 996 are described hereinbelow in relation to FIG. 11.

Figure 11:
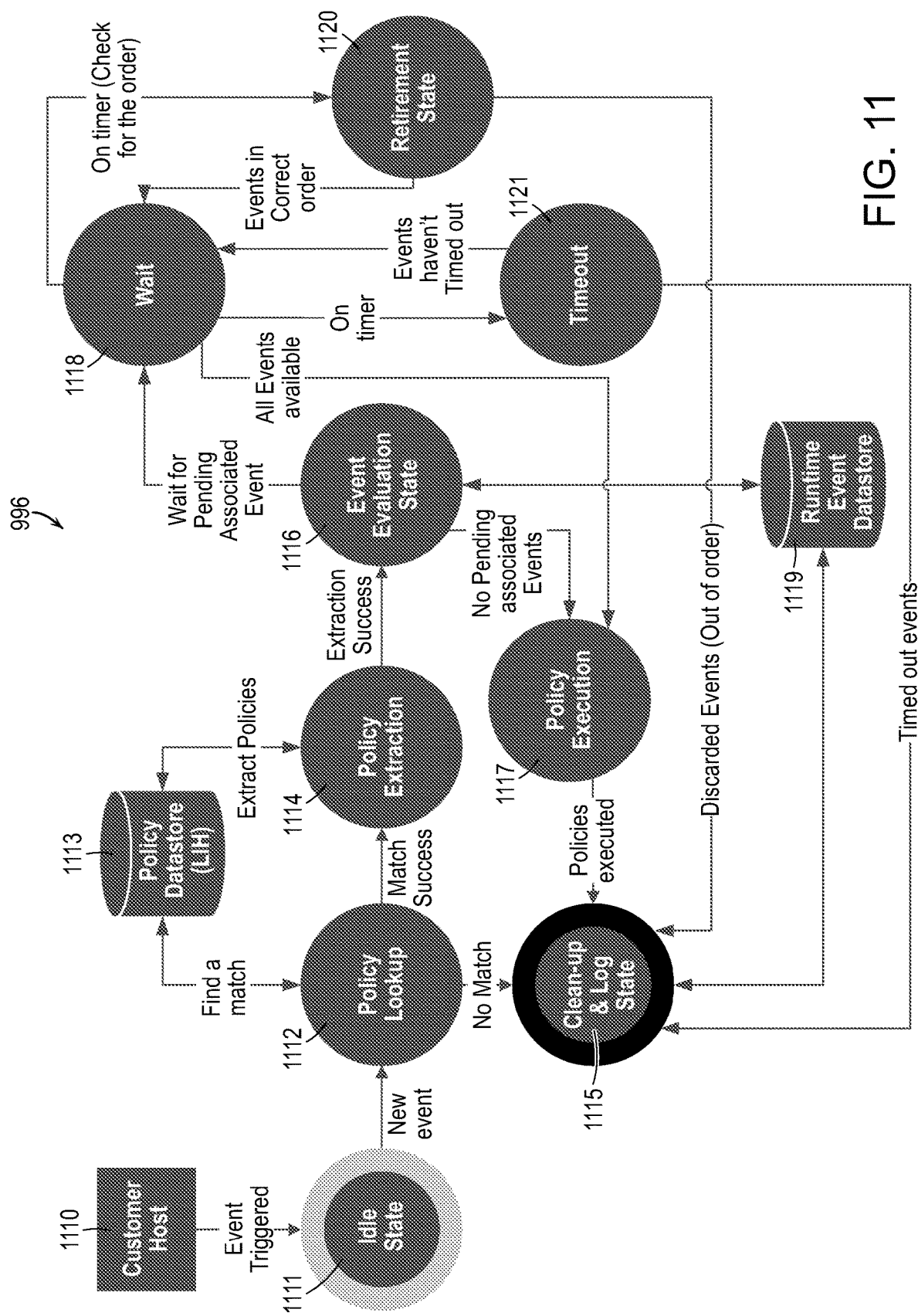
FIG. 11 is a diagram of a state machine illustrating runtime functionality of an embodiment.
Figure 12:
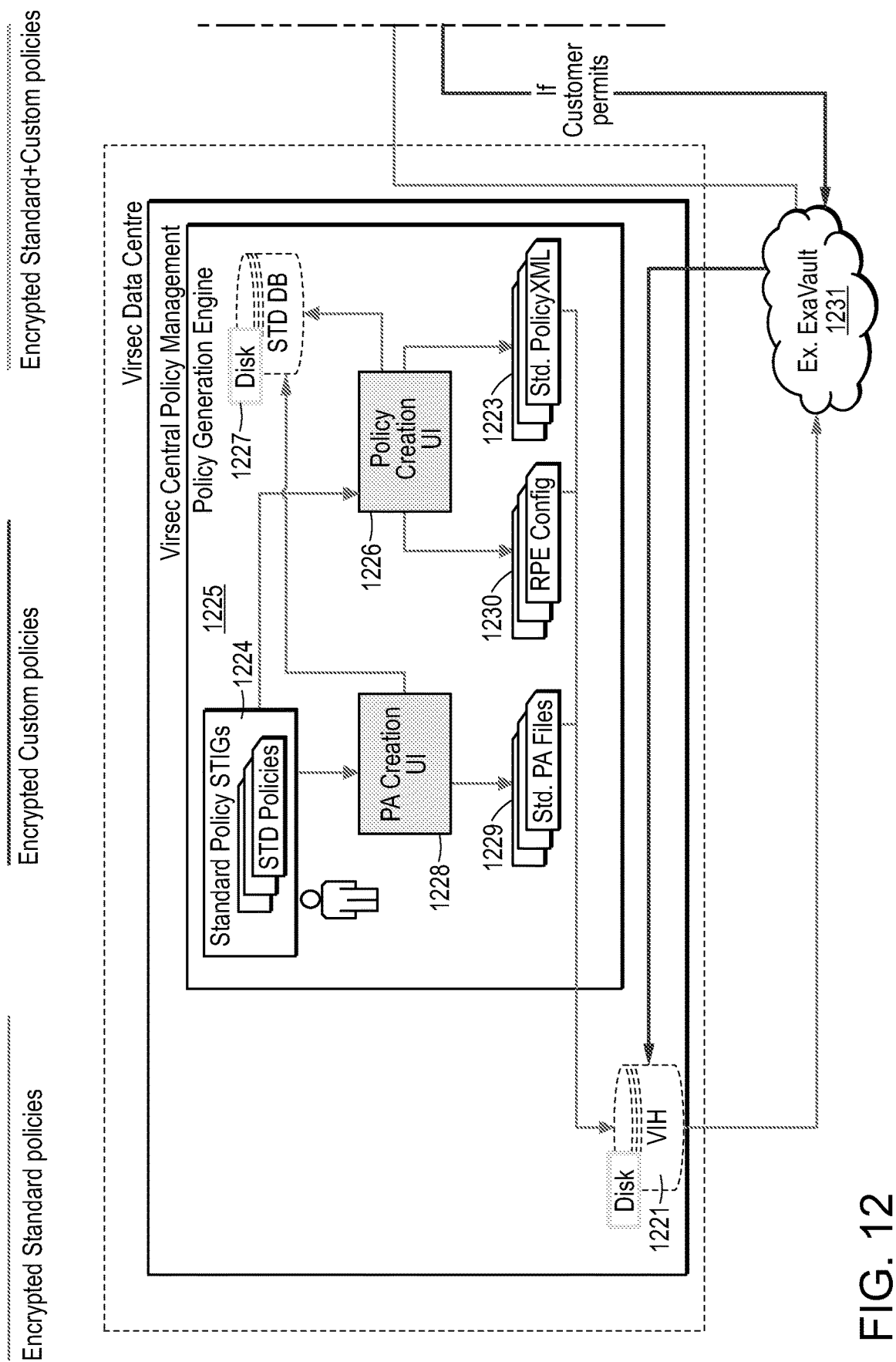
FIG. 12 is a block diagram of a set-up phase of a security platform according to an embodiment.
Figure 12:
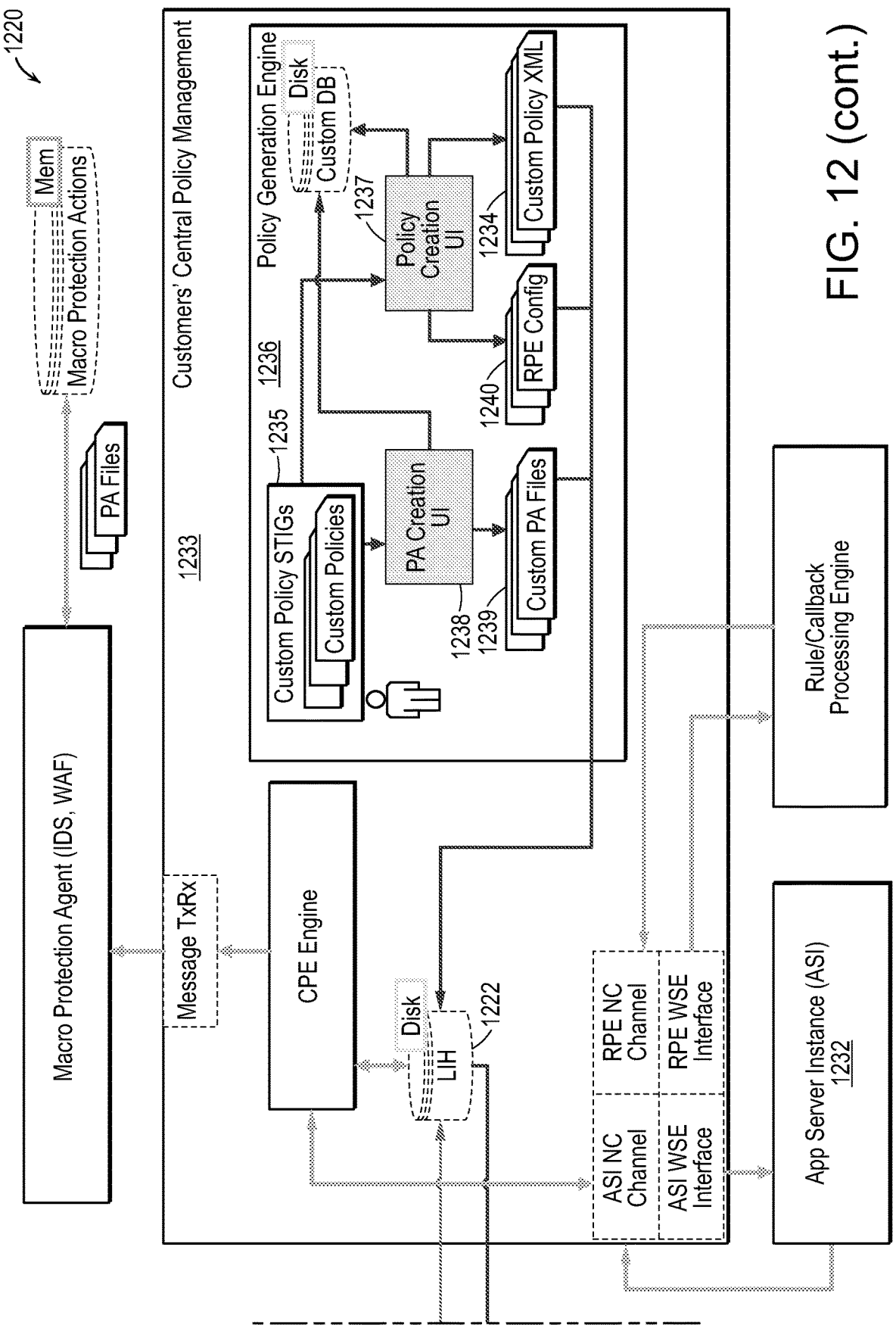

FIG. 11 is a diagram of a state machine illustrating runtime functionality 996 of an embodiment. The state machine of FIG. 11 illustrates the states that are involved when an event is triggered during runtime 996.

In FIG. 11, the customer host 1110 represents the platform which is responsible for the occurrence of the event. When an event is triggered, it reaches the idle state 1111 (Start State) where the new event is directly forwarded to a policy lookup state 1112. At the policy lookup state 1112, the forwarded event is now looked up against the policy datastore (LIH) 1113 for a match. If an entry is found, the event data is sent to a policy extraction state 1114. If no entry is found in the policy lookup sate 1112, then the event is not an interested event and the clean-up and log state 1115 is entered whereby a log is sent to the central management server (CMS) which will terminate the thread. The policy extraction state 1114 is responsible for extracting all associated policies and sending the extracted policies to the event evaluation state 1116. In embodiments, a single event may be involved with multiple policies and, thus, at the policy extraction state 1114, all of the associated policies are extracted.

At the event evaluation state 1116, a check is conducted to ensure all associated events with the policies have occurred or if there are any events that are yet to be triggered to execute the policy. If there are no such waiting events, the event operands along with policy operands are passed on to the policy execution state 1117. If there is an event that is yet to be triggered, the "waiting" event is sent to wait state 1118 and an entry for the "waited for" event is created in a runtime event datastore 1119. The datastore 1119 is cleared once all the events in the datastore 1119 are triggered. Whenever a new event is triggered after passing the policy extraction state 1114, the event is matched with the events in the runtime event datastore 1119.

According to an embodiment, the runtime event datastore 1119 can be considered as a cache memory for processing policies. When a current event is being processed to execute a policy and there are other events that are interdependent from the current event, an entry is created in the datastore 1119 containing a policy ID with an associated bitmask to indicate all the dependent events. Whenever a new event is triggered and reaches the event evaluation state 1116, the new event is matched against the runtime event datastore 1119, if an entry is found for the current event and the associated bitmask is set. Once, all the bits in the bitmask are set, it indicates that all the events have occurred, and the policy can be executed.

During the wait state 1118, unless all the required events for the policy are triggered, the policy execution is halted in the wait state 1118. In a timely manner, the current execution thread is passed through a retirement state 1120 and a timeout state 1121. In an embodiment, there is a timer associated with the retirement state 1120 by which the RPE expects the events to arrive and this information is embedded into the policy design stage. Whenever a new event is triggered, it is matched against the runtime event datastore 1119 and if all the events have occurred, the current execution thread reaches the policy execution state 1117 from the wait state 1118.

In embodiments, there can be situations wherein the order of execution of events is to be maintained. The retirement state 1120 is responsible for checking whether the events that have occurred, occurred in accordance with the specified order of execution. The process of determining whether events have occurred in a specified order takes place on a timer. Whenever events are triggered out of order, the events are sent to the clean-up and log state 1115 where respective entries for the events are removed from the runtime event datastore 1119. No such action takes place when all the events have occurred in the correct order. The wait time involved with each event is verified in the timeout state 1121. When a predefined time comes to an end for an event, and all the required events have not occurred, then, the current thread is sent to the clean-up and log state 1115.

There is a possibility of the following outcomes when execution is in the retirement state 1120 or timeout state 1121: (i) all events occurred in the order as specified in the design state within the timeout period and, then, the policy is executed in the policy execution state 1117, (ii) all events occurred out of the order as specified in the design state within the timeout period and, then, the series of events which occurred out of order are sent to the clean-up and log state 1115, (iii) only partial events occurred in the order as specified in the design state within the timeout period and, then, the execution is still in the wait state 1118 waiting for all other events to occur, (iv) only partial events occurred out of order as specified in the design state within the timeout period and, then, the chain of serial events that occurred out of order are sent to the clean-up and log state 1115, or (v) any of the above cases occur after timeout and, then, the parallel/serial events are sent to the clean-up and log state 1115.

The policy execution state 1117 is responsible for executing the protection actions associated with the rules. Protection actions executed in the policy execution state 1117 act on policy operands and event operands. Below is an example STIG that may be employed in embodiments.

Sample STIG 6 (RunTime Policy Process Verification):

A) Overview

This rule is on a process runtime event.
Rule: Any newly launched scripts should have the verification done in the system.

| Finding ID | Version | Rule ID | IA Controls | Severity |
|---|---|---|---|---|
| V-xxxx | WINAU-100102 | xxxx_rule | | Medium |
| STIG | | Date | | |
| Virsec Standard Policy | | 2018-xx-xx | | |

| Description |
|---|
| Verification failure of the process will result in a termination action determined by the security platform. |

| Details |
|---|
| Rule
At runtime, for any process that is launched, a security policy engine will identify the command line arguments to check any script launches and will try to establish verification status of the script launched through FSR interface. Based on the verification it will determine the action to be performed.
Protection Action
Security policy engine will determine the verification and will terminate the process. |

Conditional Statements

| |
|---|
| If ( (Process Command Line Path EQUAL *.script ) {
    If( SUCCESS == (FSR Verification (*.Script)) {
        Log( );
        Return;
    }
    Else {
        Log( );
        ProtectionAction (Kill, ProtectionAction Operands);
        Return;
    }
} |

The clean-up and log state 1115 is responsible for deallocating any memory that is allocated for findings, runtime event datastore, terminating the thread, and logging the current execution details to the central management server.

Design Architecture

FIG. 12 is a block diagram of a set-up phase of a security platform 1220 according to an embodiment. According to an embodiment, the setup phase includes setting the VIH (Virsec Infrastructure Hardening) database 1221 and LIH (Local Infrastructure Hardening) database 1222 at a user's location. In the set-up, XML structures of the standard policies 1223 are generated from benchmarks like CIS or any provider recommended STIGs 1224.

According to an embodiment, copies, e.g., PDF copies, of the policies are inputted to the policy generation engine 1225 using a policy creation user interface 1226. These policies are saved into a standard database 1227 which holds the copies of the policies. Similarly, there is a user interface 1228 to input any protection actions that can be handled from a data center and these protection actions can be stored in the database 1227. The protection files 1229, policy XML files 1223, and RPE configuration files 1230 are generated from the policy generation engine 1225 and these files are stored in the VIH 1221. When, there are new entries into the VIH 1221, the entries are pushed through the cloud 1231 to the LIH 1222 at the user's local data center.

Similarly, during the set-up phase of the security platform, a user, e.g., customer, may suggest custom STIGs which pertain to the customer application service instance 1232 and the customer is not willing to share the STIGs with the provider of the platform 1220. Hence, a similar architecture is present on the customers' data center 1233 which produces custom policy XMLs 1234. A representative from the user inputs all the custom policies 1235 and protection actions into the policy generation engine 1236 via the policy creation UI 1237 and protection creation engine UI 1238 which produces the protection action files 1239, custom policy XML files 1234, and RPE config files 1240. The files 1239, 1240, and 1234 are stored in the LIH 1222. If the customer is willing to share the files with the provider of the platform 1220, the files are pushed through the cloud 1231 into the VIH 1221. If the user does not want to share the files 1239, 1240, and 1234, only the LIH 1222 holds both the standard and custom policies. According to an embodiment, these policies are encrypted before writing to the disks (1221 and 1222) to make sure the policies are protected from any internal/external attacks. Once the VIH 1221 and LIH 1222 are updated with required policies and protection actions, the system 1220 is now ready to start provisioning.

Figure 13:
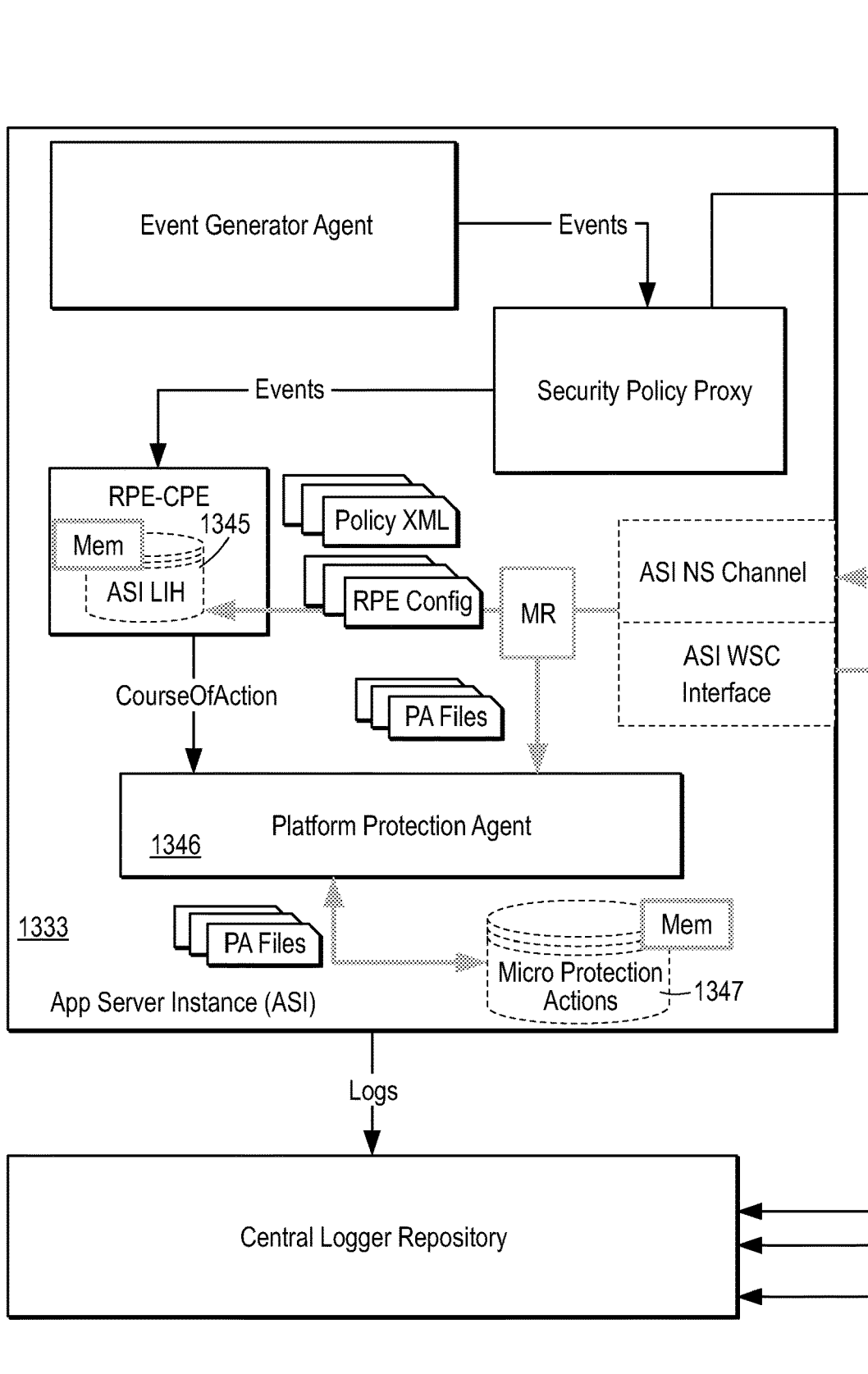
FIG. 13 is a block diagram illustrating the policy provisioning stage of a security platform according to an embodiment.
Figure 13:
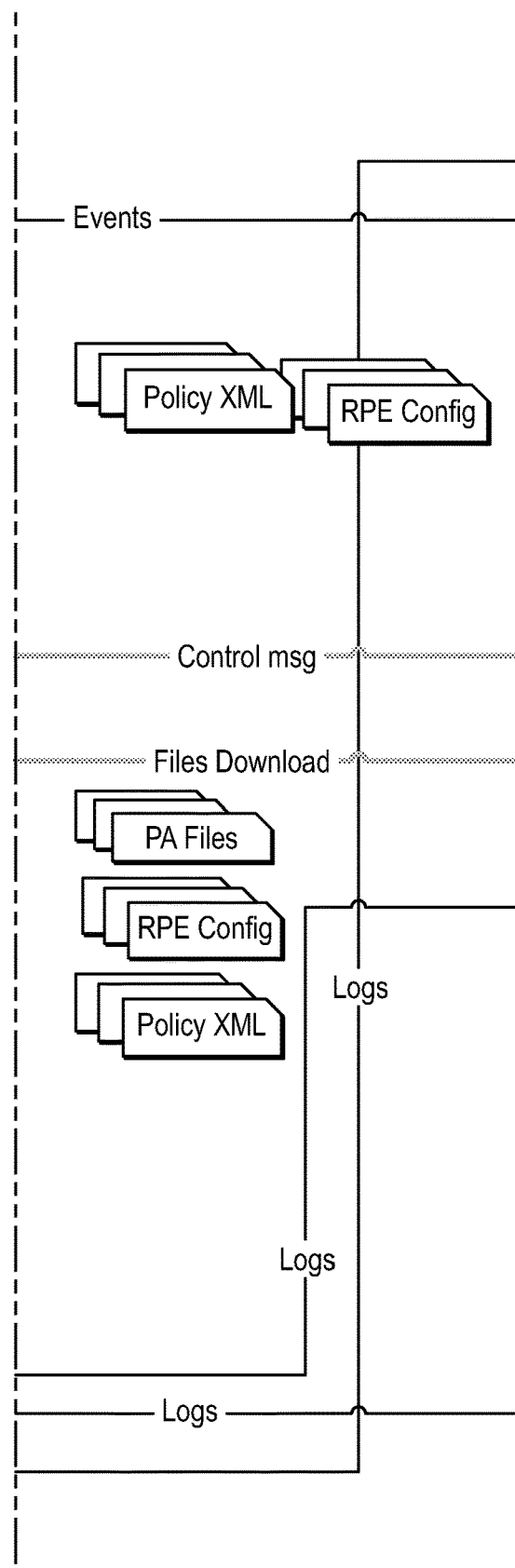
Figure 13:
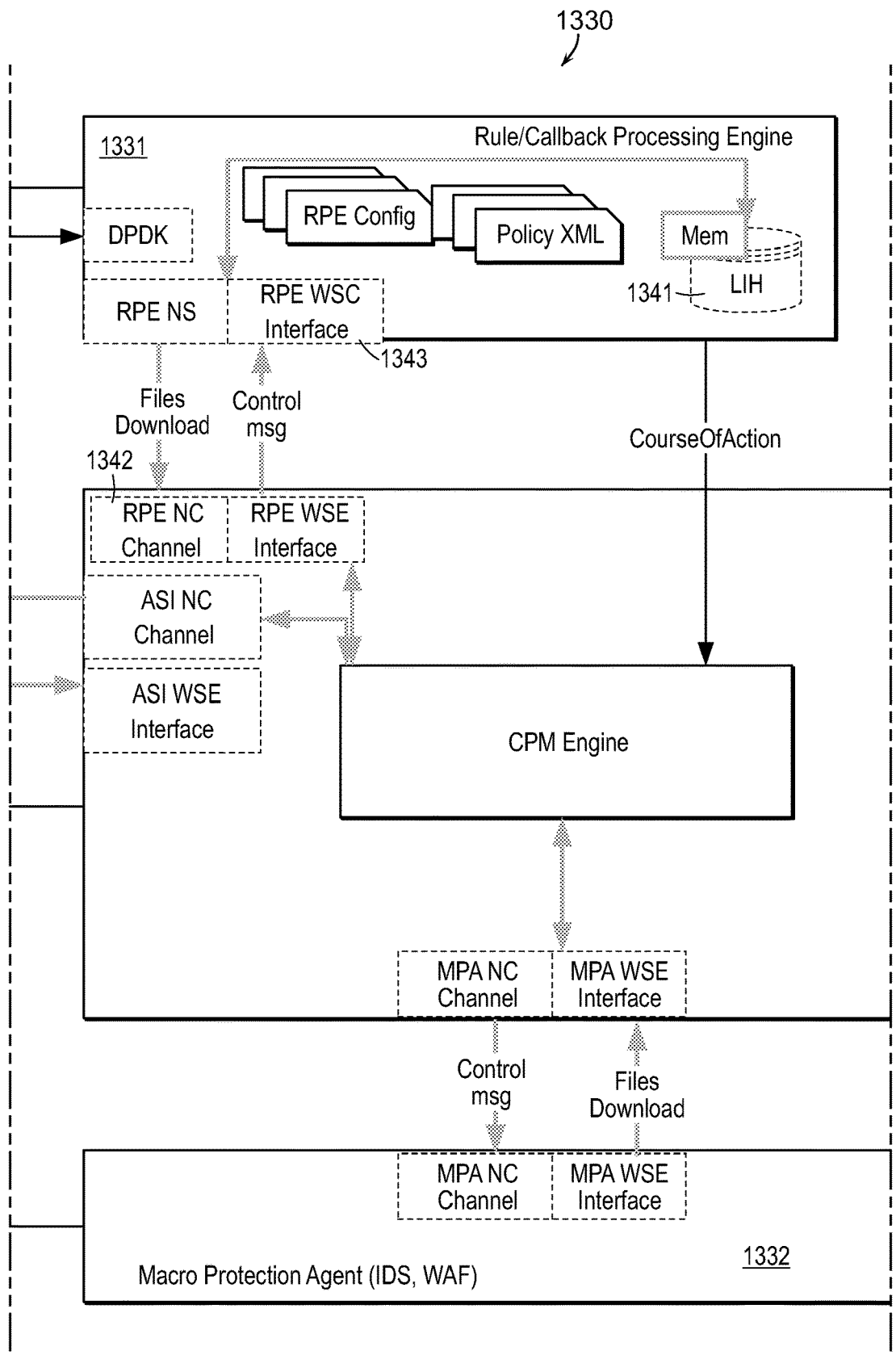
Figure 13:
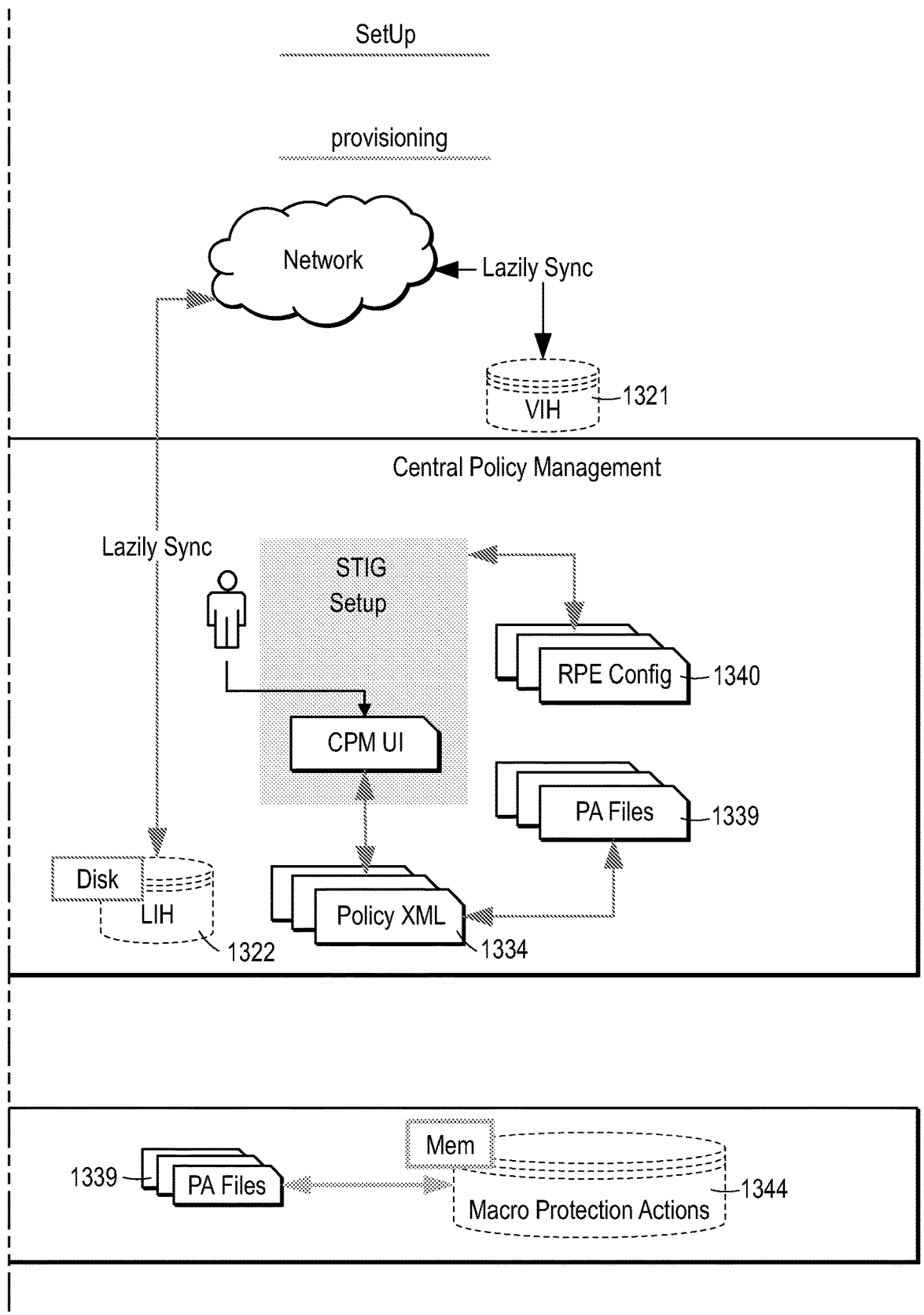

FIG. 13 is a block diagram illustrating the set-up and policy provisioning stage of a platform 1330 according to an embodiment. FIG. 13 shows the setup and provisioning of the platform 1330 in a user's data center. The yellow flow shows the setup functionality, whereas the green flow shows the provisioning functionality.

By the time system reaches provisioning, it is assumed that the platform has completed the set-up phase, e.g., the phase discussed hereinabove in relation to FIG. 12, and now, the VIH 1321 and LIH 1322 are set-up and up to date.

The first step in the provisioning phase is configuring of the LIH in the rule/callback processing engine 1331. The second step is configuring the macro protection agent (IDS, WAF) 1332. The third step is configuring the policy proxy on the application server instance 1333.

The policy XML 1334, RPE configs 1340, and protection action files 1339 from LIH 1322 are transmitted to the local LIH 1341 of rule/callback processing engine 1331 through RPE NC 1342 and RPE WSC channel 1343. The protection actions 1339 are transmitted to the protection action database in the macro protection agent 1332.

The provisioning also helps in setting up the ASI-LIH 1345 and platform protection agent 1346 micro protection agent database 1347. In an embodiment, setting up a proxy RPE and protection agent facilitates taking immediate action when a scenario requires a faster execution of the policy. Provisioning is complete once the ASI-LIH 1345, RPE LIH 1341, micro protection agent 1347 and macro protection agent 1332 are setup. In embodiments, depending on the number of application server instances present in the user location, multiple RPEs and macro protection agents are initialized to address scalability.

Figure 14:
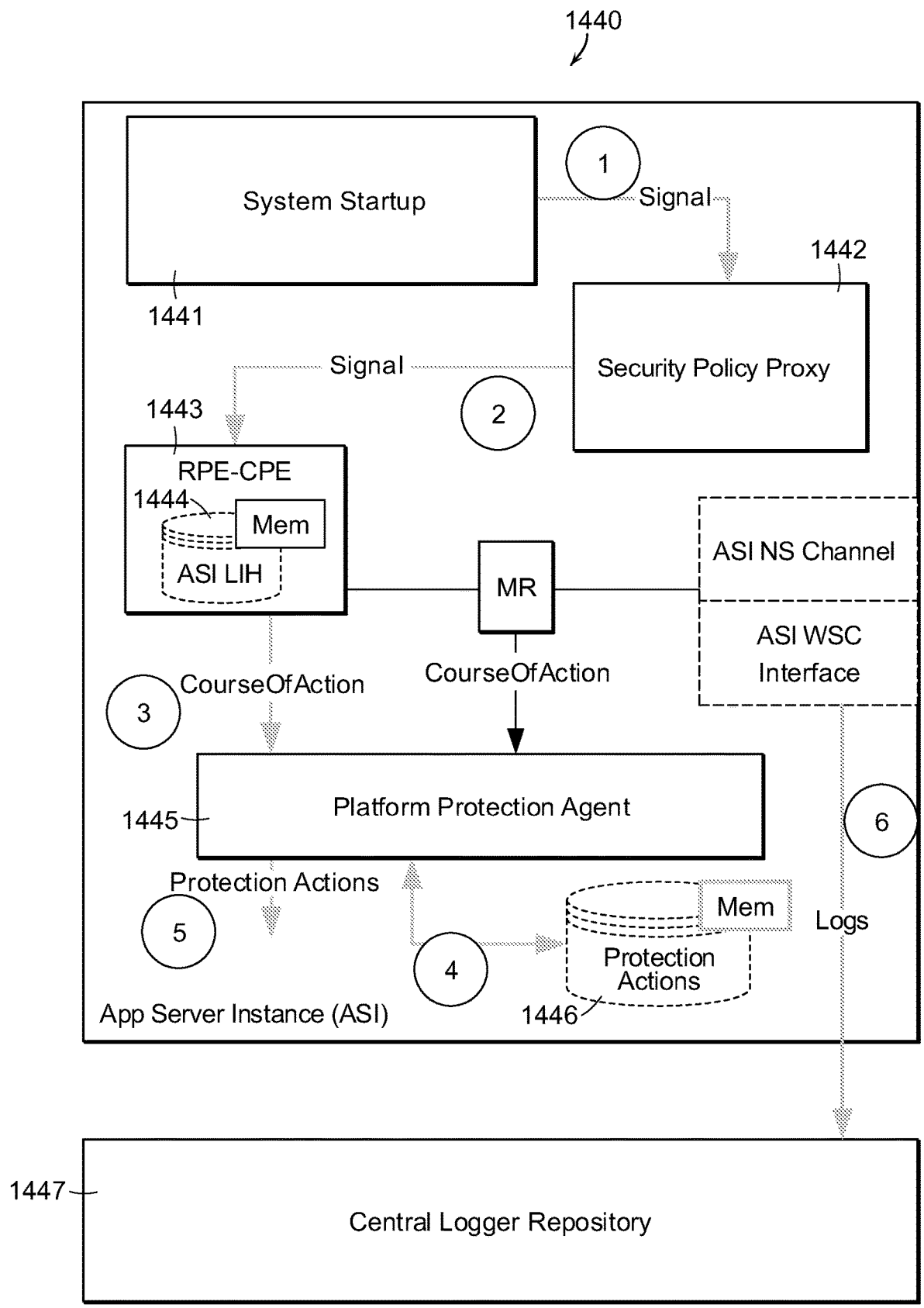
FIG. 14 is a simplified diagram illustrating a pre-runtime execution stage of a platform in an embodiment.

FIG. 14 is a simplified diagram illustrating pre-runtime execution 1440 of a platform according to an embodiment. During the pre-runtime execution 1440 (i.e., static execution) policies are executed before event detection takes place in an application server instance. Once the server comes up, the server will start executing the static policies to enforce the pre-runtime hardening. According to an embodiment, upon system start start-up 1441, after the application server instance (ASI) components are initialized, the security proxy 1442 will be signaled (step 1). Next, the security proxy 1442 will signal (step 2) the local RPE/CPE 1443 running on the ASI. The RPE/CPE 1443 will extract the applicable policies from the ASI LIH 1444, which will be executed thereafter. Policy execution will determine the course of action (CoA) and the RPE/CPE 1443 will send (step 3) the CoA to the platform protection agent 1445. In turn, the platform protection agent 1445 will extract the associated protection action (step 4) from the protection action database (in memory) 1446 and, thereafter, the protection agent 1445 will execute the protection action (step 5). Logs are then generated and stored (step 6) in the central log repository 1447.

Figure 15:
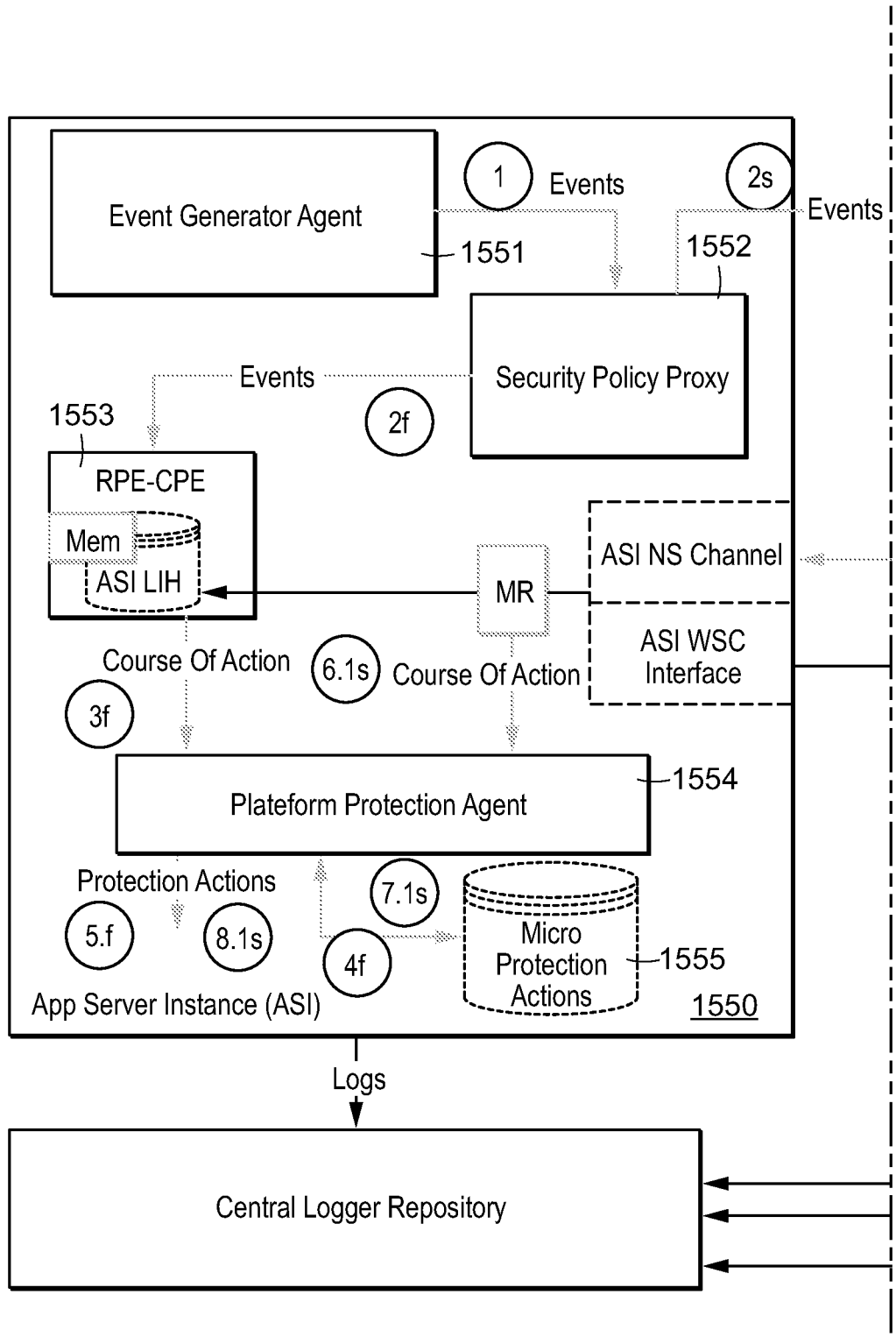
FIG. 15 is a block diagram illustrating the run time stage of a platform according to an embodiment.
Figure 15:
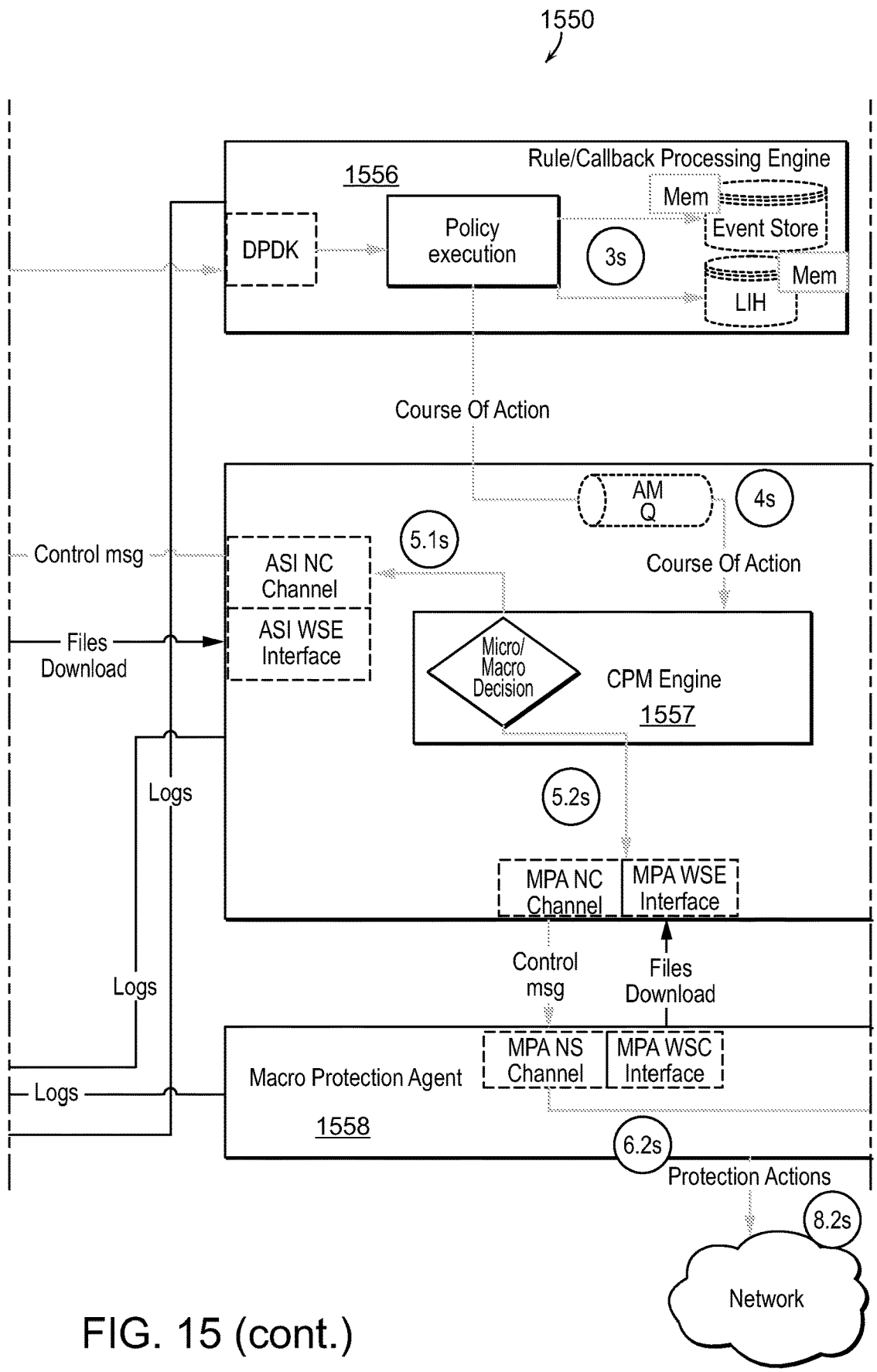
Figure 15:
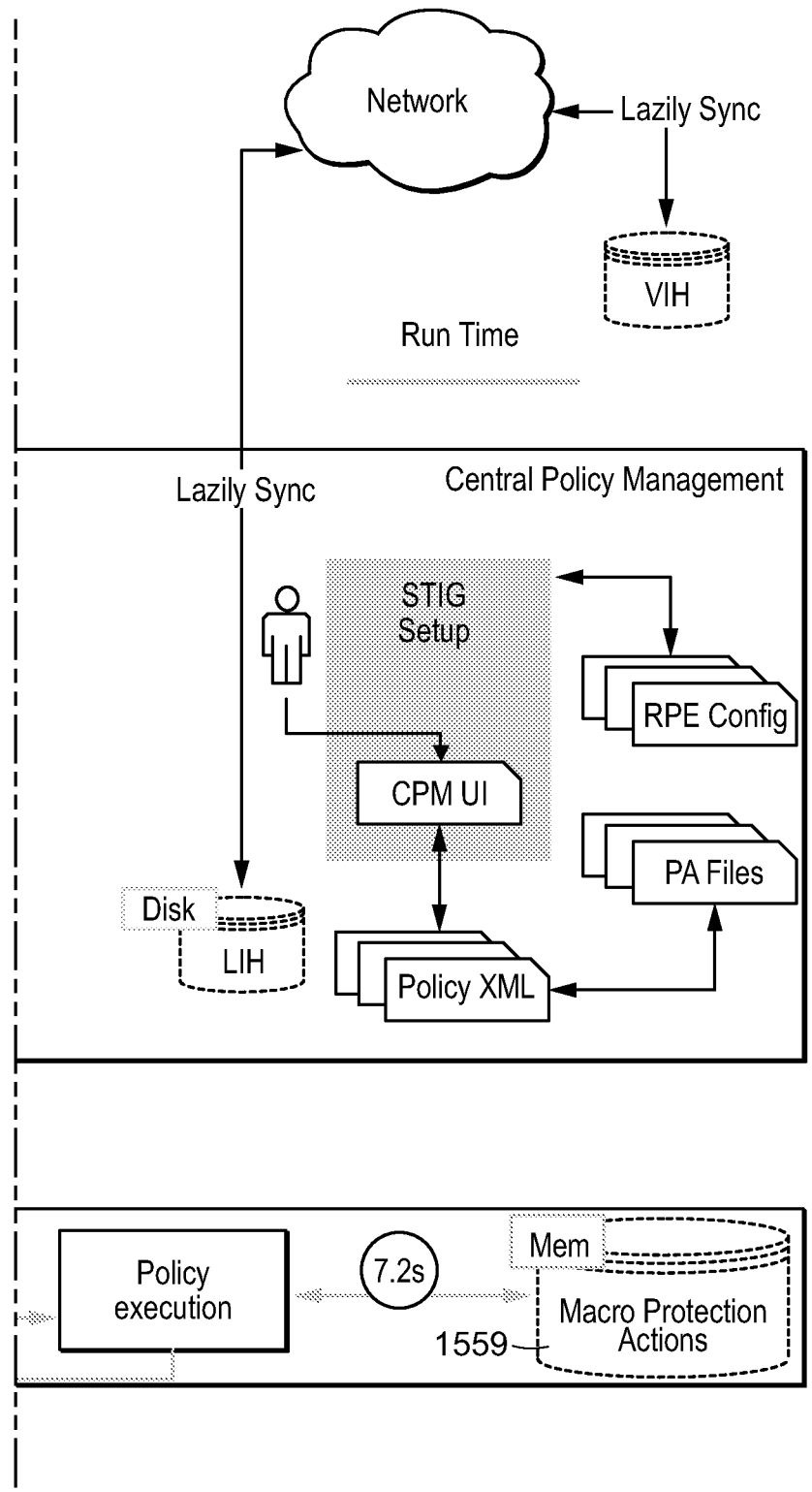

FIG. 15 is a block diagram illustrating the run time stage of a platform 1550 according to an embodiment. During runtime, events are continuously generated from the event generator 1551 on the application server instance (ASI) 1550. The numbered flow shows the sequence of flow through the platform 1550 components. In FIG. 15, a "s" with a number indicates "slow" and a "f" with a number indicates "fast." This indicates that in the platform 1550, there are two options, one being faster than the other. In an embodiment, whenever a faster policy execution is needed, the processing proceeds through the "f" labeled steps and when slower policy execution is sufficient, the processing proceeds through "s" labeled steps. According to an embodiment, security policy proxy 1552 determines whether the event is to be processed in the fast path or slow path. In an embodiment, the speed determination is based on multiple factors, such as severity of event and class of event, amongst others. For example, in an embodiment, all memory-based events are processed in the fast path to mitigate and minimize the impact of an attack in microseconds.

To begin, in the platform 1550, an event is generated from the event generator 1551 on the ASI 1550 which is passed (step 1) to the security policy proxy 1552.

Faster Execution of Policy:

For faster execution of the policy, the event is sent (step 2f) to the proxy RPE-CPE 1553, where the policy is applied and the finding, along with the policy information, is sent (step 3f) to the platform protection agent 1554 which is responsible for applying the protection action which is obtained (step 4f) from the database 1555. In turn, the protection action (step 5f) is employed on the target.

Slower Execution of Policy:

For slower execution of the policy, the event is sent (step 2s) to rule/callback processing engine 1556 where the policy rules are matched against the event (step 3s). In turn, the findings along with any event and policy operands are passed (step 4s) to the CPM engine 1557 which determines whether the macro 1558 or micro protection agent 1554 employs the protection action. When the micro protection agent 1554 is selected, the flow is through step 5.1s and when the macro protection agent 1558 is selected the flow is through step 5.2s. To continue, the selected agent, either, micro protection agent 1554 (steps 6.1s, 7.1s, 8.1s) or macro protection agent 1558 (steps 6.2s, 7.2s, 8.2s), execute the protection action on the target. Micro protection agent 1554 and macro protection agent 1558 execution stages include receiving the protection message (step 6.1s (micro)/step 6.2s (macro)), extraction of the protection action by using the in-memory micro protection database 1555 or macro protection database 1559 (step 7.1s (micro)/step 7.2s (macro)), and executing the actions at either the micro level (step 8.1s) or macro level (step 8.2s).

Design Flow Sequences

Figure 16:
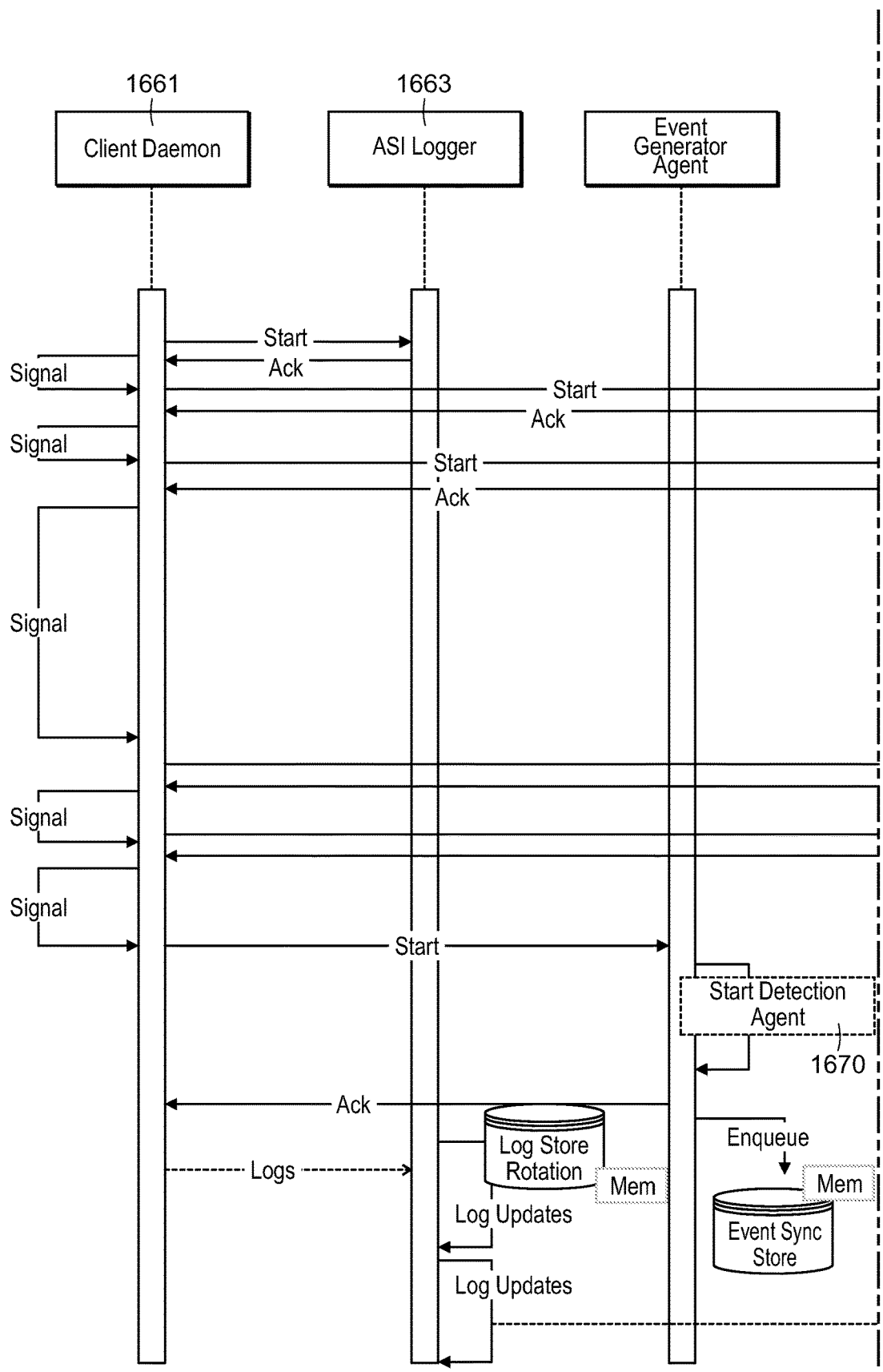
FIG. 16 is a sequence diagram depicting an initialization stage of an embodiment.
Figure 16:
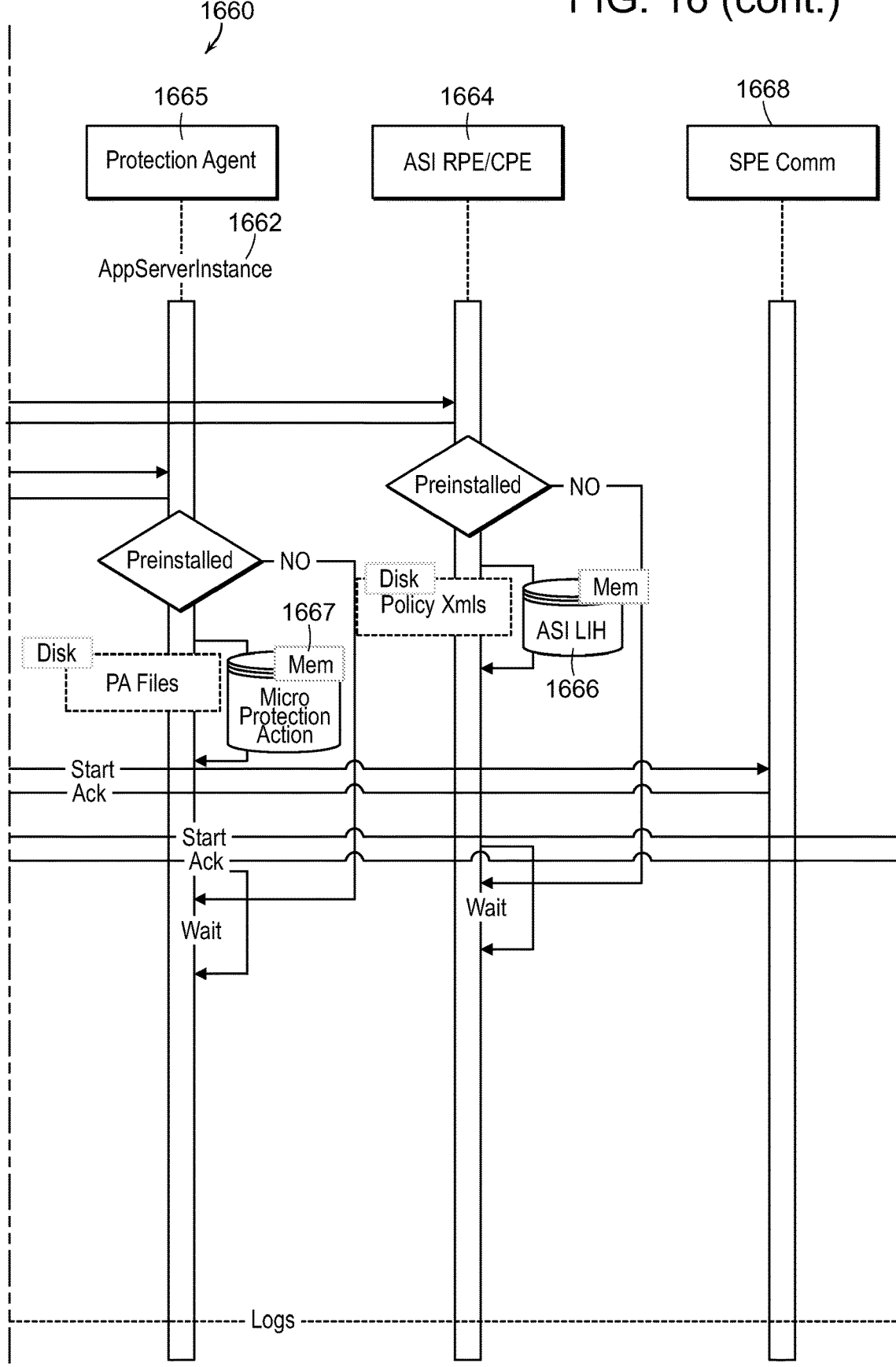
Figure 16:
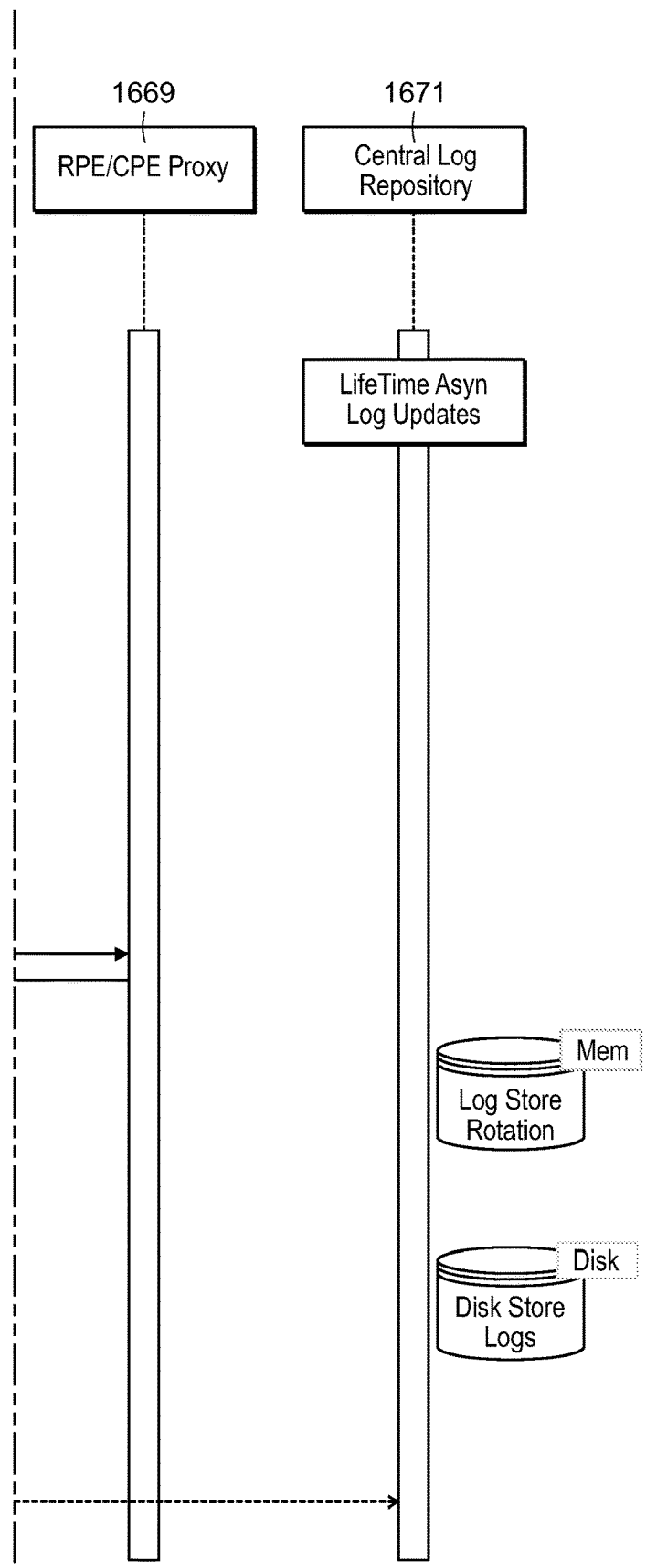

FIG. 16 is a sequence diagram depicting an initialization phase 1660 for an application server instance (ASI) (customer endpoint) 1662 according to an embodiment. There are multiple components initialized during this phase 1660. According to an embodiment, the client daemon 1661 is responsible for initializing all the components on the customer endpoints, e.g., ASIs. In the initialization phase 1660, once client daemon 1661 is initialized and running, the client daemon 1661 will bootstrap and initialize other components in sequence. Client daemon 1661 will send signals to ASI logger 1663, ASI RPE/CPE 1664, and protection agent. In response to receiving a signal, ASI RPE/CPE 1664 will build the ASI LIH in-memory database 1666 if required. In response to receiving a signal, the protection agent 1665 will build the micro protection action database 1667 if required. Client daemon 1661 will signal the security policy engine communication (SPE comm) 1668 and RPE/CPE proxy 1669. Once the SPE comm 1668 and RPE/CPE proxy 1669 components acknowledge their state, then, client daemon 1661 will start the detection agent 1670. During this initialization phase, logs are captured and written to in-memory local databases and synced up with a central log repository 1671.

Figure 17:
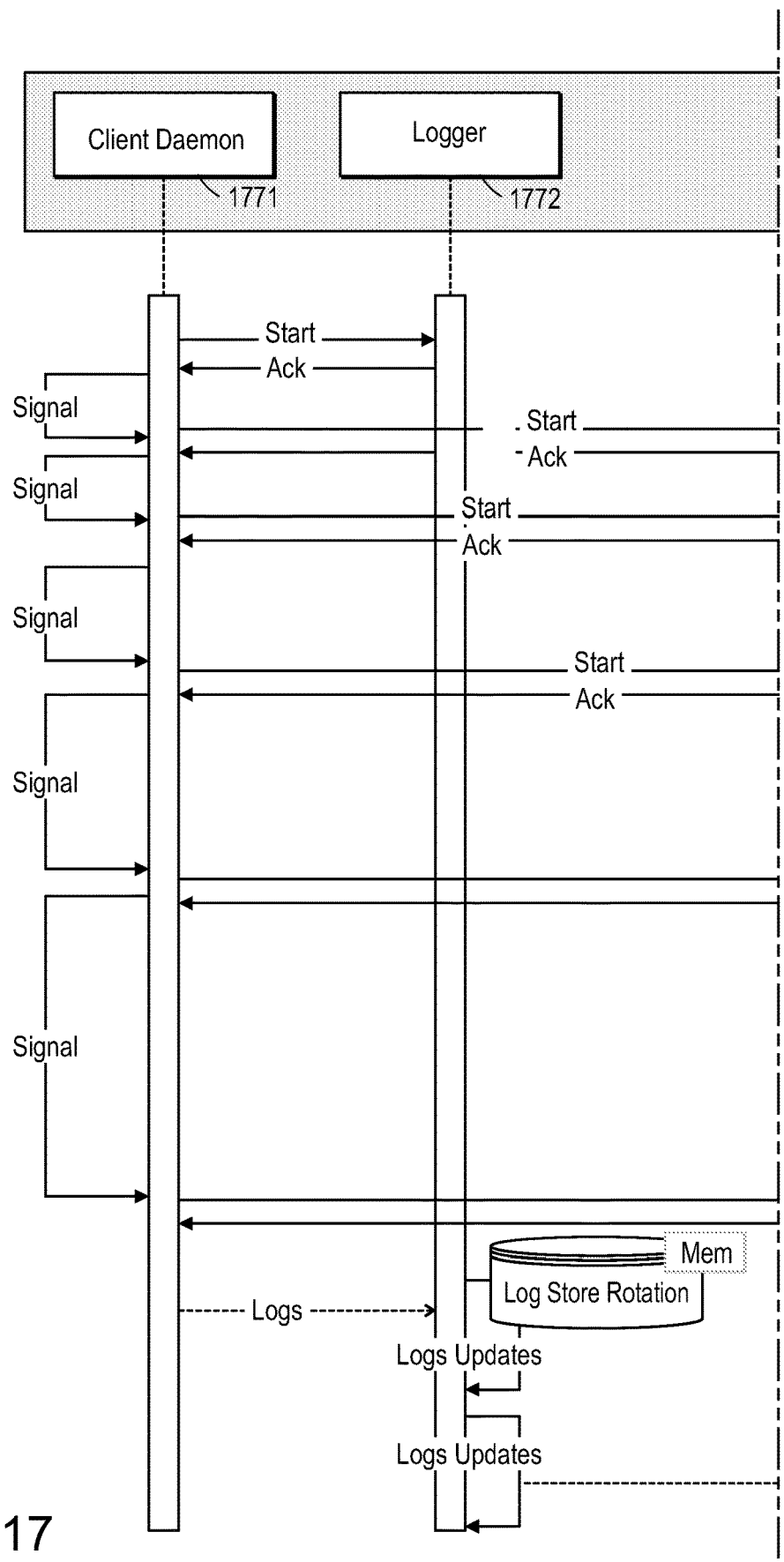
FIG. 17 is a sequence diagram of a central policy manager (CPM) initialization phase according to an embodiment.
Figure 17:
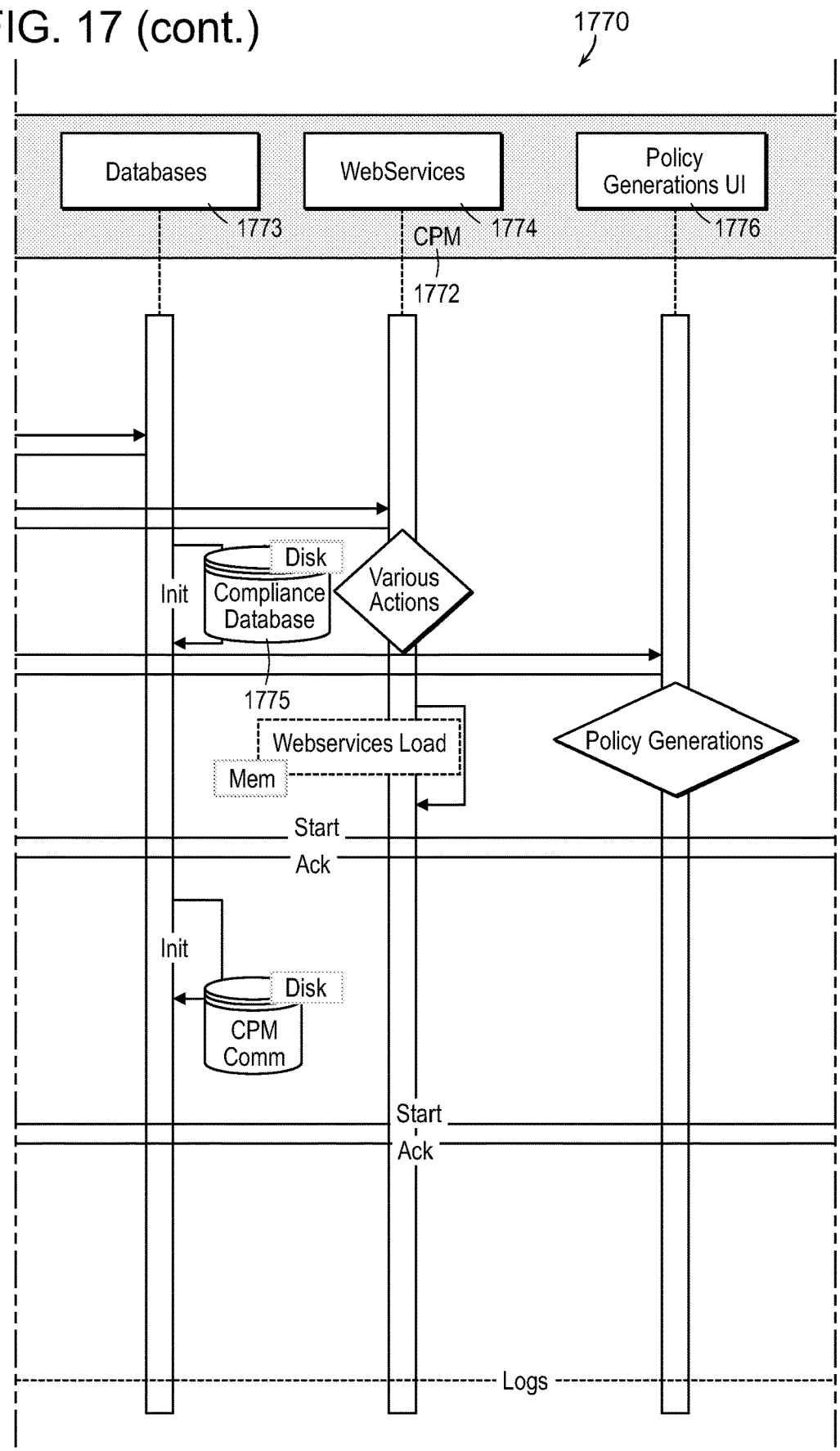
Figure 17:
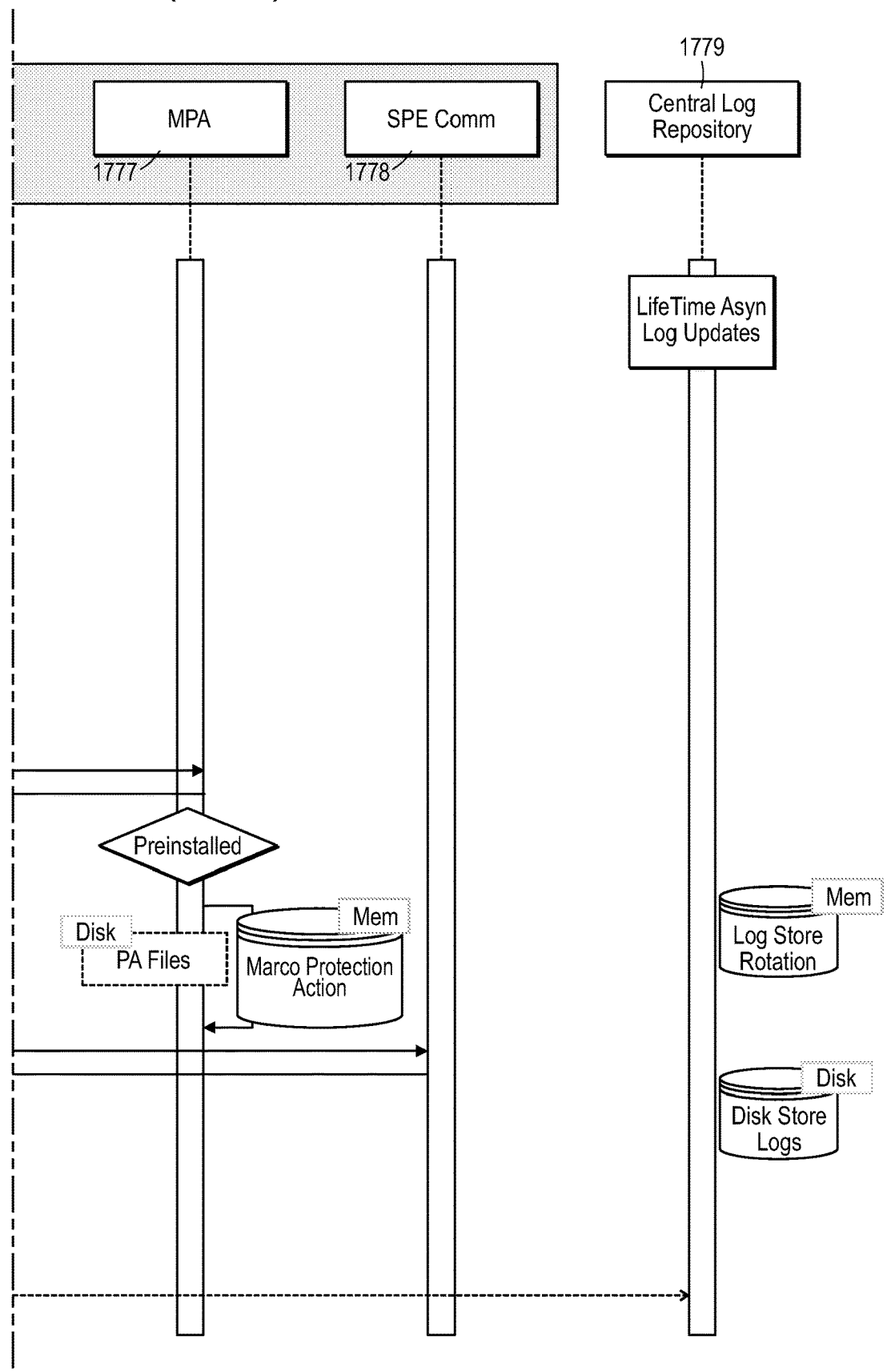

FIG. 17 is sequence diagram showing the sequence 1770 during an initialization phase of central policy manager (CPM) 1772. There are multiple components initialized during this phase 1770. In an embodiment, the client daemon 1771 is responsible for initializing all the components on the CPM 1772. During the initialization, once client daemon 1771 is initialized and running, the client daemon 1771 will bootstrap and initialize other components in sequence. Client daemon 1771 will send signals to a logger 1772, databases 1773, and web services 1774. On receiving the signal, a databases 1773 thread will initialize various databases, e.g., the compliance database 1775, and a web services 1774 thread will load the web services of CPM 1772. Client daemon 1771 will signal policy generation UI 1776 and macro protection agent (MPA) 1777 and the client daemon 1771 will signal the SPE comm 1778. Once all the components acknowledge their state, the initialization phase 1770 will be complete. During the initialization phase 1770, logs are captured and written to in-memory local databases and synced up with a central log repository 1779.

Figure 18:
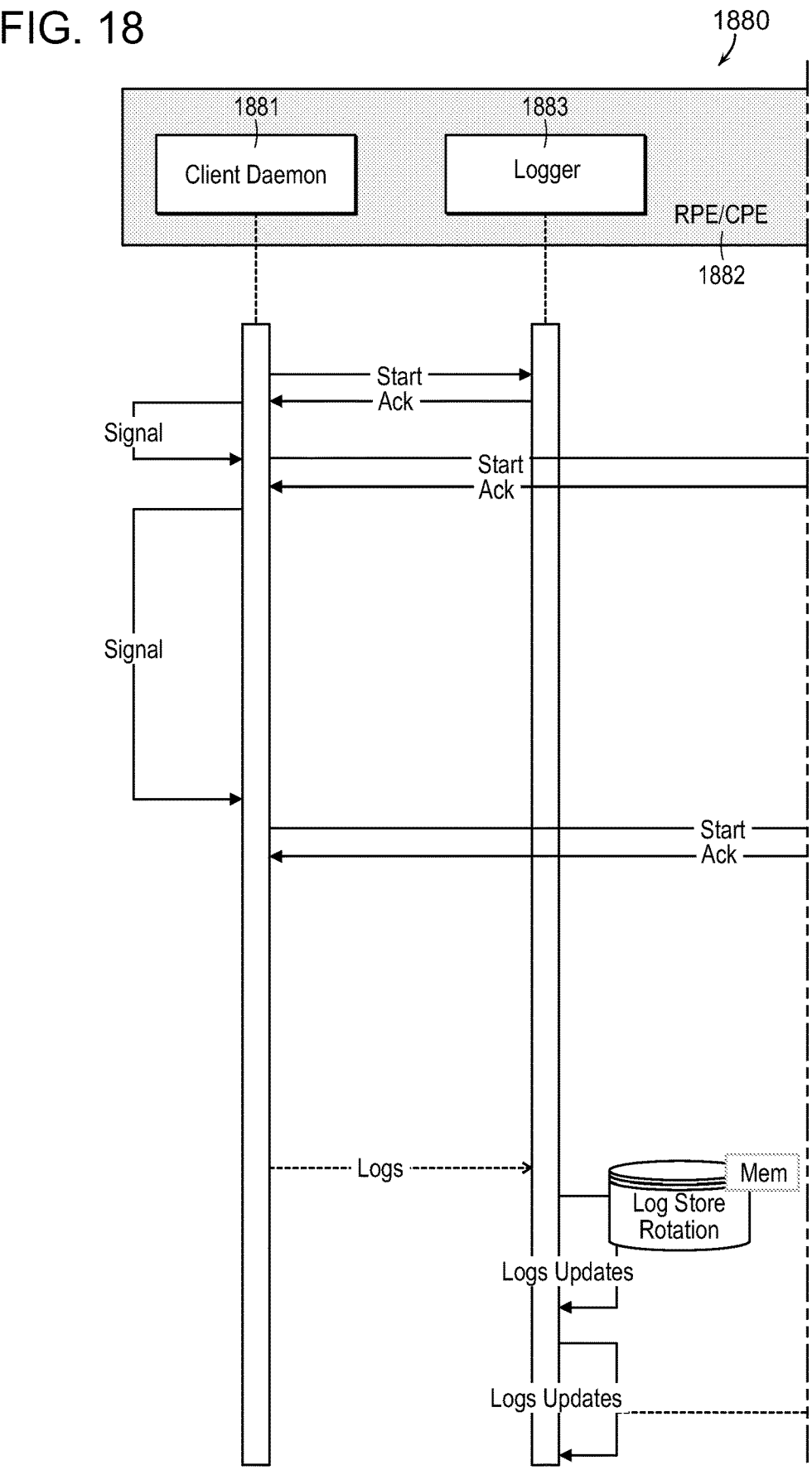
FIG. 18 is a sequence diagram of a rule processing engine (RPE) initialization phase according to an embodiment.
Figure 18:
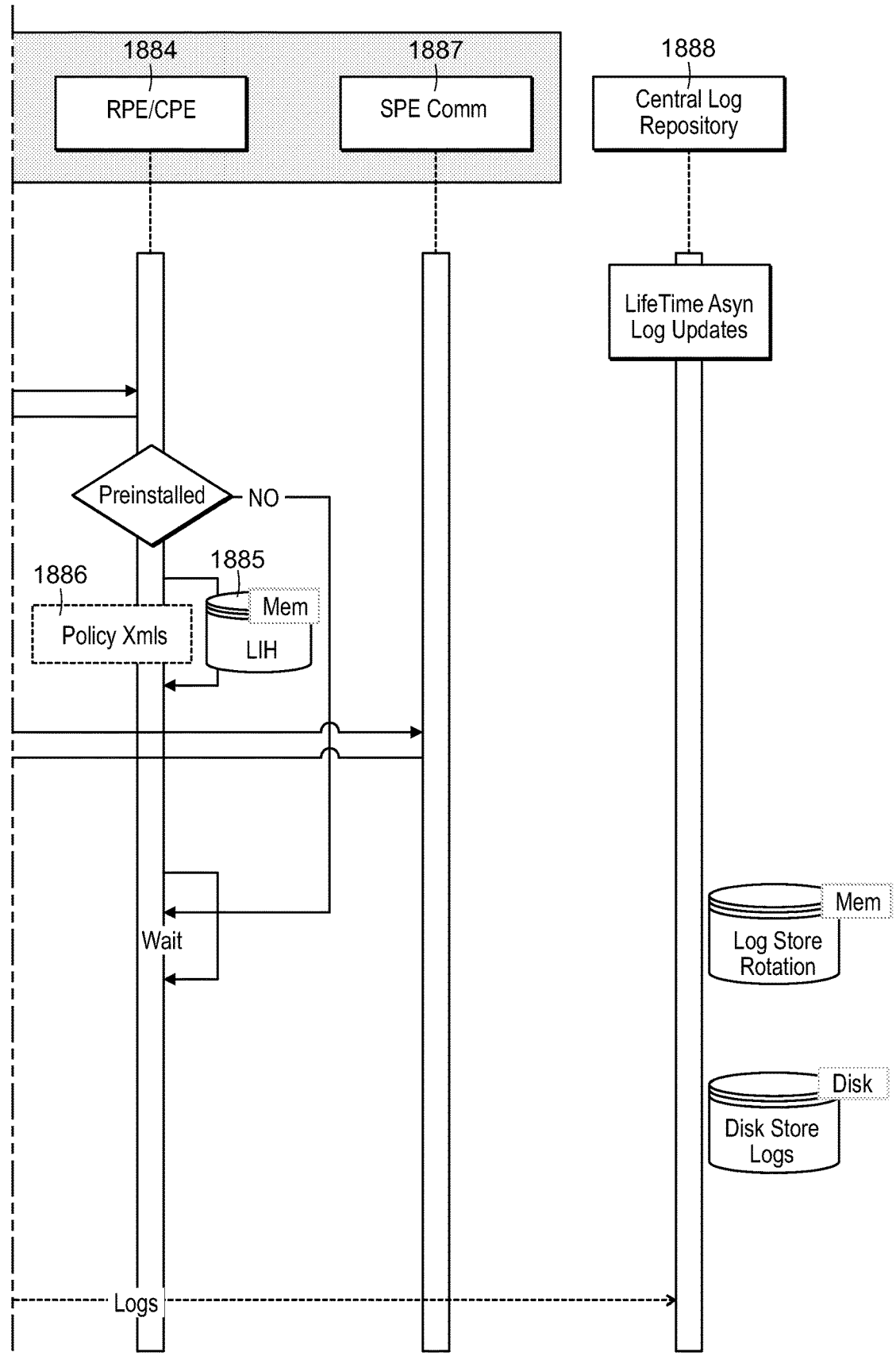

FIG. 18 shows the sequence during the rule processing engine (RPE) 1882 initialization phase 1880 according to an embodiment. There are multiple components initialized during the phase 1880. According to an embodiment, the client daemon 1881 is responsible for initializing all the components on the RPE 1882. Once client daemon 1881 is initialized and running, the client daemon 1881 bootstraps and initializes other components in sequence. Client daemon 1881 sends signals to logger 1883 and RPE/CPE 1884. On receiving the signal, RPE/CPE 1884 builds central in-memory local infrastructure hardening database 1885 using the policy XMLs 1886 which have been deployed during the deployment phase. Client daemon 1881 signals the SPE comm 1887. Once all the components acknowledge their state, the initialization phase 1880 will complete. During this initialization phase 1880, logs are captured and written to in-memory local databases and synced up with a central log repository 1888.

Figure 19:
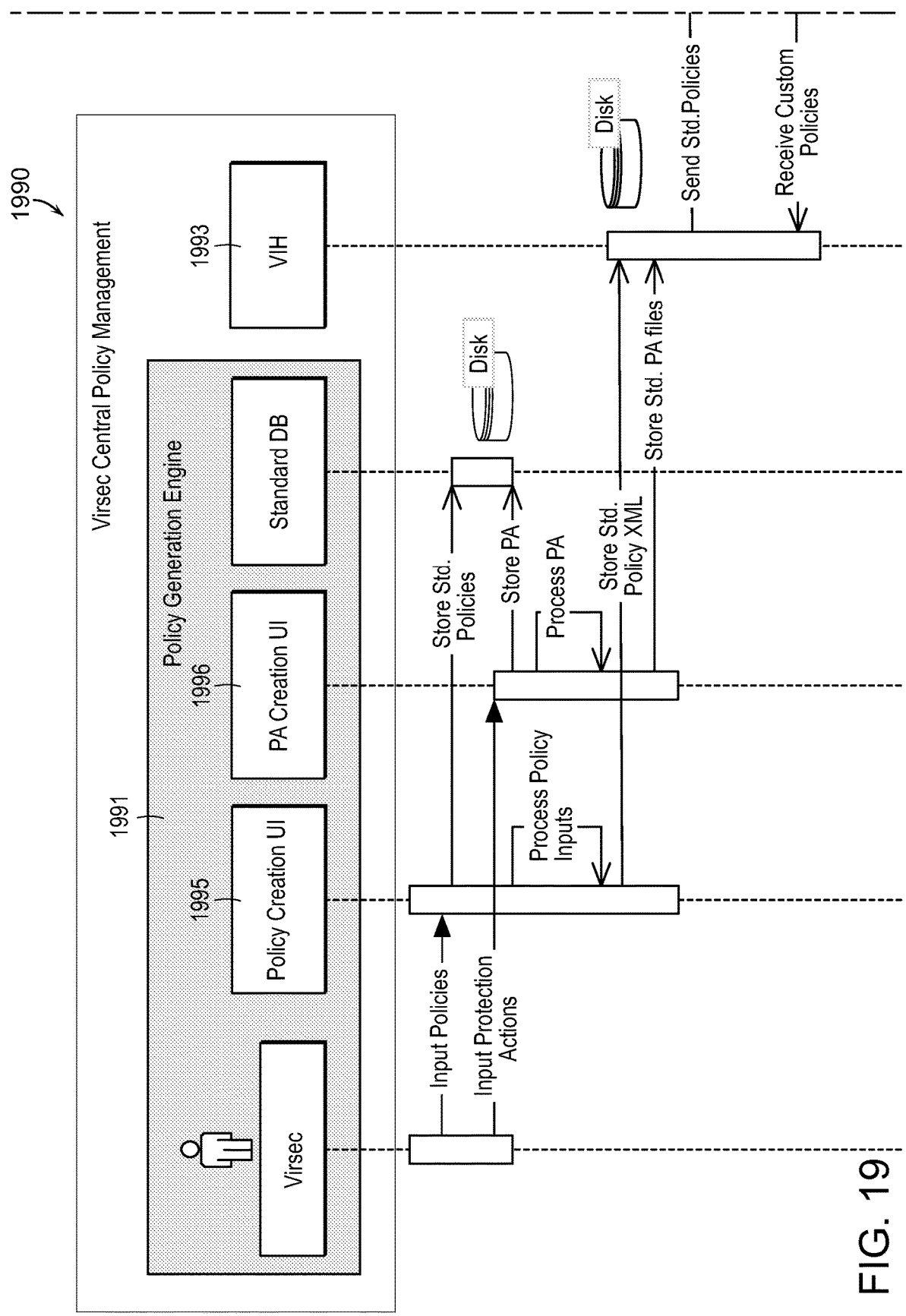
FIG. 19 is a sequence diagram depicting a policy set-up phase that may be implemented in embodiments.
Figure 19:
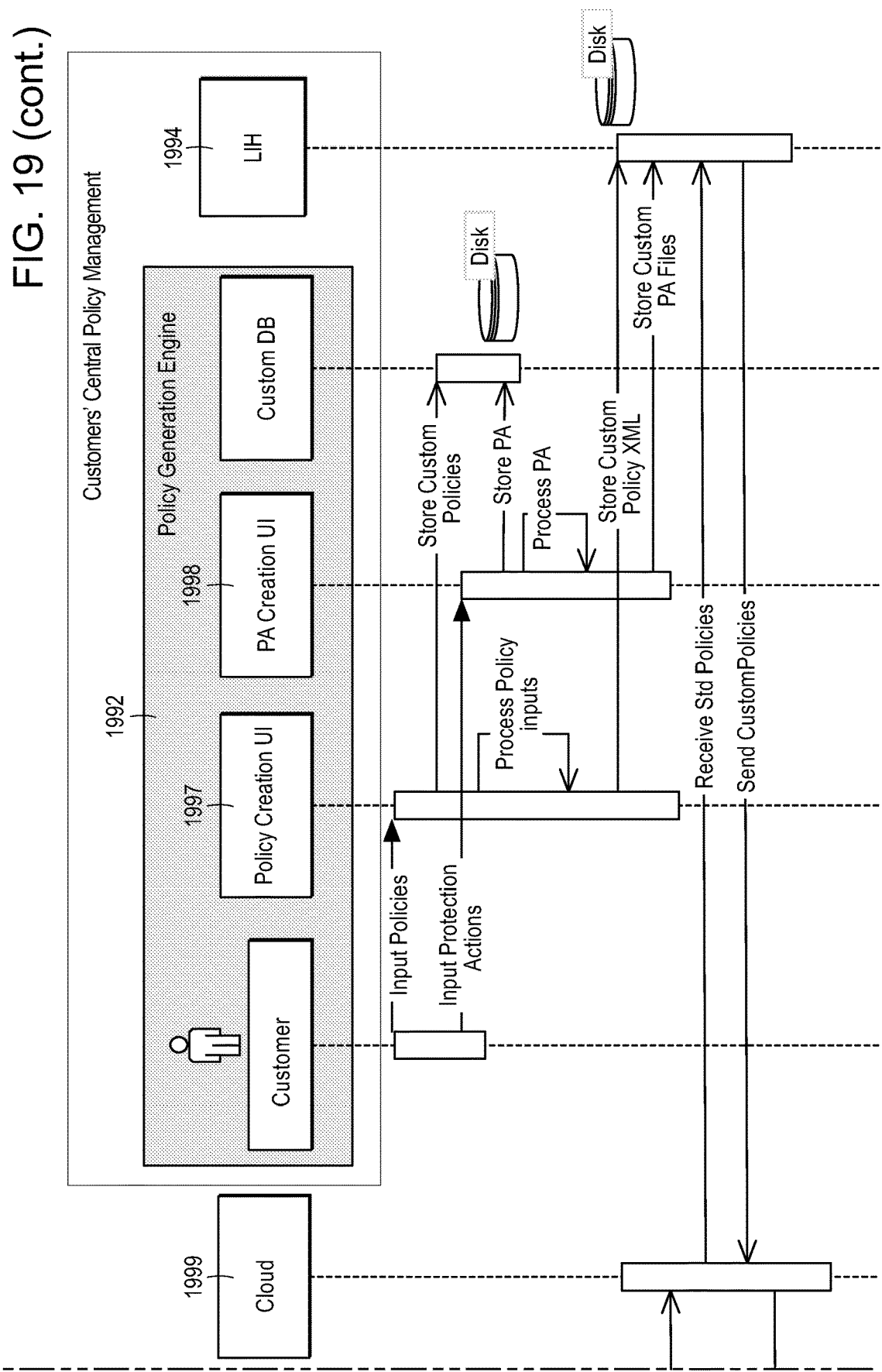

FIG. 19 shows the policy set up phase 1990 according to an embodiment. In this phase 1990, policies either by a provider of a security platform 1991 or customer central policy manager 1992 are built and set-up. The policies, once defined and built, are in the form of XMLs which are defined by the provider 1991 and the policies are stored in a provider's hardened infrastructure database 1993 and/or a user's infrastructure hardened database 1994. Policies are defined and built using CIS, customer, or security provider defined STIGS in the central policy manager 1991 and customer central policy manager 1992. The central policy manager 1991, uses various components including the policy creation UI 1995 and PA creation UI 1996 to create policies in the form of XMLs. Similarly, the customer central policy manager 1992, may also use a policy creation UI 1997 and PA creation UI 1998 in the environment 1992 to create customer defined policies. Once policies and protection actions are built, they are stored in the VIH 1993 and LIH 1994, respectively. VIH 1993 and LIH 1994 are synced through cloud 1999 to have golden copies of policies which can be deployed at customer ASIs. During the set-up phase 1990, logs are captured and written to in-memory local databases and sync'd up with a central log repository.

Figure 20:
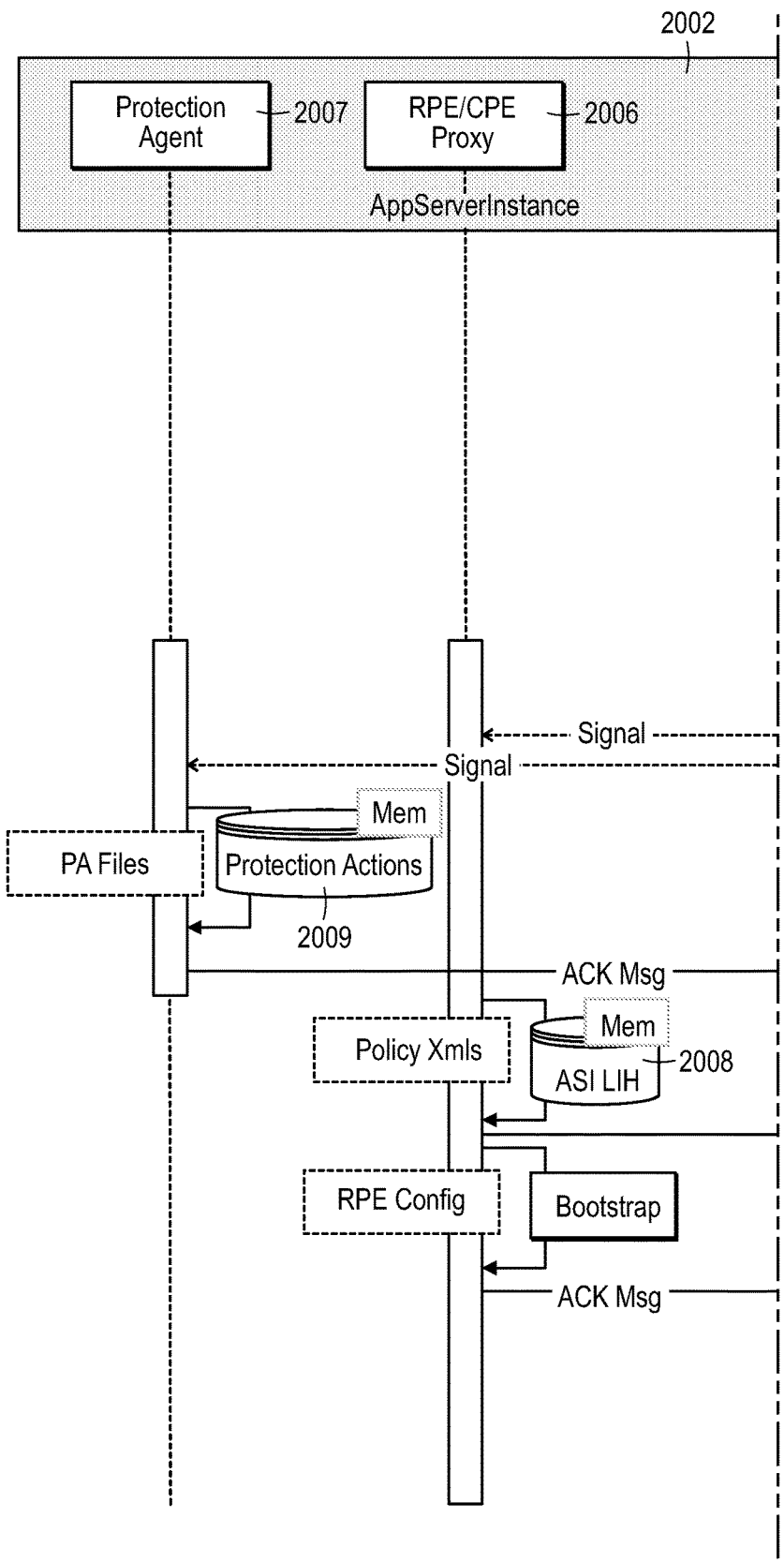
FIG. 20 is a sequence diagram illustrating a policy provisioning phase that may be employed in embodiments.
Figure 20:
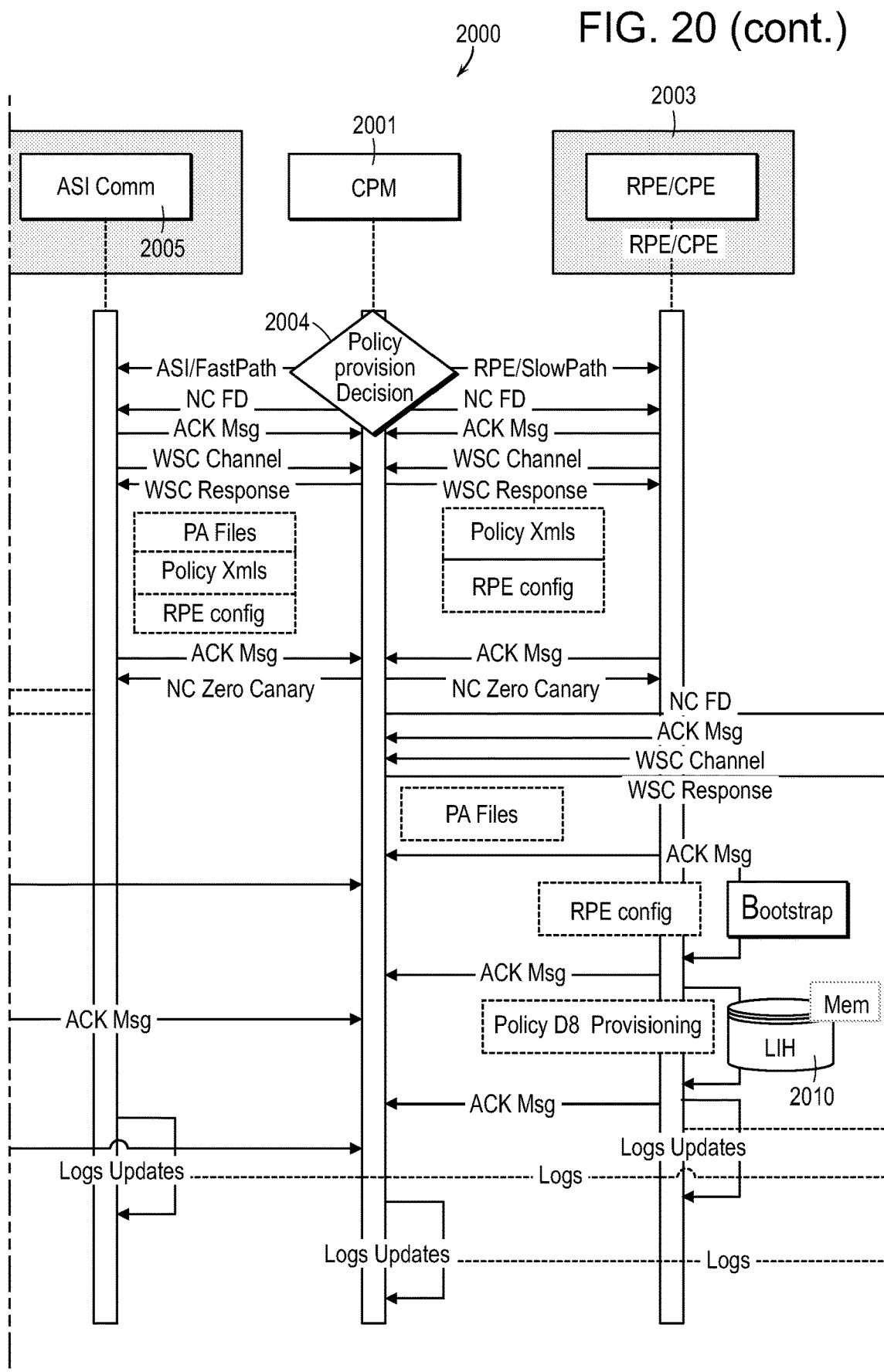
Figure 20:
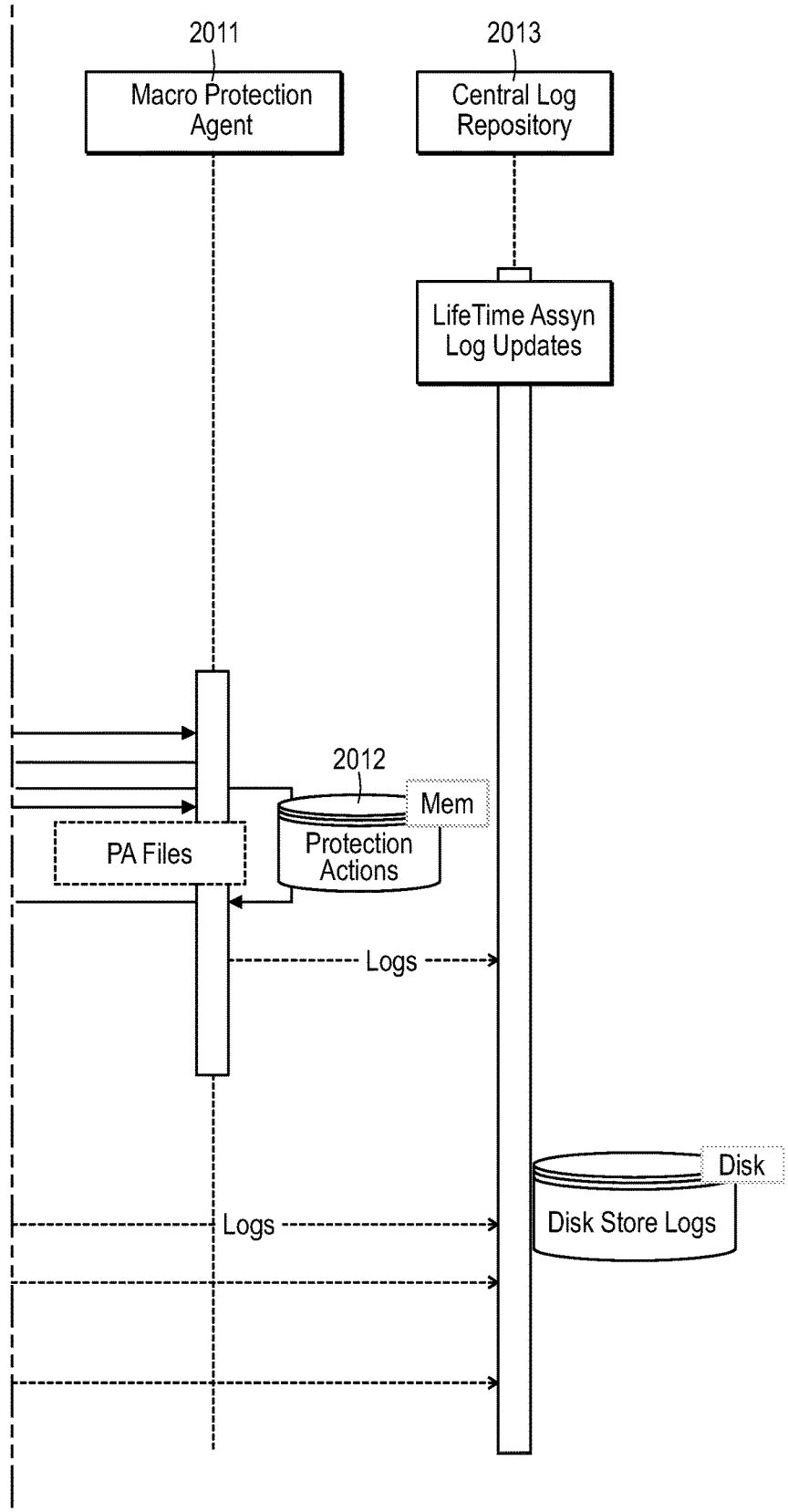

FIG. 20 is a sequence diagram of a policy provisioning phase 2000 according to an embodiment. In this phase 2000, policies are provisioned by the CPM 2001 into the ASI (customer endpoints) 2002 and/or into a central RPE 2003. The policies are transported and stored in various databases in the ASI 2002 or RPE 2003 once provisioned based on the provisioning protocol as depicted in FIG. 20. In the provisioning phase 2000, the CPM 2001 once initialized, makes a policy provision decision 2004, which determines whether to provision the policy on the customer ASI 2002 or central RPE/CPE 2003. Once decided, the CPM 2001 downloads all the required files (policy XMLs, PA files, RPE config) through a handshake protocol via REST APIs and socket servers to ASI 2002 or Central RPE/CPE 2003. ASI comm 2005 of ASI 2002 signals RPE/CPE proxy 2006 and protection agent 2007 to build the in-memory LIH database 2008 and protection action database 2009. Central RPE/CPE 2003 builds the central LIH 2010 and bootstraps the RPE using the config file. CPM 2001 also signals the macro protection agent 2011 to build the in-memory protection action database 2012. During the provisioning phase 2000, logs are captured and written to in-memory local databases and synced up with a central log repository 2013.

Figure 21:
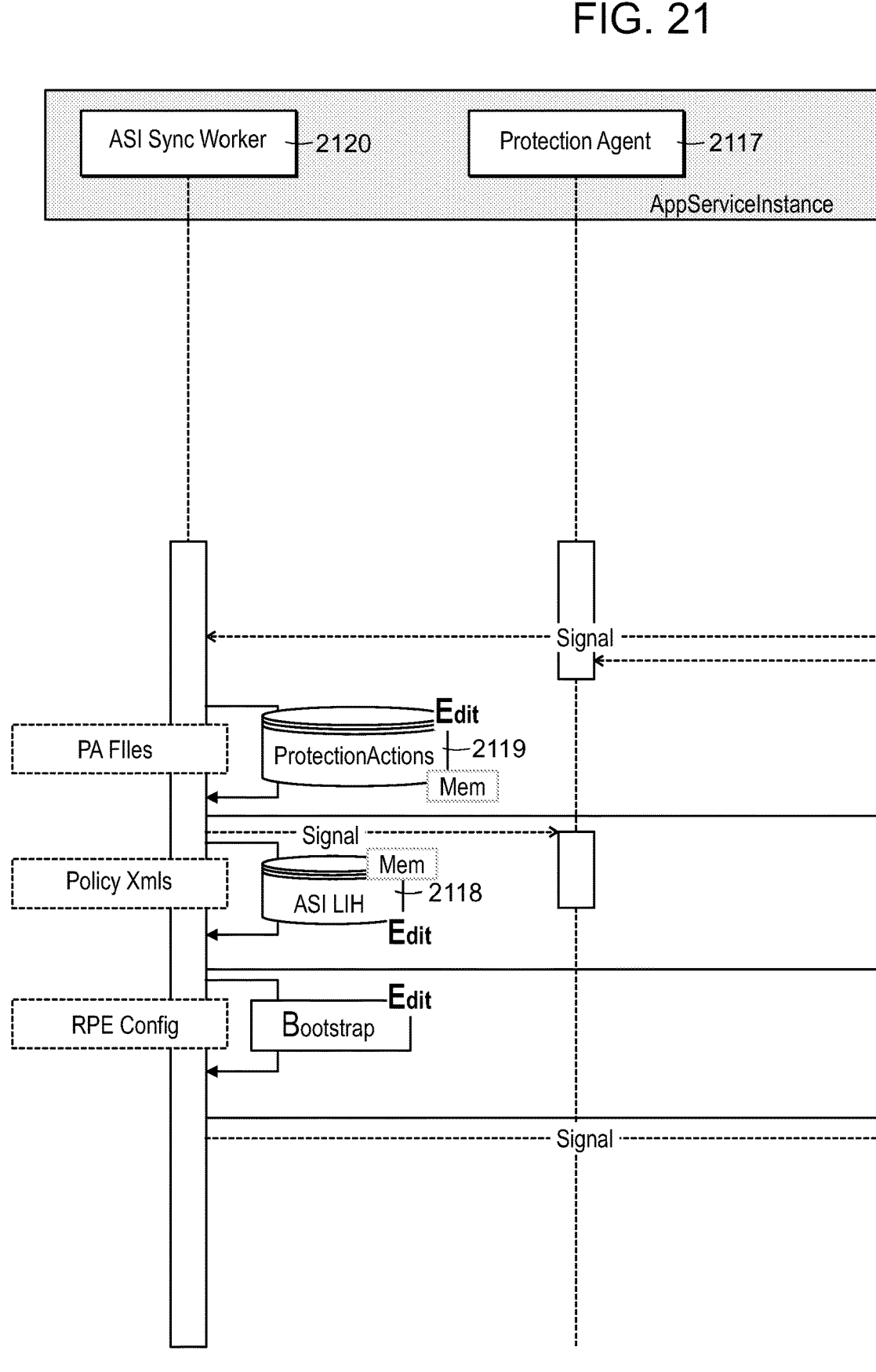
FIG. 21 is a sequence diagram illustrating a policy update phase that is implemented in an embodiment.
Figure 21:
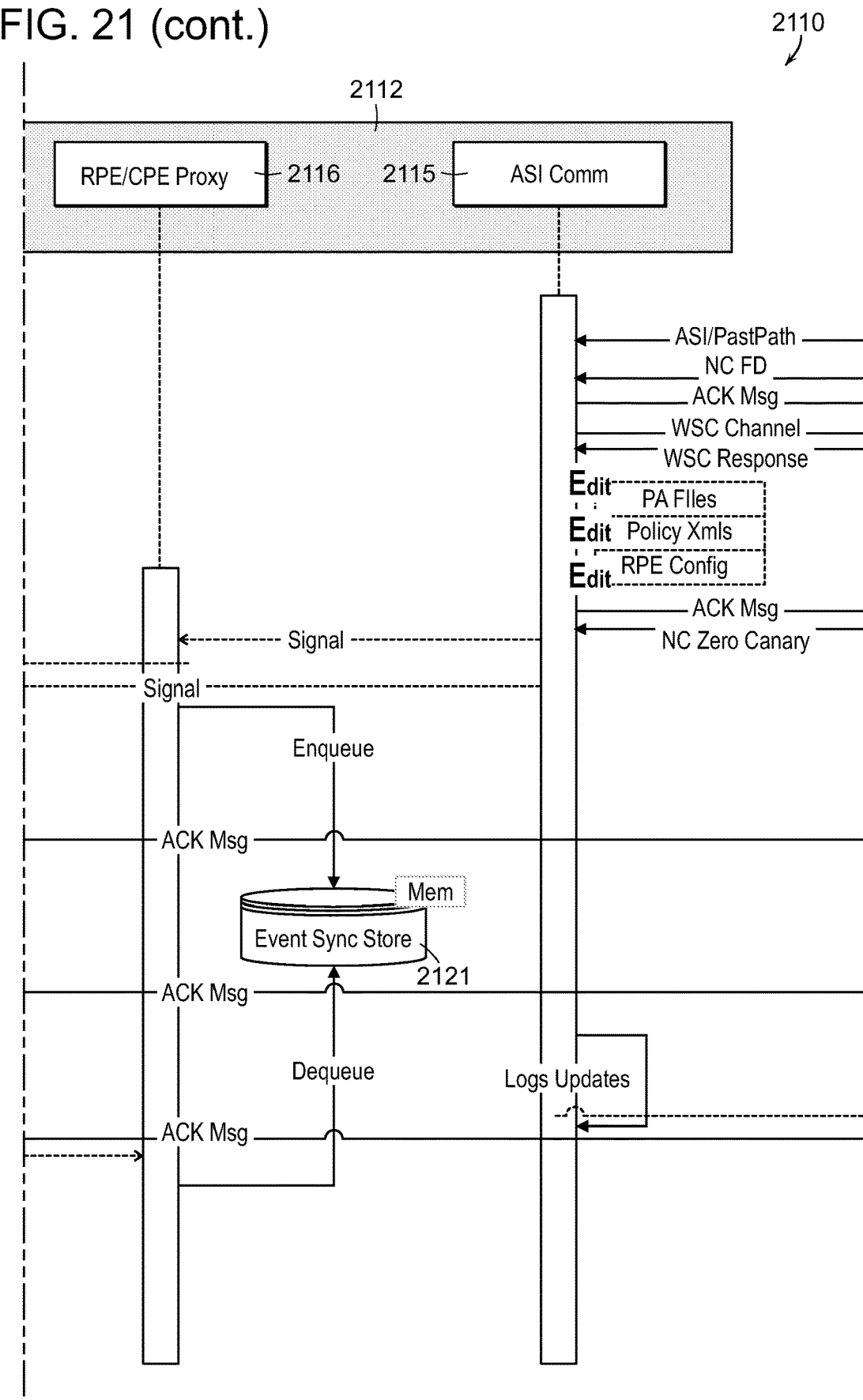
Figure 21:
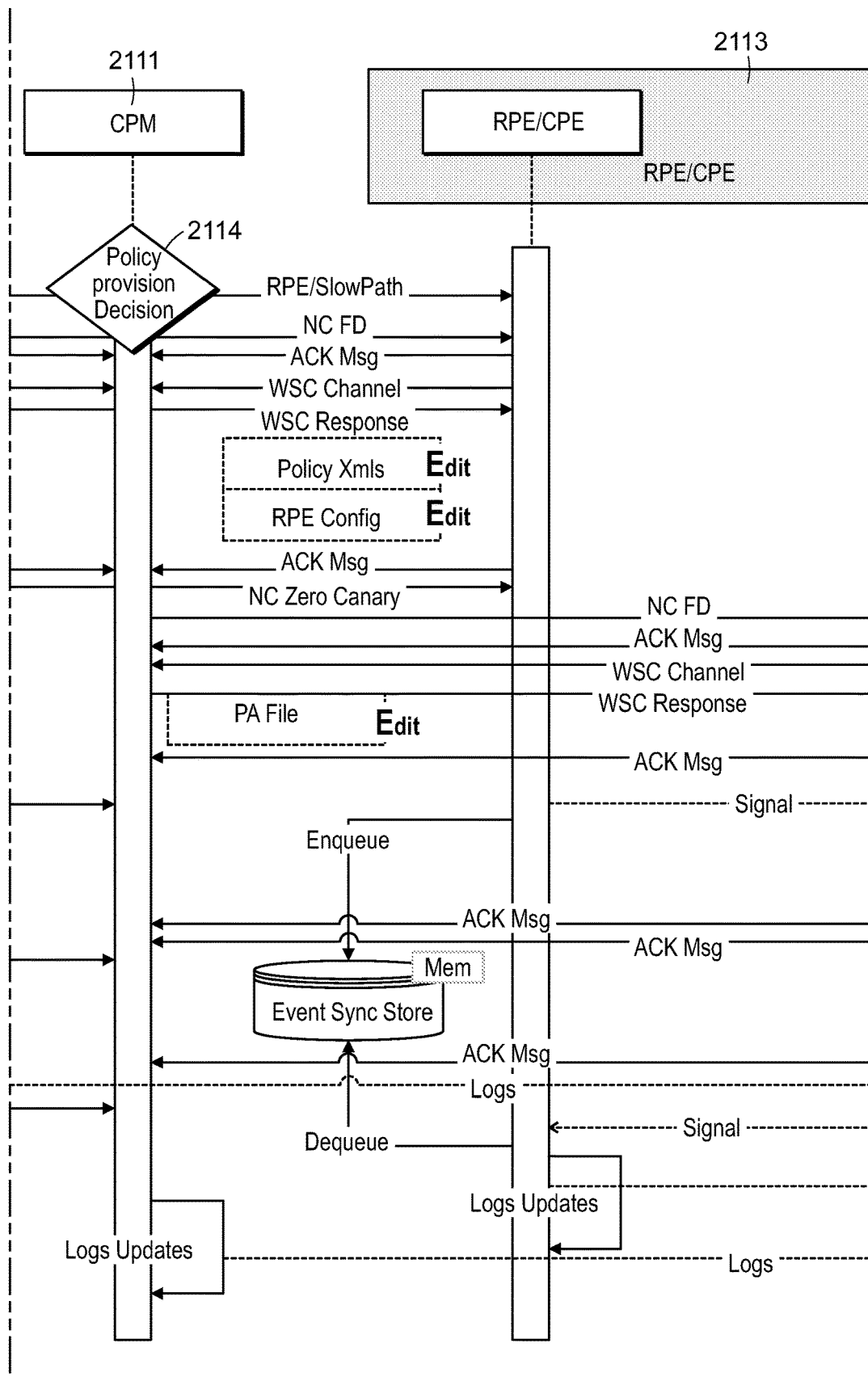
Figure 21:
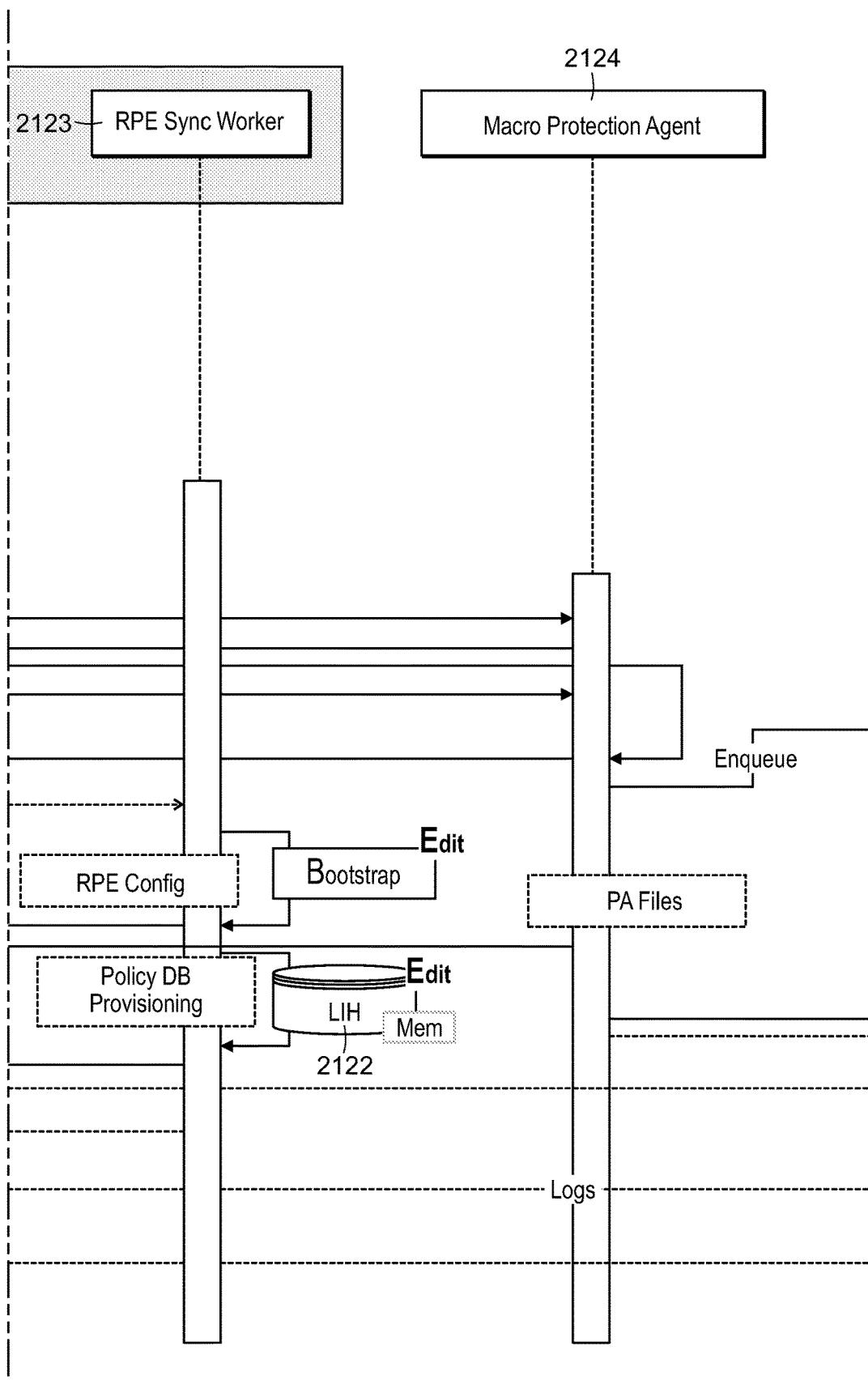
Figure 21:
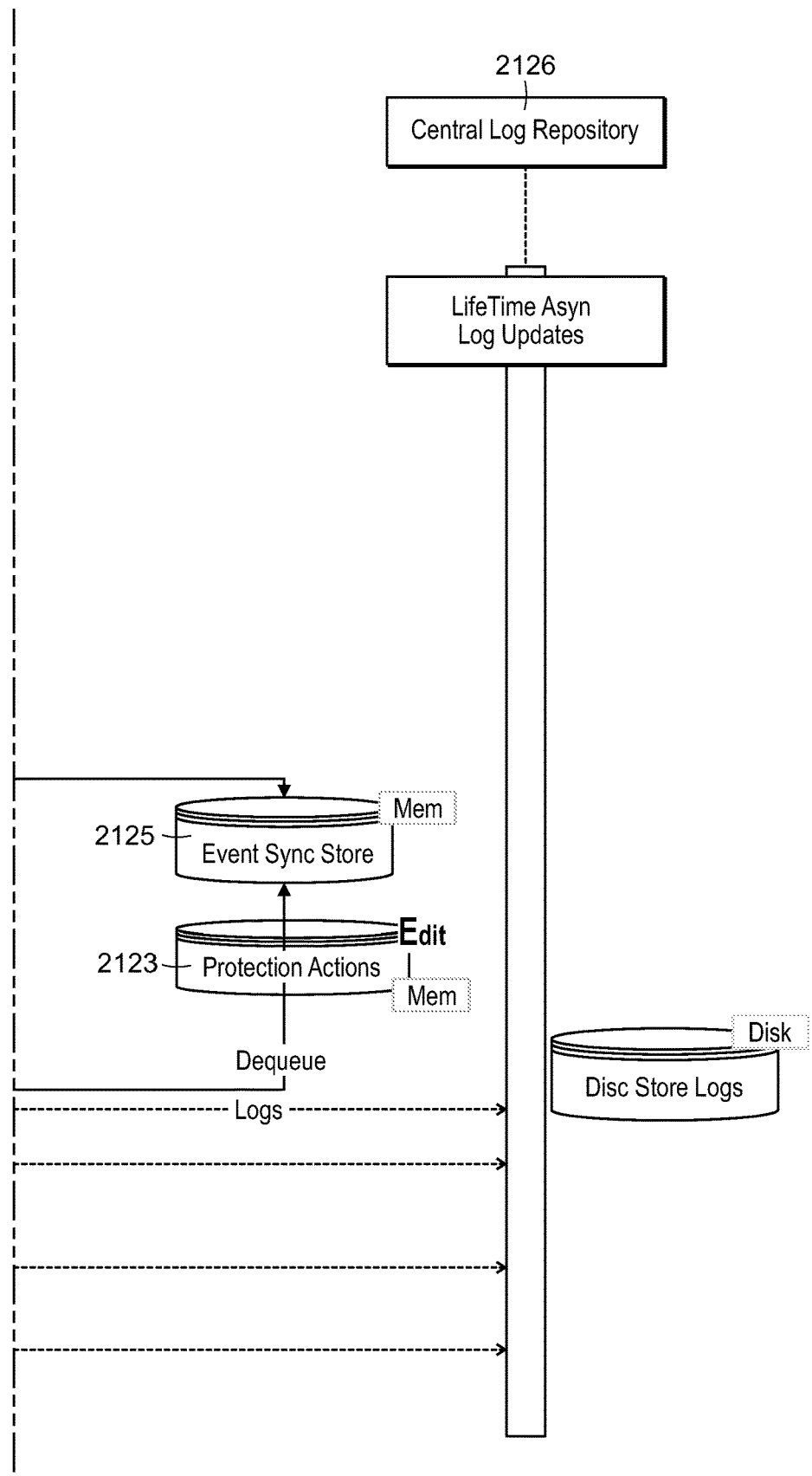

FIG. 21 is a sequence diagram illustrating the policy updates or CRUD phase 2110 according to an embodiment. In this phase 2110, policies are updated by a CPM 2111 into a ASI 2112 (customer endpoints) or into a central RPE 2113. The policies are transported and stored in various databases in the ASI 2112 and/or RPE 2113 once the policies are updated based on the policy update protocol depicted in FIG. 21. In this phase 2110, CPM 2111, once initialized and provisioned, makes a policy provision decision 2114 to update policies on the customer ASI 2112 or central RPE/CPE 2113. Once decided, the CPM 2111 downloads all the required files (policy XMLs, PA files, RPE config) through a handshake protocol via REST APIs and socket servers to ASI 2112 or central RPE/CPE 2113. ASI comm 2115 of ASI 2112 signals RPE/CPE proxy 2116 and protection agent 2117 to update the in-memory LIH database 2118 and protection action database 2119. These updates are done by ASI sync worker 2120 which is signaled by RPE/CPE proxy 2116. During the update and resync downtime, the RPE proxy 2116 keeps enqueuing the received events in the temporary event store 2121. Once the updates are done, then ASI sync worker 2120 signals the RPE/CPE proxy 2116 to process the events from the temporary store 2121. Central RPE/CPE 2113 updates the central LIH 2122 using a RPE sync worker 2123 thread and macro protection database 2123 is updated by macro protection agent 2124. Macro protection agent 2124 enqueues the event in the temporary event store 2125 during the policy sync and update downtime and once the sync is complete then, macro protection agent 2124 starts processing the events from the temporary event store 2125. During this update phase 2110, logs are captured and written to in-memory local databases and synced up with a central log repository 2126.

Figure 22:
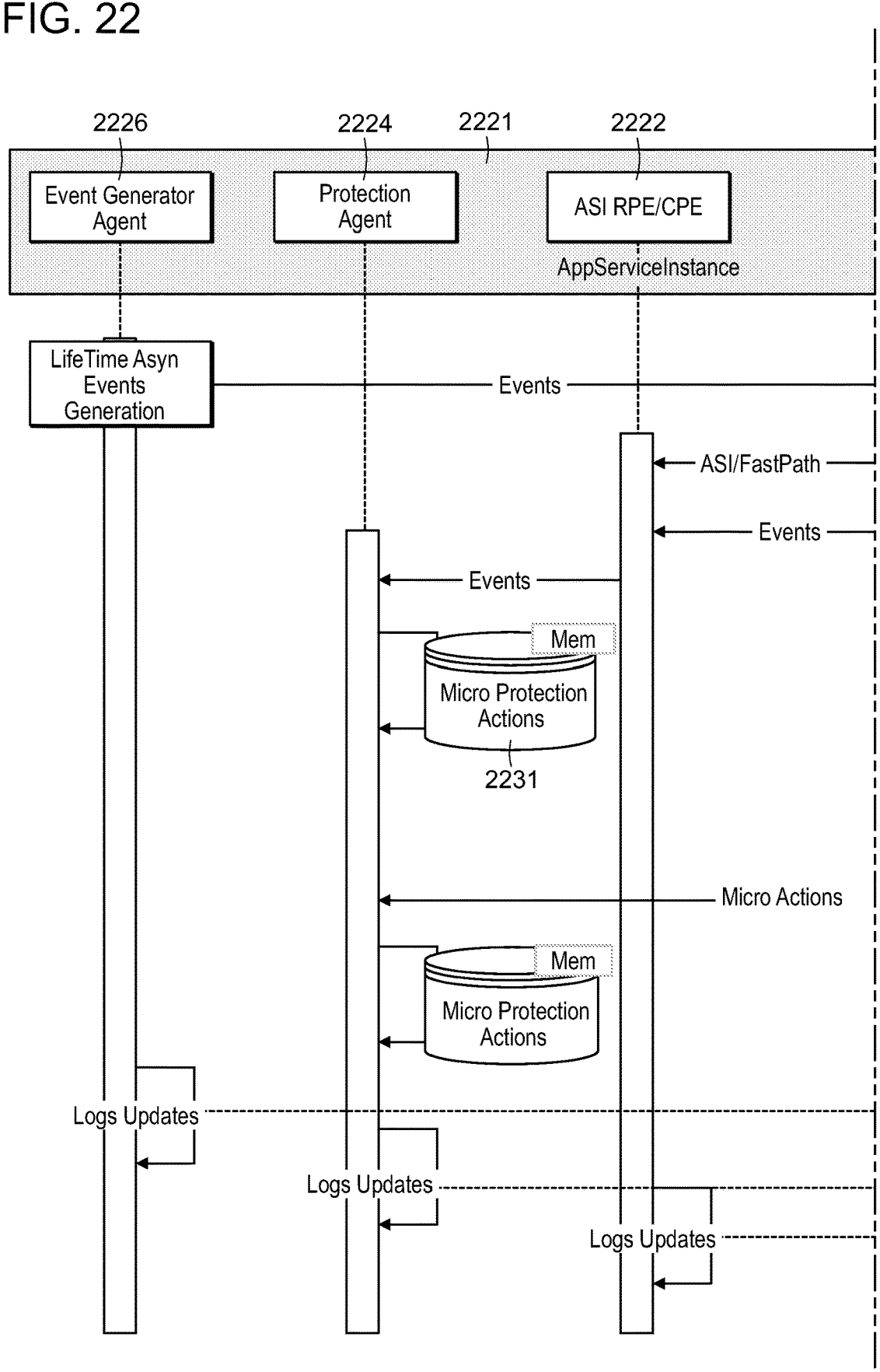
FIG. 22 is a sequence diagram depicting event processing at a pre-runtime or runtime phase of an embodiment.
Figure 22:
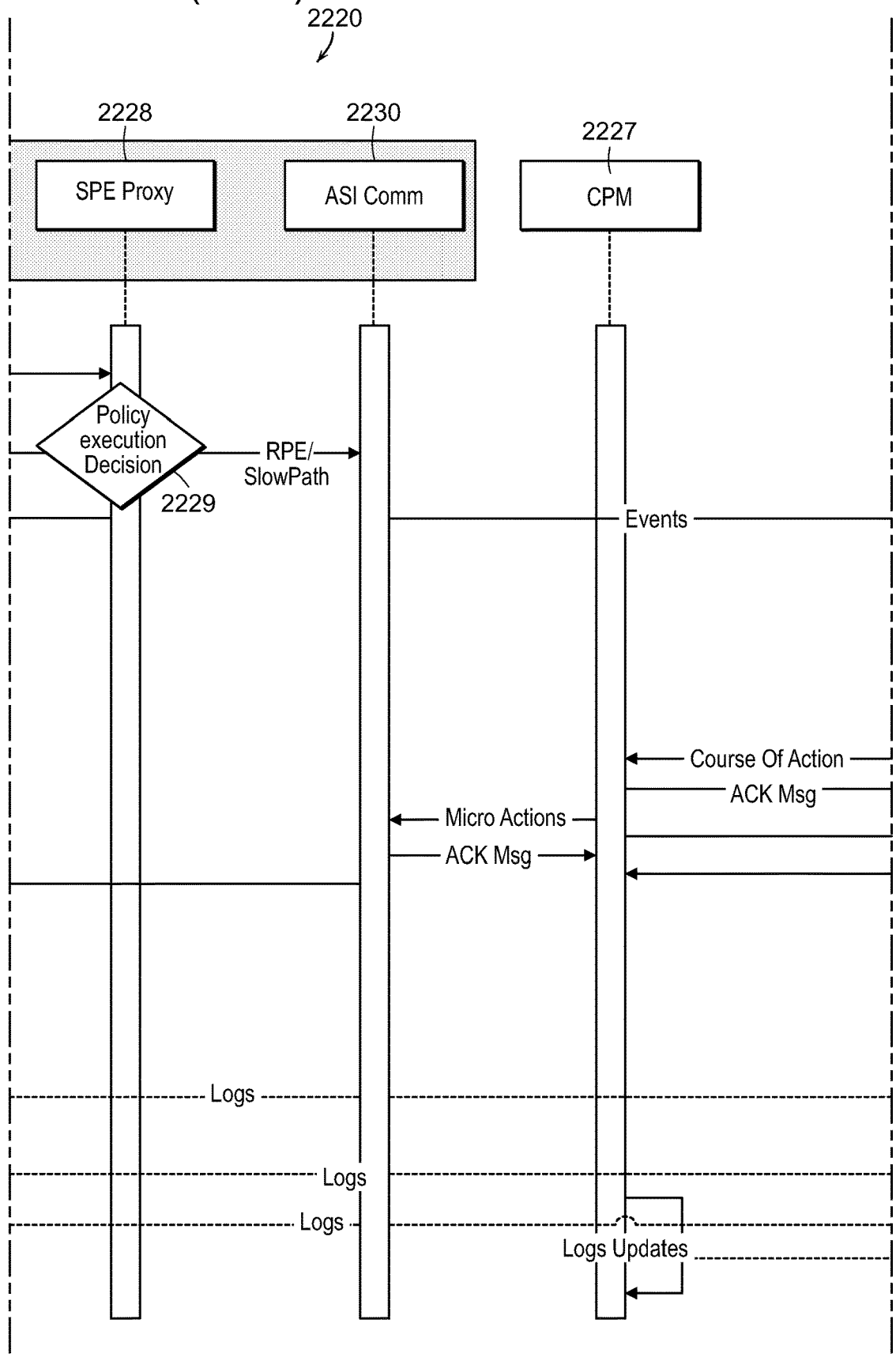
Figure 22:
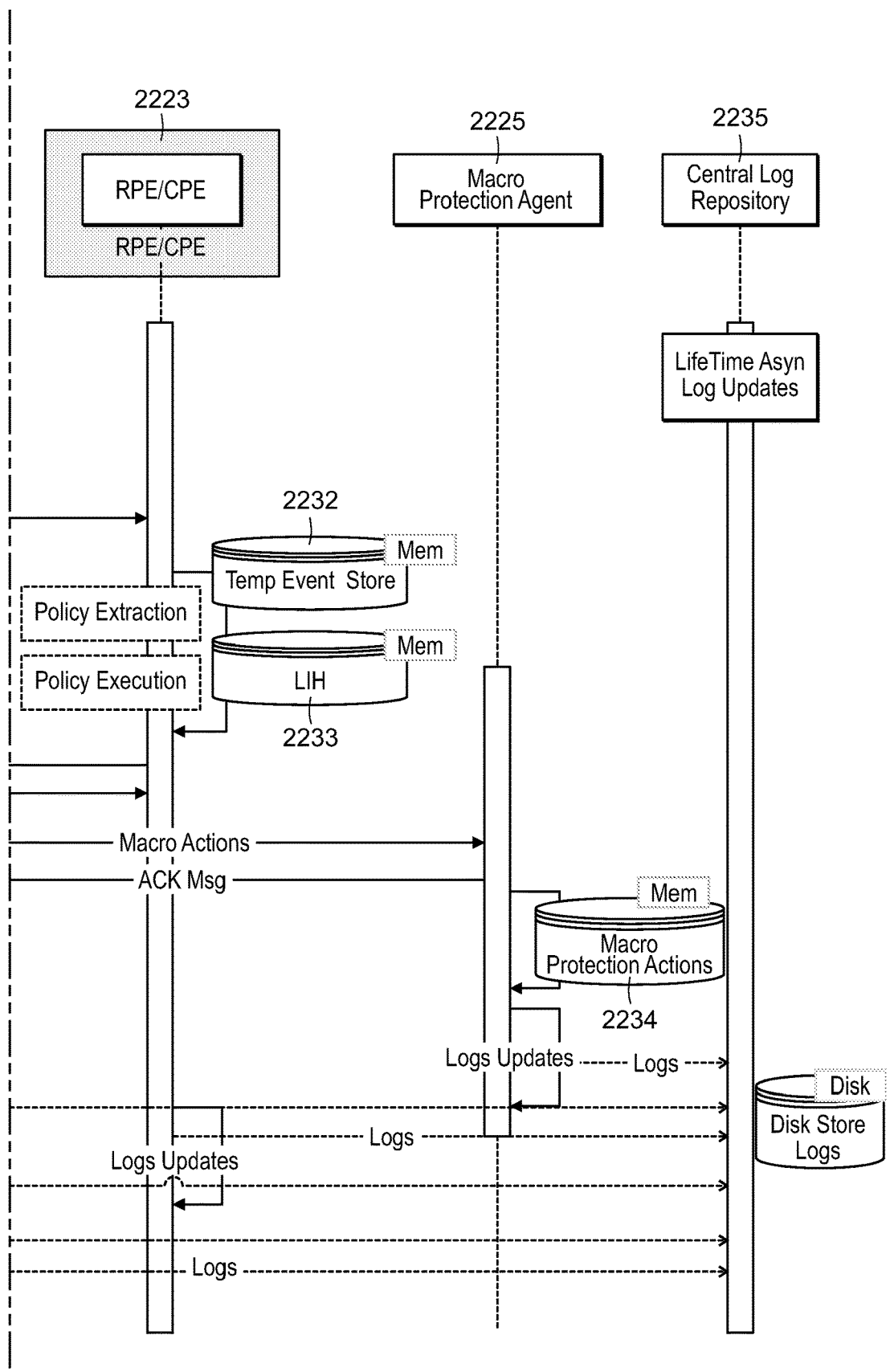

FIG. 22 is a sequence diagram depicting event processing at a pre-runtime or runtime phase 2220. In this phase 2220, events generated from ASI 2221 are processed either locally by ASI RPE 2222 or by central RPE 2223. During the events processing phase 2220, the associated polices are determined and executed by the ASI RPE 2222 or central RPE 2223 based on the event processing pipeline protocol as depicted in FIG. 22. Further, protection actions (micro 2224 or macro 2225) are executed during the policy execution phase 2220 to enforce the final set of actions by policies on the ASI 2221. Once ASI 2221 is initialized, setup and provisioned, it will enter into the pre-runtime and/or runtime stage. In the event processing stage 2220, an event generator agent 2226 detects various events (file events, process events, registry events, memory events, etc.) of ASI 2221 and the CPM 2227 publishes these detected events to SPE proxy 2228. SPE proxy 2228 determines 2229 whether to process the detected events via the fast or slow path based on the policy and sends the events to ASI RPE/CPE 2222 if the fast path is selected or the ASI comm 2230 if the slow path is selected. For the fast path, the ASI RPE/CPE 2222 executes the extracted policies from the in-memory LIH and determines the course of action (CoA) events. The determined CoA events are sent to protection agent 2224 for executing the protection actions. The protection agent 2224 extracts and executes the protection actions from the in-memory micro protection database 2231. For the slow path, the ASI comm 2230 dispatches the events to the central RPE/CPE system 2223. The central RPE/CPE 2223 extracts policies from the in-memory event temp store 2232 and LIH 2233 and the central RPE/CPE 2223 determines the CoA events. The CoA events determined by the central RPE/CPE 2223 can be micro or macro actions. Thus, based on an action's class, a CoA is sent to either ASI 2221 through the CPM 2227 interface if the CoA is at the micro level and the CoA is sent to the macro protection agent 2225 if the CoA is at the macro level. Macro protection agent 2225 extracts and executes the protection actions from the in-memory macro protection database 2234. During this event processing phase 2220, logs are captured and written to in-memory local databases and synced up with a central log repository 2235.

Digital Processing Infrastructure

Figure 23:
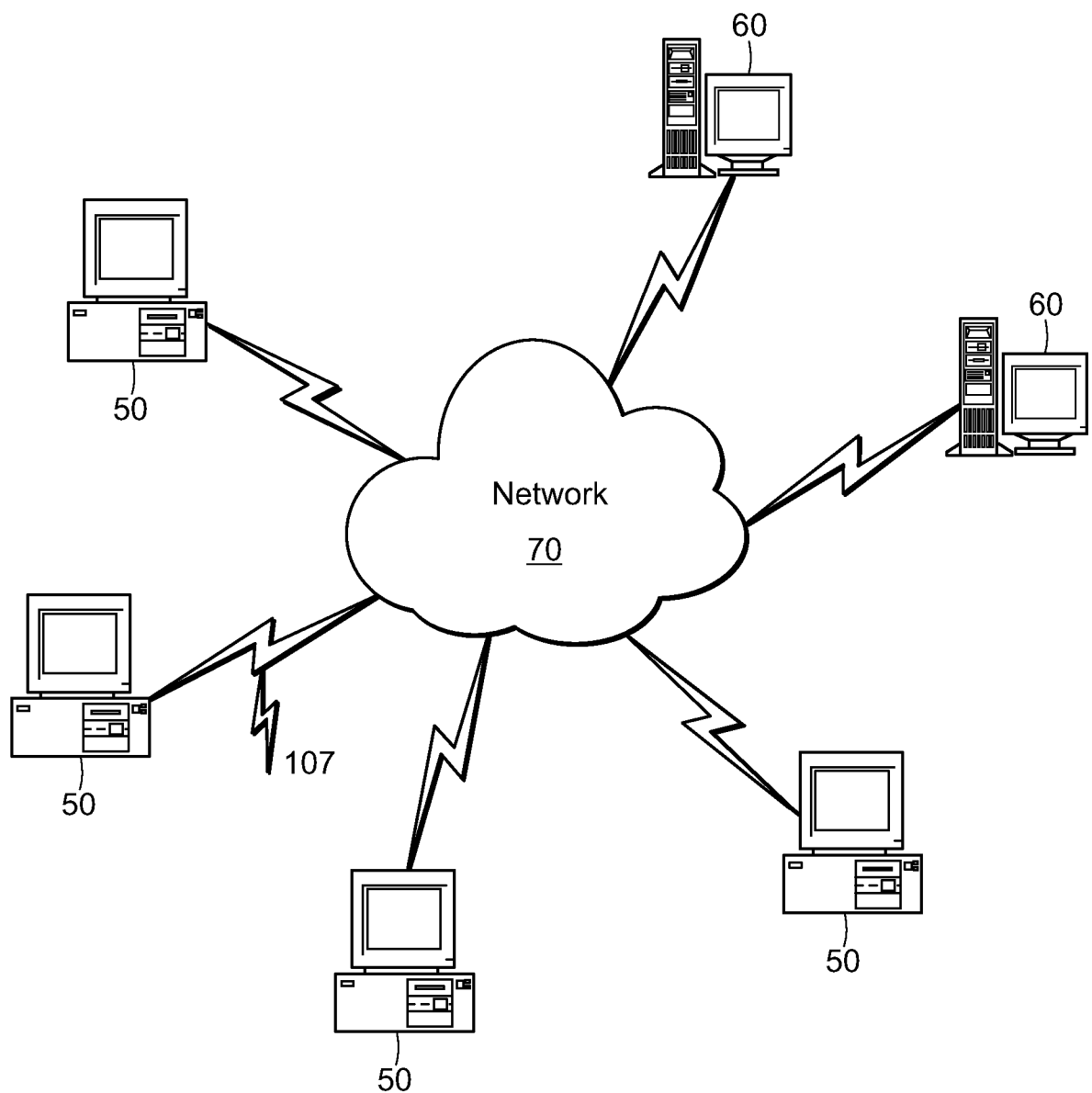
FIG. 23 illustrates a computer network or similar digital processing environment in which embodiments of the present disclosure may be implemented.

FIG. 23 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured as detection engine 260. Client computers/devices 50 may detect CRUD operations on the file system, registry, application processes and threads, and OS kernel of a customer endpoint that may be indicative of a security attack, such as a memory corruption attack. In some embodiments, the client 50 may include client applications, components, or probes executing on the client (i.e., detection engine 260) 50 for capturing and detecting the CRUD operations, and the client 50 may communicate this information to the server 60. Server computers 60 may be configured as an analysis engine, rule processing engine, and callback processing engine, or instrumentation engine 265 which communicates with client devices (i.e., detection engine 260) 50 for receiving the detected CRUD operations as events. The server computers 60 may not be separate server computers but part of cloud network 70. In some embodiments, the server computer (e.g., rule processing engine or callback processing engine) may analyze the events to select rule-based policies, which are applied to take action on the events.

Figure 24:
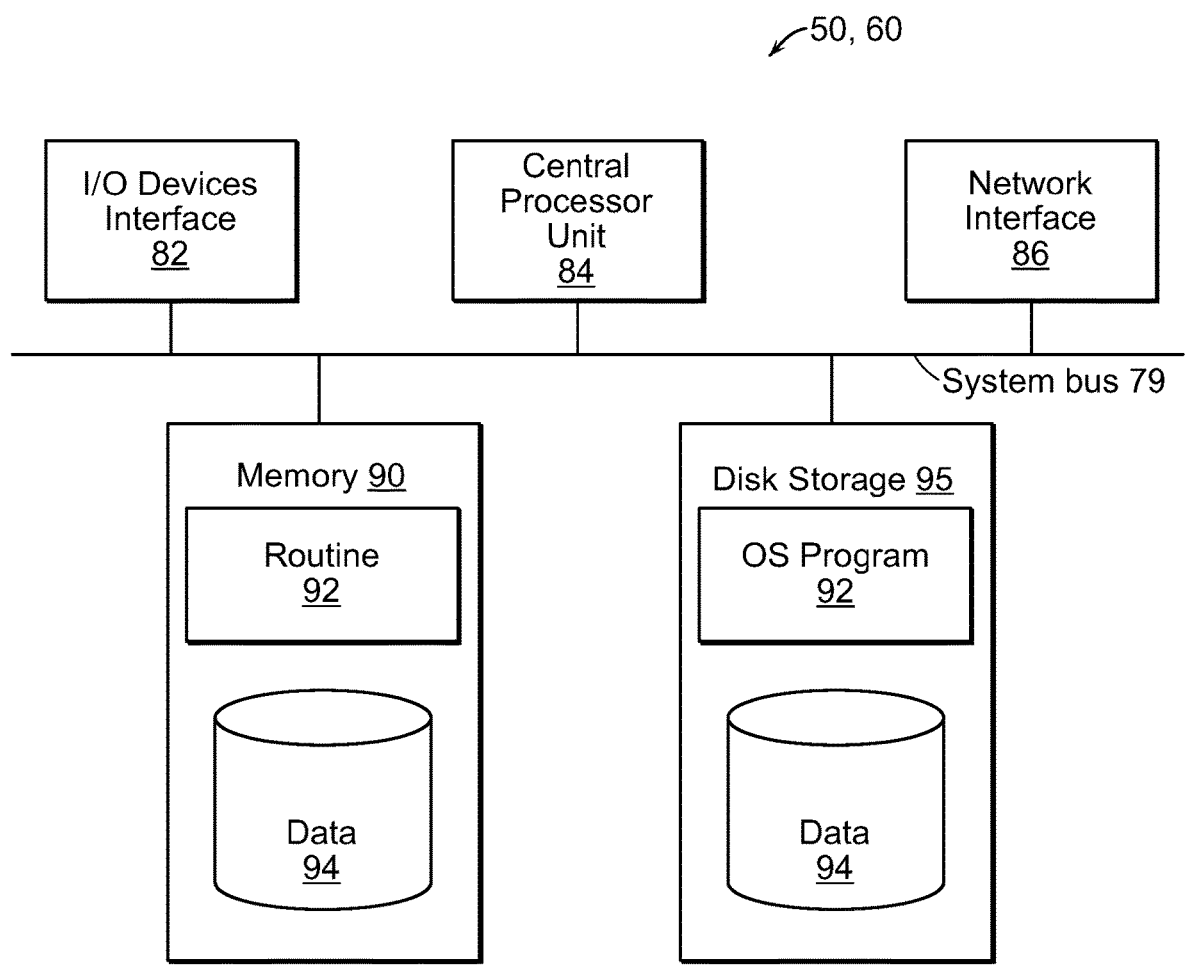
FIG. 24 is a diagram of an example internal structure of a computer (e.g., client processor/device or server computers) in the computer system of FIG. 23.

FIG. 24 is a diagram of an example internal structure of a computer (e.g., client processor/device 50 or server computers 60) in the computer system of FIG. 23. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 23). Memory 90 provides volatile storage for computer software instructions 92 and data 94 used to implement an embodiment of the present disclosure (e.g., detection engine 260, instrumentation engine 265, rule processing engine, and callback processing engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method comprising:
using one or more probes instrumented into a computer application, monitoring a compute endpoint at runtime of the computer application for create, read, write, update, and delete (CRUD) operations being performed on the compute endpoint;
based on content of the CRUD operations, generating an event to analyze a given CRUD operation;
responsive to the generated event, maintaining one or more compute components affected by the given CRUD operation in a quarantine state;
performing one or more actions to attempt to establish trust of the one or more affected compute components;
removing the one or more affected compute components from the quarantine state, upon trust of the one or more affected compute components being established by the performing the one or more actions; and
executing at least one callback routine to mitigate results of the given CRUD operation, upon trust of the one or more affected compute components not being established by the performing the one or more actions.

2. The method of claim 1, wherein the given CRUD operation is performed on one of: a file system, a registry, a network interface, shared memory, one or more processes, one or more threads, a network card, one or more I/O devices, including at least one of a mouse, a keyboard, a Bluetooth connected device and an infrared (IR) connected device, and memory of the compute endpoint.

3. The method of claim 2, wherein the monitoring includes: (i) scanning at least one of: the file system, hive and keys of the registry, private memory, and shared memory, and (ii) capturing and factoring operating system events and device I/O.

4. The method of claim 1, wherein the one or more affected compute components includes one or more of: an executable file, a script file, a configuration file, a process, a thread, a jump table, a registry hive, a registry key, network traffic, private memory, shared memory, and an operating system kernel.

5. The method of claim 1, wherein (i) maintaining the one or more affected compute components in a quarantine state includes removing access permissions from the one or more affected compute components, and (ii) removing the one or more affected compute components from the quarantine state includes restoring the access permissions to the one or more affected compute components.

6. The method of claim 1, wherein the performing the one or more actions to attempt to establish trust includes writing identifying information for the one or more affected compute components to a database of trusted processes and threads.

7. The method of claim 1, wherein the one or more actions include at least one of:
scanning code sections of the one or more affected compute components for known malware;
at least one of statically and dynamically analyzing code sections of the one or more affected compute components for cache operations;
executing watcher processes that monitor and guard a range of shared memory accessed by the given CRUD operation;
validating the one or more affected compute components against a signature database containing file checksums for the one or more affected compute components;
validating code sections of the one or more affected compute components periodically against a cache of code sections using memory checksums;
validating the one or more affected compute components periodically against a cache of jump tables using memory checksums; and
applying one or more rule-based policies associated with the given CRUD operation.

8. The method of claim 7, wherein the one or more rule-based policies are configured based on one or more security technical implementation guides (STIGs), and a policy language syntax is provided for implementing the STIGs in the one or more rule-based policies.

9. The method of claim 1, further comprising:
generating one or more events based on each of the one or more actions;
correlating the one or more events; and
executing the at least one callback routine based on the correlation of the one or more events.

10. The method of claim 1, wherein the executed at least one callback routine is at least one user-defined callback routine that performs, via a micro-protection engine, one or more protection actions within the compute endpoint, including at least one of:
terminating one or more processes associated with the given CRUD operation;
terminating one or more threads associated with the given CRUD operation;
removing injected libraries from memory;
terminating or disabling a web session associated with the given CRUD operation;
deleting the one or more affected compute components from disk;
moving one or more affected instances to a quarantine area;
restoring a valid copy of the one or more affected compute components;
loading one or more patches to remedy the one or more affected compute components;
reporting the given CRUD operation and the one or more affected compute components; and
calling one or more arbitrary user provided custom callbacks.

11. The method of claim 10, wherein the one or more protection actions are performed based on policy enforcement rules defined in at least one of: an inclusion policy, an exclusion policy, a process level policy, a file level policy, and a registry level policy.

12. The method of claim 1, wherein the executed at least one callback routine is at least one user-defined callback routine that performs, via a macro-protection engine, one or more protection actions at a system external to the compute endpoint, including at least one of:
shutting down virtual machines of the external system;
reporting information related to the given CRUD operation to the external system;
invoking APIs to external entities, including at least one of: a router, firewall, packet capture machine, and file backup device; and
performing quarantine actions across the external system, including at least one of collecting logs of the virtual machines, migrating virtual machines to a honeypot subnet, and observing behavior of the virtual machines by collecting data from a computer network.

13. The method of claim 1, further comprising:
determining if a user associated with the given CRUD operation is a trusted user by verifying at a directory server at least one of: (i) the user being logged into a computer network during the given CRUD operation, and (ii) the user having appropriate permissions or credentials to perform the given CRUD operation and use the one or more affected compute components, and
if the user is not verified as a trusted user, placing the one or more affected compute components in a quarantine state.

14. The method of claim 1, further comprising:
maintaining historical data for detected events associated with process identifiers;
performing forensics incident analysis on a current event by traversing the maintained historical data for the detected events according to the process identifiers; and
based on results of the forensics incident analysis, responding to the current event.

15. The method of claim 1, further comprising:
recording operations to a registry or file system;
establishing an association of the registry or file system operations to a process performing the registry or file system operation, the established association forming a chain of events; and
using the formed chain of events to at least one of: quarantine and perform protection actions at the compute endpoint based on one or more rule-based policies.

16. The method of claim 1, further comprising:
detecting a current operation to a registry or file system;
capturing a source address of a caller process to a function associated with the current operation; and
validating that the captured source address is in a whitelisted memory region of the caller process.

17. A computer system comprising a processor and a memory with computer code instructions stored thereon, the memory operatively coupled to said processor such that the computer code instructions configure the processor to implement:
a detection engine configured to:
using one or more probes instrumented into a computer application, monitor a compute endpoint at runtime of the computer application for create, read, write, update, and delete (CRUD) operations being performed on the compute endpoint;
based on content of the CRUD operations, generate an event to analyze a given CRUD operation; and
responsive to the generated event, maintain one or more compute components affected by the given CRUD operation in a quarantine state; and
a callback processing engine configured to:
perform one or more actions to attempt to establish trust of the one or more affected compute components;
and
remove the one or more affected compute components from the quarantine state, if trust of the one or more affected compute components is established by the performing the one or more actions, or
execute at least one callback routine to mitigate results of the given CRUD operation, if trust of the one or more affected compute components is not established by the performing the one or more actions.

18. The computer system of claim 17, wherein the given CRUD operation is performed on one of: a file system, a registry, a network interface, shared memory, one or more processes, one or more threads, a network card, one or more I/O devices, including at least one of a mouse, a keyboard, a Bluetooth connected device and an infrared (IR) connected device, and memory of the compute endpoint.

19. The computer system of claim 18, wherein the monitoring includes: (i) scanning at least one of: the file system, hive and keys of the registry, private memory, and shared memory, and (ii) capturing and factoring operating system events and device I/O.

20. The computer system of claim 17, wherein the one or more affected compute components includes one or more of:
an executable file, a script file, a configuration file, a process, a thread, a jump table, a registry hive, a registry key, network traffic, private memory, shared memory, and an operating system kernel.

21. The computer system of claim 17, wherein the detection engine is further configured to:
(i) in maintaining the one or more affected compute components in a quarantine state, remove access permissions from the one or more affected compute components, and
(ii) in removing the one or more affected compute components from the quarantine state, restore the access permissions to the one or more affected compute components.

22. The computer system of claim 17, wherein the performing the one or more actions to attempt to establish trust includes the detection engine writing identifying information for the one or more affected compute components to a database of trusted processes and threads.

23. The computer system of claim 17, wherein performing the one or more actions to attempt to establish trust includes the computer code instructions further configuring the processor to implement:
an application and network hardening subsystem configured to perform the one or more actions, where the one or more actions include at least one of:
scanning code sections of the one or more affected compute components for known malware;
at least one of statically and dynamically analyzing code sections of the one or more affected compute components for cache operations;
executing watcher processes that monitor and guard a range of shared memory accessed by the given CRUD operation;

validating the one or more affected compute components against a signature database containing file checksums for the one or more affected compute components;

validating code sections of the one or more affected compute components periodically against a cache of code sections using memory checksums; and validating the one or more affected compute components periodically against a cache of jump tables using memory checksums; and a rule processing engine configured to:

select one or more rule-based policies associated with the given CRUD operation for application by the callback processing engine.

24. The computer system of claim 23, wherein the one or more rule-based policies are configured based on one or more security technical implementation guides (STIGs) that are selected by the rule processing engine, and a policy language syntax is provided for implementing the STIGs in the one or more rule-based policies.

25. The computer system of claim 17, where the callback processing engine is further configured to:

generate one or more events based on each of the one or more actions;

correlate the one or more events; and execute the at least one callback routine based on the correlation of the one or more events.

26. The computer system of claim 17, wherein the executed at least one callback routine is at least one user-defined callback routine, and the callback processing engine is coupled to a micro-protection engine, implemented by the processor and configured to perform one or more protection actions within the compute endpoint in response to the at least one callback routine, including at least one of:

terminating one or more processes associated with the given CRUD operation;

terminating one or more threads associated with the given CRUD operation;

removing injected libraries from memory;

terminating or disabling a web session associated with the given CRUD operation;

deleting the one or more affected compute components from disk;

moving one or more affected instances to a quarantine area;

restoring a valid copy of the one or more affected compute components;

loading one or more patches to remedy the one or more affected compute components;

reporting the given CRUD operation and the one or more affected compute components; and calling one or more arbitrary user provided custom callbacks.

27. The computer system of claim 26, wherein the one or more protection actions are performed based on policy enforcement rules defined in at least one of: an inclusion policy, an exclusion policy, a process level policy, a file level policy, and a registry level policy.

28. The computer system of claim 17, wherein the executed at least one callback routine is at least one user-defined callback routine, and the callback processing engine is coupled to a macro-protection engine, implemented by the processor and configured to perform one or more protection actions at a system external to the compute endpoint in response to the at least one callback routine, including at least one of:

shutting down virtual machines of the external system;

reporting information related to the given CRUD operation to the external system;

invoking APIs to external entities, including at least one of: a router, firewall, packet capture machine, and file backup device; and performing quarantine actions across the external system, including at least one of collecting logs of the virtual machines, migrating virtual machines to a honeypot subnet, and observing behavior of the virtual machines by collecting data from a computer network.

29. The computer system of claim 17, wherein the computer code instructions further configure the processor to implement an authentication and authorization subsystem configured to:

determine if a user associated with the given CRUD operation is a trusted user by verifying at a directory server at least one of: (i) the user being logged into a computer network during the given CRUD operation, and (ii) the user having appropriate permissions or credentials to perform the given CRUD operation and use the one or more affected compute components, and if the user is not verified as a trusted user, place the one or more affected compute components in a quarantine state.

30. The computer system of claim 17, wherein the computer code instructions further configure the processor to implement an incident and forensics engine configured to:

maintain historical data for detected events associated with process identifiers;

perform forensics incident analysis on a current event by traversing the maintained historical data for the detected events according to the process identifiers; and based on results of the forensics incident analysis, respond to the current event.

31. The computer system of claim 17, wherein the detection engine is further configured to:

record operations to a registry or file system;

establish an association of the registry or file system operations to a process performing the registry or file system operation, the established association forming a chain of events; and use the formed chain of events to at least one of: quarantine and perform protection actions at the compute endpoint based on one or more rule-based policies.

32. The computer system of claim 17, wherein the detection engine is further configured to:

detect a current operation to a registry or file system;

capture a source address of a caller process to a function associated with the current operation; and validate that the captured source address is in a whitelisted memory region of the caller process.

* * * * *